(12) United States Patent
Yamashita et al.

(10) Patent No.: US 9,128,367 B2
(45) Date of Patent: Sep. 8, 2015

(54) 3D IMAGING DEVICE AND 3D IMAGING METHOD

(75) Inventors: Haruo Yamashita, Osaka (JP); Takeshi Ito, Osaka (JP); Hiromichi Ono, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 404 days.

(21) Appl. No.: 13/582,050

(22) PCT Filed: Mar. 3, 2011

(86) PCT No.: PCT/JP2011/001267
§ 371 (c)(1),
(2), (4) Date: Aug. 31, 2012

(87) PCT Pub. No.: WO2011/108276
PCT Pub. Date: Sep. 9, 2011

(65) Prior Publication Data
US 2012/0327191 A1 Dec. 27, 2012

(30) Foreign Application Priority Data
Mar. 5, 2010 (JP) ................................. 2010-049280

(51) Int. Cl.
G03B 21/58 (2014.01)
H04N 13/02 (2006.01)
G03B 21/56 (2006.01)

(52) U.S. Cl.
CPC ................ *G03B 21/56* (2013.01); *G03B 21/58* (2013.01); *H04N 13/0239* (2013.01); *H04N 13/0296* (2013.01)

(58) Field of Classification Search
CPC ............ H04N 13/002; H04N 13/0033; H04N 13/0074; H04N 13/18; H04N 13/0011; H04N 2013/0081; H04N 2213/002; G06T 2207/10012; G06T 7/0075; G06T 2207/10021
USPC .................. 348/46, 47, 49; 382/154; 359/462
See application file for complete search history.

(56) References Cited

U.S. PATENT DOCUMENTS 5,726,704 A * 3/1998 Uomori ........................... 348/47
5,801,760 A 9/1998 Uomori
(Continued)

FOREIGN PATENT DOCUMENTS

JP H6-105339 A 4/1994
JP H8-027499 B2 3/1996
(Continued)

OTHER PUBLICATIONS

International Search Report of PCT Application No. PCT/JP2011/001267.
(Continued)

Primary Examiner — Brian Yenke
(74) Attorney, Agent, or Firm — Shinjyu Global IP

(57) ABSTRACT

A 3D imaging device obtains a 3D image (3D video) that achieves an appropriate 3D effect and/or intended placement. The 3D imaging device estimates (calculates) an ideal disparity of a main subject based on a preset viewing environment (display condition) and a distance to the main subject, and obtains a disparity (an actual disparity) of the subject (main subject) actually occurring on a virtual screen. The 3D imaging device obtains a correction disparity using the ideal disparity and the actual disparity, and adds the calculated correction disparity to the 3D image (horizontally shifts the image) to perform appropriate disparity correction. The 3D imaging device obtains a 3D image (3D video) that achieves an appropriate 3D effect and/or intended placement without being affected by a disparity occurring in the horizontal direction caused by insufficient precision (in particular, insufficient optical precision).

2 Claims, 25 Drawing Sheets

(56) References Cited

U.S. PATENT DOCUMENTS

| | | | |
|---|---|---|---|
| 5,825,456 | A | 10/1998 | Tabata et al. |
| 5,867,591 | A | 2/1999 | Onda |
| 6,125,198 | A | 9/2000 | Onda |
| 6,704,048 | B1 | 3/2004 | Malkin et al. |
| 6,762,794 | B1 * | 7/2004 | Ogino ............................ 348/262 |
| 6,864,910 | B1 | 3/2005 | Ogino et al. |
| 7,092,003 | B1 * | 8/2006 | Siegel et al. .................... 348/47 |
| 7,372,987 | B2 | 5/2008 | Tokuhashi et al. |
| 7,605,776 | B2 | 10/2009 | Satoh et al. |
| 8,111,875 | B2 | 2/2012 | Sasagawa et al. |
| 8,330,802 | B2 * | 12/2012 | Koppal et al. ................... 348/46 |
| 8,390,674 | B2 * | 3/2013 | Kim et al. ........................ 348/42 |
| 8,624,959 | B1 * | 1/2014 | Houck et al. .................... 348/42 |
| 2001/0012054 | A1 | 8/2001 | Sudo |
| 2003/0179198 | A1 | 9/2003 | Uchiyama |
| 2004/0150728 | A1 | 8/2004 | Ogino |
| 2004/0151363 | A1 | 8/2004 | Villain |
| 2004/0208357 | A1 | 10/2004 | Tokuhashi et al. |
| 2004/0228521 | A1 | 11/2004 | Jeong et al. |
| 2004/0239685 | A1 | 12/2004 | Kiyokawa et al. |
| 2005/0089212 | A1 | 4/2005 | Mashitani et al. |
| 2006/0017834 | A1 | 1/2006 | Konno et al. |
| 2006/0039529 | A1 | 2/2006 | Tsubaki et al. |
| 2006/0158730 | A1 * | 7/2006 | Kira ................................ 359/462 |
| 2006/0204239 | A1 * | 9/2006 | Inaba ............................ 396/325 |
| 2006/0227429 | A1 | 10/2006 | Miyazawa |
| 2006/0290778 | A1 | 12/2006 | Kitaura et al. |
| 2007/0047040 | A1 * | 3/2007 | Ha .................................. 359/24 |
| 2007/0081814 | A1 * | 4/2007 | Ha et al. ........................ 396/310 |
| 2007/0257902 | A1 | 11/2007 | Satoh et al. |
| 2007/0263924 | A1 * | 11/2007 | Kochi et al. ................... 382/154 |
| 2007/0291233 | A1 * | 12/2007 | Culbertson et al. ............. 353/34 |
| 2008/0112616 | A1 * | 5/2008 | Koo et al. ...................... 382/171 |
| 2008/0123901 | A1 | 5/2008 | Podilchuk |
| 2008/0199046 | A1 | 8/2008 | Sasagawa et al. |
| 2008/0199070 | A1 | 8/2008 | Kim et al. |
| 2009/0009592 | A1 * | 1/2009 | Takata et al. ................... 348/47 |
| 2009/0015679 | A1 | 1/2009 | Hayakawa et al. |
| 2009/0040295 | A1 | 2/2009 | Koo et al. |
| 2009/0096863 | A1 | 4/2009 | Kim et al. |
| 2010/0039504 | A1 | 2/2010 | Takahashi et al. |
| 2010/0085357 | A1 * | 4/2010 | Sullivan et al. ................ 345/420 |
| 2010/0142801 | A1 | 6/2010 | Koppal et al. |
| 2010/0247088 | A1 | 9/2010 | Campbell et al. |
| 2010/0318914 | A1 * | 12/2010 | Zitnick et al. .................. 715/719 |
| 2011/0109731 | A1 * | 5/2011 | Koo et al. ........................ 348/51 |
| 2011/0142309 | A1 * | 6/2011 | Zhang et al. ................... 382/128 |
| 2012/0262549 | A1 * | 10/2012 | Ferguson ......................... 348/46 |

FOREIGN PATENT DOCUMENTS

| | | |
|---|---|---|
| JP | H8-294143 A | 11/1996 |
| JP | H9-224267 A | 8/1997 |
| JP | H10-155104 A | 6/1998 |
| JP | H11-168755 A | 6/1999 |
| JP | H11-187425 A | 7/1999 |
| JP | 2001-016619 A | 1/2001 |
| JP | 2001-016620 A | 1/2001 |
| JP | 3157384 B2 | 2/2001 |
| JP | 2002-084555 A | 3/2002 |
| JP | 2002-232913 A | 8/2002 |
| JP | 2003-018619 A | 1/2003 |
| JP | 2003-284093 A | 10/2003 |
| JP | 2004-334833 A | 11/2004 |
| JP | 2004-349736 A | 12/2004 |
| JP | 2005-167310 A | 6/2005 |
| JP | 2008-205758 A | 9/2008 |

OTHER PUBLICATIONS

International Search Report of co-pending PCT Application No. PCT/JP2011/001269.
International Search Report of co-pending PCT Application No. PCT/JP2011/001288.
Office Action for the corresponding Japanese Patent Application No. 2012-503021, dated Jan. 14, 2014.
Office Action from the co-pending U.S. Appl. No. 13/582,052 issued on Jun. 23, 2014.
Office Action from the co-pending U.S. Appl. No. 13/582,051 issued on Feb. 25, 2015.

* cited by examiner

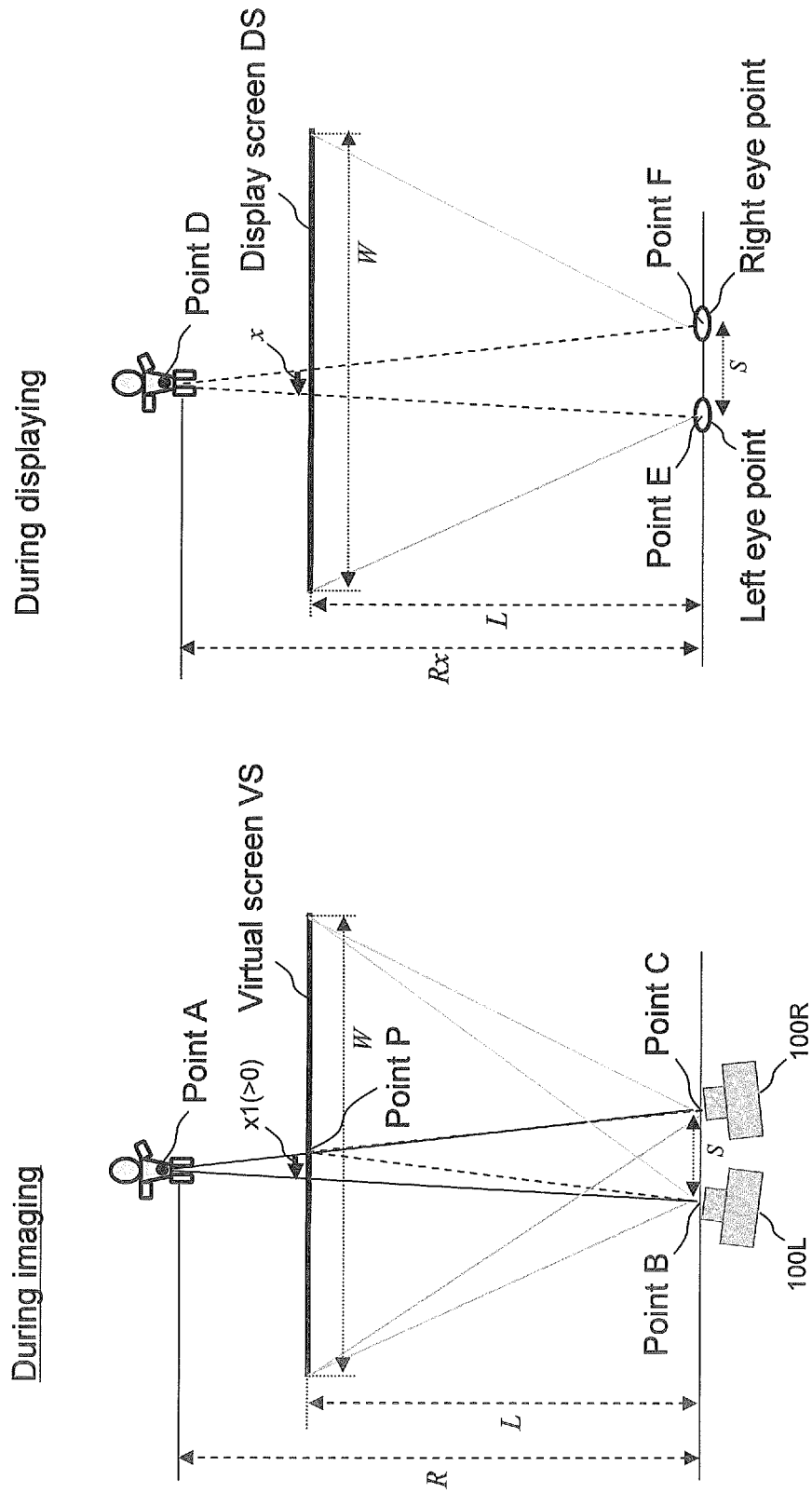

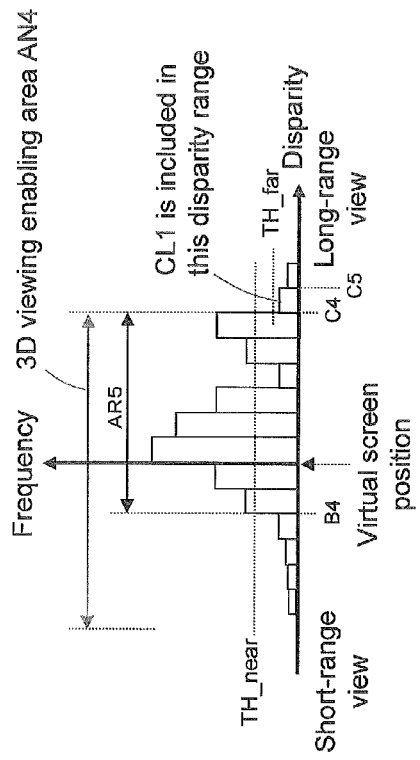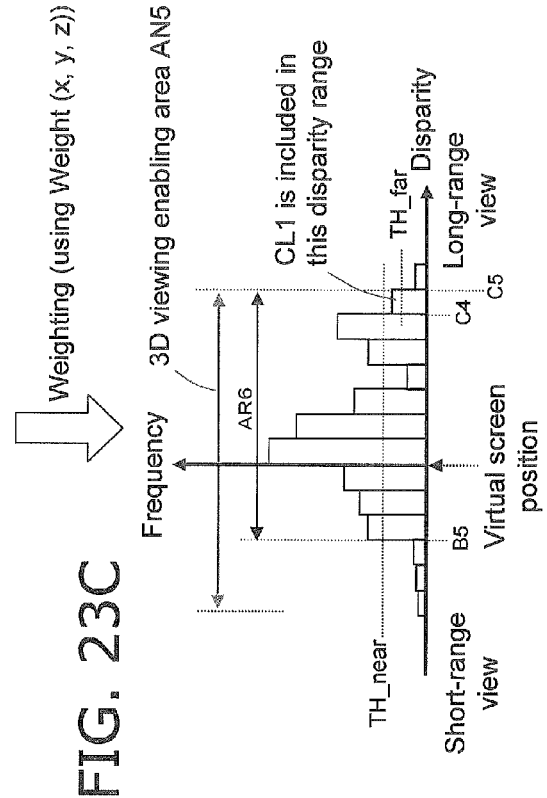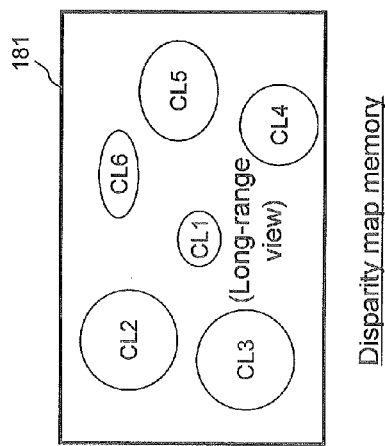

3D IMAGING DEVICE AND 3D IMAGING METHOD

TECHNICAL FIELD

The present invention relates to an imaging device for capturing a three-dimensional (3D) image (or a 3D video), and more particularly, to an imaging method and an imaging device for capturing a left eye image and a right eye image having a disparity between them (two images forming a stereo image) that will be displayed as an appropriate 3D image (3D video).

BACKGROUND ART

Three-dimensional (3D) imaging devices known in the art capture images forming a 3D image (a left eye image and a right eye image) with binocular disparity. The captured images are then reproduced as a 3D image when displayed by a display device that can project images forming a 3D image (a left eye image and a right eye image) separately for the left eye and for the right eye (hereafter such a display device is referred to as a "3D display device").

The 3D imaging devices can vary in the number of their optical systems and the number of their image sensors. The 3D imaging devices can also use various imaging techniques including the parallel viewing method and the time-sequential (frame-sequential) method. Typical 3D imaging devices can be twin-lens imaging devices, which use two optical systems (an optical system for the right eye and an optical system for the left eye). Some of the twin-lens 3D imaging devices may be designed to change their 3D imaging parameters including the angle formed by the intersection of the optical axes of the two optical systems (the angle of convergence).

Other 3D imaging devices can be single-lens imaging devices that can capture a right image and a left image having a disparity between them (a right eye image and a left eye image) without using two optical systems but by only using a single optical system (refer to, for example, Patent Literature 3). Such single-lens 3D imaging devices perform imaging equivalent to the imaging performed using two cameras that have a small disparity between them, while being based on the same principle as the imaging performed using two cameras (imaging performed using two optical systems).

Still other 3D imaging devices capture two images forming a 3D image (a left eye image and a right eye image) using a single camera (an imaging device) through individual two shots performed at different lateral (horizontal) positions (this technique is hereafter referred to as "two-shot imaging"). The two-shot imaging can be used only for stationary subjects. Also, this technique requires an experienced user who can correctly take two shots while laterally (horizontally) moving the camera. The two-shot imaging is effective because it is simple and allows imaging to be performed with a large binocular distance (hereafter the binocular distance used in imaging is referred to as the imaging SB, the imaging stereo base, the stereo base, or the interaxial). To enable appropriate 3D imaging using this technique, such imaging devices can have an assist function for assisting the image shooting performed manually without using tools including special rigs. The assist function includes displaying of guide information on a liquid crystal display of the camera.

Parallel Viewing Method and Cross-Eyed Viewing Method

The imaging devices for capturing and displaying 3D images described above may use the parallel viewing method or the cross-eyed viewing method known in the art.

With the parallel viewing method, two cameras are arranged respectively on the left and on the right. The two cameras are arranged to have their optical axes being parallel to each other. In this state, the cameras capture images forming a 3D image (a 3D video). The imaging SB, or the distance between the two cameras, is set to the interval between the two eyes of a human (about 6.5 cm). The captured images (the left eye image and the right eye image) forming a 3D image are displayed on a screen (a display screen of a display device) at positions electrically distant from each other by the distance equal to the imaging SB. With this parallel viewing method, the images displayed on the screen (on the display screen of the display device) are identical to the images actually viewed at the positions of the cameras when they are captured. Also, the distance to the subject, the size of the subject, and other information captured in the images are reproduced without any changes in the images displayed by the display device. In other words, the parallel viewing method enables "distortionless 3D imaging".

With the cross-eyed viewing method, two cameras (included in an imaging device) are arranged in a manner that their optical axes form an angle of convergence. With the cross-eyed viewing method, a subject at the point of intersection (the point of convergence) between the optical axes of the two cameras (included in the imaging device) is typically placed on the screen. The subject can also be placed more frontward or more backward by changing the angle of convergence. With this cross-eyed viewing method, a selected subject can be easily placed at a predetermined position. The cross-eyed viewing method can thus be useful in enabling, for example, effective positioning used in movie films, and is widely used in the film industry and other related industries.

However, the 3D imaging and displaying techniques described above can have problems that occur depending on the geometric conditions.

Under certain geometric conditions, a 3D image (video) captured with the above 3D imaging techniques can fail to reproduce natural depth when the image is displayed with the above 3D displaying techniques. More specifically, the depth of the displayed image (specifically a range behind the virtual screen (the display screen)) can have imaging failures under certain geometric conditions. For example, the displayed image may be compressed excessively (unnaturally) or expanded excessively (unnaturally) in the depth direction, or may diverge backward and cannot be fused.

The geometric conditions refer to conditions determined geometrically by the alignments of components responsible for capturing and displaying 3D images during imaging and/or displaying. The geometric conditions can be determined by, for example, the parameters described below:

Parameters During Imaging (A1) the convergence angle, (A2) the angle of view of the lens(es) or zooming, (A3) the imaging SB, (A4) the focal length, and other imaging parameters (B) Parameters During Displaying (B1) the size of the display device (the size of the display screen) and (B2) the viewing distance Under certain geometric conditions, the images having a disparity between them (the images forming a 3D image) may be captured and displayed inappropriately with the 3D imaging and displaying techniques.

The conditions associated with human vision can also affect the imaging and display performance achieved by the above 3D imaging and displaying techniques. When, for example, an extremely near scene or an extremely far scene is imaged three-dimensionally, the captured images (the images forming a 3D image) will have a disparity between them having a large absolute value. When these captured images (the images forming a 3D image) are displayed by a display device, many viewers would not be able to fuse the images into a 3D image and would perceive them only as a double image (an image that cannot be viewed three-dimensionally). Although such images (the images forming a 3D image) may be viewed three-dimensionally, the resulting 3D image would cause extreme fatigue of the viewers. Due to human vision, such images (images forming a 3D image) may be captured and displayed inappropriately with the above 3D imaging and displaying techniques.

With other techniques proposed to solve the problems, the disparity is detected from the left and right images (the left eye image and the right eye image), and the disparity adjustment is performed based on the detected disparity. This would enable the images to be displayed as a 3D image easy to view by humans (refer to, for example, Patent Literatures 1 and 2).

SUMMARY

However, the above techniques known in the art have the problems described below.

First, such conventional 3D imaging devices may have insufficient precision (in particular, insufficient optical precision) that would disable appropriate 3D imaging.

The precision of alignment between the two optical systems (e.g., the precision in their parallelism and their convergence angle) significantly affects the quality of 3D imaging. For example, the optical systems having insufficient precision may be misaligned with each other vertically. Such misalignment would narrow the range of disparities within which the resulting images can be fused, and the resulting images will be difficult to view. To improve the alignment precision of the optical systems, the optical systems need to have high mechanical rigidity. However, increasing the mechanical rigidity of the optical systems will increase the size, the weight, and the cost of the optical systems. When the 3D imaging device is designed to change the convergence angle or when the 3D imaging device has a zoom function, increasing the precision of the optical systems would be more difficult. A vertical misalignment of the optical systems may be corrected in principle by performing matching between the two images obtained from the different optical systems and vertically shifting the images in a manner to eliminate the vertical shift. However, a horizontal misalignment of the optical systems cannot be easily corrected because it is often impossible to determine whether the misalignment is caused by insufficient precision of the optical systems or by disparities inherent in 3D imaging.

For the two-shot imaging performed manually using a single camera, the precision of the optical axis achieved by the optical system and the convergence angle formed by the optical system can often be significantly out of its permissible range. This technique thus requires post processing of the captured images using, for example, a personal computer. However, a horizontal misalignment caused by the optical system cannot be easily corrected because no information is available about the amount of required correction. Thus, the correction is difficult even in manual operations in which humans can decide the amount of correction. As a result, the adjustment toward optimum images would involve trial and error of humans.

Also, when the disparity in the horizontal direction between the images has a large error, the subject can be misplaced frontward or backward, and the subject may be placed at an unintended position. Such misplacement of the subject will degrade the natural depth of the resulting images, or disable the captured images to be easily viewed in a stable manner.

Second, the imaging device may fail to process the captured images in an appropriate manner during imaging, and consequently may fail to display a 3D image (a 3D video) in an appropriate manner during displaying (and may provide only a warning during displaying).

When the images with a disparity between them having a large absolute value are displayed, the viewers would not be able to fuse such images into a 3D image due to human vision, and would perceive the images only as a double image. Although such images may be viewed three-dimensionally, the resulting 3D image is likely to cause extreme fatigue of the viewers.

With techniques proposed for display devices to solve these problems, the disparity is detected from the left and right images and the disparity adjustment is performed based on the detected disparity. This would enable the images to be displayed as a 3D image that is easy to view (refer to, for example, Patent Literatures 1 and 2).

However, these techniques are intended for the processing performed during displaying of the 3D image (3D video). More specifically, these techniques use the disparity of the displayed 3D image (3D video) and the fusion conditions of a human perceiving the displayed image to either determine that the displayed image should fall within a permissible disparity range or determine that a warning message is to be provided.

In reality, however, the warning message indicating that the displayed image cannot be fused, which is provided during displaying of the image, would be useless because the image that has already been displayed cannot be corrected.

The user actually needs such information in advance during imaging, or specifically needs information in advance indicating whether an image of a target scene will be displayed in a manner that it can be perceived as a 3D image without causing fatigue.

However, the display state of an imaged scene as well as the placement position of a subject in the resulting 3D image depend on many parameters used during imaging (e.g., the SB, the angle of view, the zoom ratio, and the angle of convergence) and the parameters used during displaying (e.g., the display size and the viewing distance). The conventional techniques thus fail to determine the display state and the placement position of an image during imaging.

Third, the conventional techniques fail to correctly simulate actual human perception when determining whether the image (video) captured three-dimensionally (3D image (video)) can be perceived by humans without causing their fatigue.

Although the display state and the placement position of an image may be determined correctly based on the parameters used during imaging and the parameters used during displaying, the conventional techniques can fail to correctly determine the display state and the position of an image for some scenes based on the detected disparity.

This is due to the reasons described below. Different scenes that are assumed to have the same farthest point and have the same nearest point are perceived differently depending on the positional relationship between the farthest point and the nearest point in the captured image of each scene.

When, for example, the farthest point and the nearest point are near each other in the captured image, the image may not be fused. In other words, when the farthest point and the nearest point are away from each other in the captured image to some extent, the image can be fused.

Moreover, the conventional techniques may involve erroneous determination occurring when, for example, the actual farthest point and the actual nearest point are away from each other in the captured image and a long-range view that does not include the farthest point and a short-range view that does not include the nearest point are near each other in the image. In this case, the image may be erroneously determined as an image that can be fused with the conventional techniques, although the image will not actually be fused.

The conventional techniques may thus fail to determine whether the captured image will be easy to view based solely on the angle and the distance between the farthest point and the nearest point in the scene being imaged.

For some scenes, the use of the farthest point and the nearest point alone can determine whether the captured image will be easy to view. When only one of the farthest point and the nearest point in the image cannot be fused, the conventional disparity adjustment may correct the image and enable both the farthest point and the nearest point to be fused. In many scenes, however, both the farthest point and the nearest point may be out of the range in which the image can be fused. In many scenes, further, adjusting one of the farthest point and the nearest point into the range in which the image can be fused (fusional range) may cause the other one of the farthest point and the nearest point to be out of the fusional range. The conventional techniques would determine that such scenes cannot be captured under conditions enabling 3D viewing.

The imaging SB may be set smaller to eliminate this problem. However, the imaging device that can change the imaging SB has a complicated structure. Moreover, the image captured with a small imaging SB would often have insufficient perspectives.

To solve the above problems, it is an object of the present invention to provide a 3D imaging device, a 3D imaging method, and a program for obtaining a 3D image (a 3D video) that achieves an appropriate 3D effect and/or intended placement without being affected by a disparity occurring in the horizontal direction caused by insufficient precision (in particular, insufficient optical precision) of the 3D imaging device.

It is another object of the present invention to provide a 3D imaging device, a 3D imaging method, and a program for capturing an appropriate 3D image for various scenes by simulating actual human perception and determining during imaging whether a captured image will be perceived as a 3D image without causing fatigue of viewers.

Solution to Problem

A first aspect of the present invention provides a 3D imaging device for three-dimensionally imaging a subject and capturing a 3D image formed by a left eye image and a right eye image. The 3D imaging device includes an imaging unit, a distance information obtaining unit, a condition obtaining unit, an ideal disparity setting unit, and a disparity correction unit.

The imaging unit captures the 3D image.

The distance information obtaining unit obtains distance information indicating a distance from the 3D imaging device to the subject.

The condition obtaining unit obtains an imaging condition under which the 3D image has been captured and a display condition under which the 3D image will be displayed.

The ideal disparity setting unit sets a disparity of the subject that will occur under the display condition as an ideal disparity based on the obtained imaging condition and the obtained display condition.

The actual disparity obtaining unit detects a disparity of the subject occurring in the captured 3D image as an actual disparity.

The disparity correction unit performs disparity correction of the 3D image in a manner that the detected actual disparity is adjusted toward the set ideal disparity.

In this 3D imaging device, the condition obtaining unit obtains a subject distance that is a distance to a subject (a main subject), and sets the placement position of the subject (main subject). This 3D imaging device calculates an ideal disparity based on the subject distance and the placement position of the subject (main subject) and sets the imaging condition of the 3D imaging device. The 3D imaging device then calculates a correction disparity based on the actual disparity and the ideal disparity calculated from a 3D image obtained through 3D imaging actually performed under the set imaging condition, and performs disparity correction of the 3D image actually obtained through 3D imaging using the calculated disparity. As a result, this 3D imaging device corrects a disparity occurring in the horizontal direction caused by insufficient precision (in particular, insufficient optical precision) of the 3D imaging device. As a result, this 3D imaging device obtains a 3D image (3D video) that achieves an appropriate 3D effect and/or intended placement without being affected by a disparity occurring in the horizontal direction caused by insufficient precision (in particular, insufficient optical precision).

The placement position refers to the position of a point at which a predetermined subject is fused within a three-dimensional space when the captured 3D image of the predetermined subject is displayed.

A second aspect of the present invention provides the 3D imaging device of the first aspect of the present invention further including a display information setting unit.

The display information setting unit sets at least a viewing distance L and a base-line length S as display parameters associated with a viewing environment in which the 3D image is displayed. The viewing distance L is a distance between a display screen to display the 3d image thereon and a base line that is a straight line connecting a left eye point and a right eye point in the viewing environment. The base-line length S is a distance between the left eye point and the right eye point in the viewing environment.

The condition obtaining unit sets a virtual screen at a position at which a distance to the subject matches the viewing distance L, and sets the imaging condition in a manner that a point of convergence is positioned on the virtual screen.

This 3D imaging device estimates (calculates) the ideal disparity of the main subject from the preset viewing environment (display condition) and the subject distance of the main subject, and obtains the disparity (actual disparity) of the subject (main subject) actually occurring on the virtual screen. The 3D imaging device then calculates the correction disparity based on the ideal disparity and the actual disparity and adds the calculated correction disparity to the 3D image (horizontally shifts the image) to perform appropriate disparity correction. As a result, the 3D imaging device obtains a 3D image (3D video) that achieves an appropriate 3D effect and/or intended placement without being affected by a disparity occurring in the horizontal direction caused by insufficient precision (in particular, insufficient optical precision).

The point of convergence refers to a point of intersection between the optical axes of two optical systems (an optical system for obtaining a right eye image and an optical system for obtaining a left eye image) one of which is assumed to be arranged at the imaging point at which a right eye image is to be obtained (a right eye point) and the other one of which is assumed to be arranged at the imaging point at which a left eye image is to be obtained (a left eye point). However, the 3D imaging device is not required to be a twin-lens imaging device, but may be a single-lens imaging device. The point of convergence refers to the point of intersection between the two optical axes assumed when the imaging point at which a right eye image is obtained (a right eye point) and the imaging point at which a left eye image is obtained (a left eye point) are arranged virtually (or equivalently).

A third aspect of the present invention provides the 3D imaging device of the second aspect of the present invention in which when distortionless imaging is designated by the condition obtaining unit, the disparity correction unit calculates a correction disparity $\Delta x$ using the formula:

$\Delta x = x1 - x2$, where $x1$ is the ideal disparity and $x2$ is the actual disparity.

The disparity correction unit performs disparity correction of the left eye image and the right eye image captured by the imaging unit by horizontally shifting the left eye image and the right eye image by an amount corresponding to the correction disparity $\Delta x$.

This 3D imaging device estimates (calculates) the ideal disparity x1 of the main subject from the preset viewing environment (display condition) and the subject distance of the main subject, and obtains the disparity (actual disparity) x2 of the main subject actually occurring on the virtual screen. The 3D imaging device then calculates the correction disparity $\Delta x$ based on the ideal disparity x1 and the actual disparity x2, and adds the calculated correction disparity $\Delta x$ to the 3D image (horizontally shifts the image). This enables the 3D imaging device to perform 3D imaging equivalent to distortionless imaging.

This 3D imaging device obtains a 3D image through appropriate disparity adjustment. In other words, the 3D imaging device can perform appropriate disparity adjustment when the camera has inherent errors (in particular, errors occurring due to the optical systems) (for example, when the camera fails to execute highly precise convergence control).

A fourth aspect of the present invention provides the 3D imaging device of the second aspect of the present invention in which when free positioning imaging is designated by the condition obtaining unit, and a placement position of the subject set by the condition obtaining unit is at a distance R3 from the base line, the disparity correction unit calculates a correction disparity $\Delta x$ using the formula:

$\Delta x = x3 - x2$, where $x3$ is the ideal disparity and $x2$ is the actual disparity, and $x3 = S*(1 - L/R3)$, where S is the base-line length, and R3 is the distance from the base line to the placement position. The base line is a straight line including the left eye point and the right eye point, and L is the distance from the base line to a display screen.

The disparity correction unit performs disparity correction of the left eye image and the right eye image captured by the imaging unit by horizontally shifting the left eye image and the right eye image by an amount corresponding to the correction disparity $\Delta x$.

This 3D imaging device calculates the ideal disparity based on the geometrical positional relationship in placing the main subject at a predetermined position in the viewing environment during displaying, and performs disparity correction of the actually obtained 3D image based on the calculated ideal disparity and the calculated actual disparity. As a result, the 3D imaging device obtains a 3D image in which the main subject is placed at an intended distance without being affected by precision of the optical systems included in the 3D imaging device.

A fifth aspect of the present invention provides a 3D imaging method for three-dimensionally imaging a subject and capturing a 3D image formed by a left eye image and a right eye image. The method includes an imaging process, a distance information obtaining process, a condition obtaining process, an ideal disparity setting process, an actual disparity obtaining process, and a disparity correction process.

In the imaging process, the 3D image is captured.

In the distance information obtaining process, distance information indicating a distance from an imaging point to the subject is obtained.

In the condition obtaining process, an imaging condition under which the 3D image has been captured and a display condition under which the 3D image will be displayed are obtained.

In the ideal disparity setting process, a disparity of the subject that will occur under the display condition is set as an ideal disparity based on the obtained imaging condition and the obtained display condition.

In the actual disparity obtaining process, a disparity of the subject occurring in the captured 3D image is detected as an actual disparity.

In the disparity correction process, disparity correction of the 3D image is performed in a manner that the detected actual disparity is adjusted toward the set ideal disparity.

The 3D imaging method has the same advantageous effects as the 3D imaging device of the first aspect of the present invention.

A sixth aspect of the present invention provides a program for enabling a computer to implement a 3D imaging method for three-dimensionally imaging a subject and capturing a 3D image formed by a left eye image and a right eye image. The method includes an imaging process, a distance information obtaining process, a condition obtaining process, an ideal disparity setting process, an actual disparity obtaining process, and a disparity correction process.

In the imaging process, the 3D image is captured.

In the distance information obtaining process, distance information indicating a distance from an imaging point to the subject is obtained.

In the condition obtaining process, an imaging condition under which the 3D image has been captured and a display condition under which the 3D image will be displayed are obtained.

In the ideal disparity setting process, a disparity of the subject that will occur under the display condition is set as an ideal disparity based on the obtained imaging condition and the obtained display condition.

In the actual disparity obtaining process, a disparity of the subject occurring in the captured 3D image is detected as an actual disparity.

In the disparity correction process, disparity correction of the 3D image is performed in a manner that the detected actual disparity is adjusted toward the set ideal disparity.

The program enabling the computer to implement the 3D imaging method has the same advantageous effects as the 3D imaging device of the first aspect of the present invention.

The present invention provides a 3D imaging device, a 3D imaging method, and a program for obtaining a 3D image (a 3D video) that achieves an appropriate 3D effect and/or intended placement without being affected by a disparity occurring in the horizontal direction caused by insufficient precision (in particular, insufficient optical precision) of the 3D imaging device.

The present invention also provides a 3D imaging device, a 3D imaging method, and a program for capturing a 3D image for many types of scenes by determining during imaging whether the captured image will be viewed three-dimensionally without causing fatigue by simulating actual human perception.

BRIEF DESCRIPTION OF DRAWINGS

FIGS. 4A and 4B are diagrams describing the geometric relationship during imaging and during displaying according to the first embodiment.

FIGS. 23A to 23C are diagrams describing clustering and 3D perception determination performed using a disparity histogram.

DETAILED DESCRIPTION

A 3D imaging method and a 3D imaging device according to embodiments of the present invention will now be described with reference to the drawings. It will be apparent to those skilled in the art from this disclosure that the following descriptions of the embodiments are provided for illustration only and not for the purpose of limiting the invention as defined by the appended claims and their equivalents.

First Embodiment

A twin-lens 3D imaging device according to a first embodiment of the present invention will now be described.

1.1 Structure of 3D Imaging Device

Figure 1:
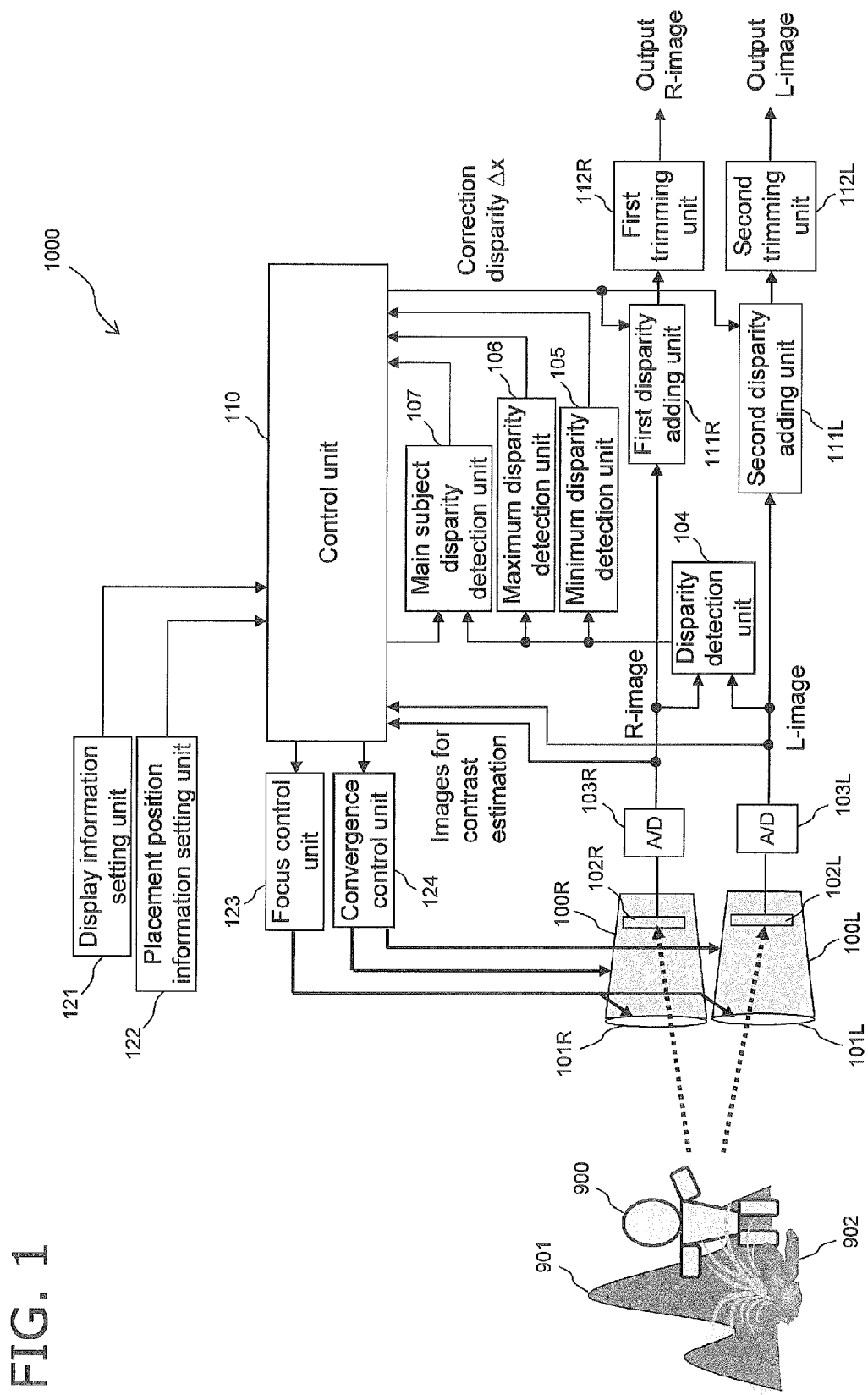
FIG. 1 is a block diagram showing a 3D imaging device according to a first embodiment of the present invention.

FIG. 1 schematically shows the structure of a 3D imaging device 1000 according to a first embodiment of the present invention.

As shown in FIG. 1, the 3D imaging device 1000 includes a first imaging unit 100R, a second imaging unit 100L, a first A/D conversion unit 103R, a second A/D conversion unit 103L, a first disparity adding unit 111R, a second disparity adding unit 111L, a first trimming unit 112R, and a second trimming unit 112L.

As shown in FIG. 1, the 3D imaging device 1000 further includes a disparity detection unit 104, a minimum disparity detection unit 105, a maximum disparity detection unit 106, a main subject disparity detection unit 107, a control unit 110, a focus control unit 123, a convergence control unit 124, a display information setting unit 121, and a placement position information setting unit 122.

For ease of explanation, the first imaging unit 100R is assumed to capture a right eye image (video), and the second imaging unit 100L is assumed to capture a left eye image (video).

As shown in FIG. 1, the first imaging unit 100R includes a first optical system 101R and a first image sensor 102R. The first imaging unit 100R collects light from a subject through the first optical system 101R, and from the collected light, obtains a first image signal (a right eye image, or an R-image) using the first image sensor 102R. The first imaging unit 100R then outputs the obtained first image signal to the first A/D conversion unit 103R.

The first imaging unit 100R also executes focus control as instructed by the focus control unit 123. The first imaging unit 100R further executes convergence control as instructed by the convergence control unit 124. The first imaging unit 100R can adjust the angle of convergence to enable the convergence control to be executed in a manner instructed by the convergence control unit 124. The convergence control is executed through, for example, the processing (1) and the processing (2) described below.

(1) Convergence Angle Control (with the Cross-Eyed Viewing Method)

Figure 2:
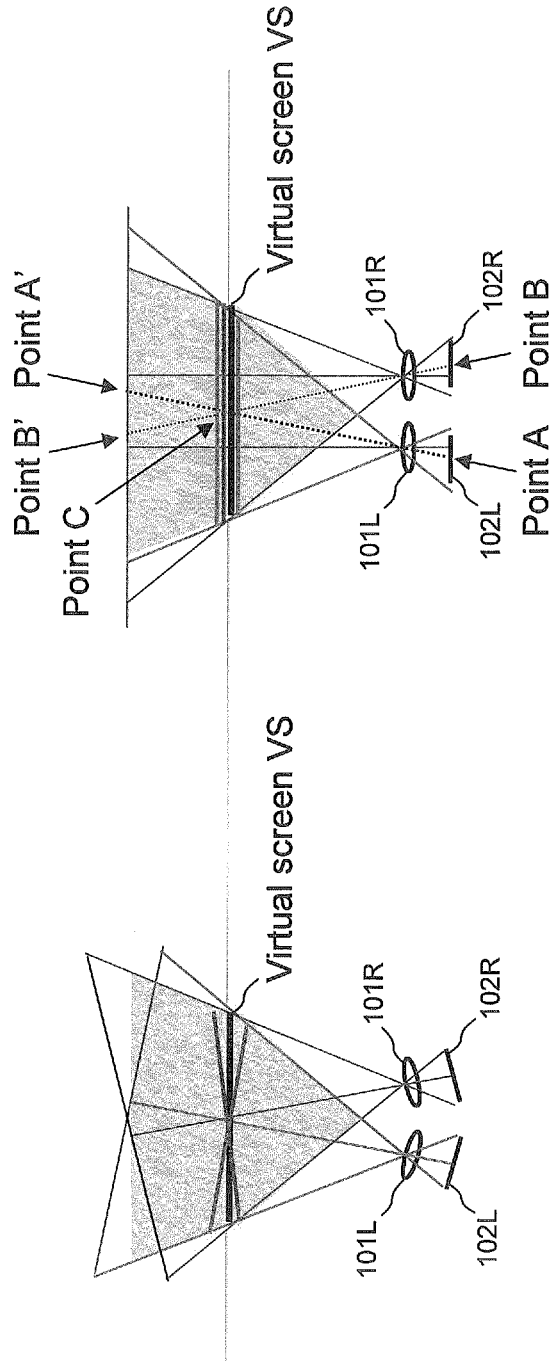
FIGS. 2A and 2B are diagrams describing control of convergence performed using the cross-eyed viewing method and using sensor shifting.

The optical axes of the first imaging unit 100R and the second imaging unit 100L are adjusted (for example, the convergence angle is adjusted by rotating the first imaging unit 100R and the second imaging unit 100L, each of which is rotatable with respect to a predetermined axis of rotation, by a predetermined angle to adjust the orientations of the optical axes of the first imaging unit 100R and the second imaging unit 100L). FIG. 2A schematically shows the adjustment performed through such convergence angle control (with the cross-eyed viewing method). As shown in FIG. 2A, the angle of convergence can for example be adjusted in a manner that the optical axis of the first imaging unit 100R (the first optical system 101R) and the optical axis of the second imaging unit 100L (the second optical system 101L) intersect on a virtual screen VS. This adjustment enables a subject positioned at the point of convergence to be placed on the display screen during displaying.

(2) Sensor Shifting

The first imaging unit 100R and the second imaging unit 100L are moved in a manner that the imaging surface of the first image sensor 102R and the imaging surface of the second image sensor 102L move (in parallel) to adjust the central axes of their angles of view. FIG. 2B schematically shows the adjustment performed through this sensor shifting. As shown in FIG. 2B, the angle of convergence can for example be adjusted in a manner that the central axis of the angle of view (indicated by a straight line AA') of the first imaging unit 102R (point A is the center of the imaging surface of the first imaging unit 102R) and the central axis of the angle of view (indicated by a straight line BB') of the second imaging unit 102L (point B is the center of the imaging surface of the second imaging unit 102L) intersect on the virtual screen VS (point C). This adjustment enables a subject positioned at the convergence point (point C) to be placed on the display screen during displaying.

The 3D imaging device 1000 may combine the above methods (1) and (2) in executing the convergence control.

The first optical system 101R collects light from the subject and forms an image on the imaging surface of the first image sensor 102R. The first optical system 101R consists of one or more lenses, and includes a focusing lens, a zoom lens, and an aperture. The first optical system 101R executes focus control as instructed by the focus control unit 123.

The first image sensor 102R converts light from the subject collected through the first optical system 101R by photoelectric conversion, and obtains (forms) a first image signal from the collected light. The first image sensor 102R then outputs the obtained first image signal to the first A/D conversion unit 103R. The first imaging unit 102R may be formed by, for example, a complementary metal oxide semiconductor (CMOS) image sensor or a charge coupled device (CCD) image sensor.

As shown in FIG. 1, the second imaging unit 100L includes a second optical system 101L and a second image sensor 102L. The second imaging unit 100L collects light from a subject through the second optical system 101L, and from the collected light, obtains a second image signal (a left eye image, or an L-image) using the second image sensor 102L. The second imaging unit 100L then outputs the obtained second image signal to the second A/D conversion unit 103L.

The second imaging unit 100L also executes focus control as instructed by the focus control unit 123. The second imaging unit 100L further executes convergence control as instructed by the convergence control unit 124. In the same manner as the first imaging unit 100R, the second imaging unit 100L can adjust the angle of convergence to enable the convergence control to be executed in a manner instructed by the convergence control unit 124.

The second optical system 101L focuses light from the subject and forms an image on the imaging surface of the second image sensor 102L. The second optical system 101L consists of one or more lenses, and includes a focusing lens, a zoom lens, and an aperture. The second optical system 101L executes focus control as instructed by the focus control unit 123.

The second image sensor 102L converts light from the subject focused through the second optical system 101L by photoelectric conversion, and obtains (forms) the focused light as a second image signal. The second image sensor 102L then outputs the obtained second image signal to the second A/D conversion unit 103L. The second imaging unit 102L may be formed by, for example, a CMOS image sensor or a CCD image sensor.

The first A/D conversion unit 103R receives a first image signal (R-image) obtained by the first imaging unit 100R, and converts the input first image signal through A/D conversion. The first A/D conversion unit 103R then outputs a digital signal into which the first image signal has been converted to the disparity detection unit 104 and the first disparity adding unit 111R.

The second A/D conversion unit 103L receives a second image signal (L-image) obtained by the second imaging unit 100L, and converts the input second image signal through A/D conversion. The second A/D conversion unit 103L then outputs a digital signal into which the second image signal has been converted to the disparity detection unit 104 and the second disparity adding unit 111L.

The disparity detection unit 104 receives the first image signal (R-image) output from the first A/D conversion unit 103R and the second image signal (L-image) output from the second A/D conversion unit 103L. The disparity detection unit 104 performs matching between the input R-image and the input L-image and detects a binocular disparity between the images. The disparity detection unit 104 transmits information indicating the detected binocular disparity to the minimum disparity detection unit 105, the maximum disparity detection unit 106, and the main subject disparity detection unit 107.

The minimum disparity detection unit 105 receives information indicating the binocular disparity output from the disparity detection unit 104, and detects a disparity at the nearest point within the scene being imaged (the image being captured), or a minimum disparity in the scene, based on the input information indicating the binocular disparity. The minimum disparity detection unit 105 outputs information indicating the detected minimum disparity to the control unit 110.

The maximum disparity detection unit 106 receives the information indicating the binocular disparity output from the disparity detection unit 104, and detects a disparity at the farthest point within the scene being imaged (the image being captured), or a maximum disparity in the scene, based on the input information indicating the binocular disparity. The maximum disparity detection unit 106 outputs information indicating the detected maximum disparity to the control unit 110.

The main subject disparity detection unit 107 receives information indicating the binocular disparity output from the disparity detection unit 104, and detects a disparity for a main subject (a main subject disparity) in the scene being imaged (in the image being captured) based on the input information indicating the binocular disparity. The main subject disparity detection unit 107 outputs information indicating the detected main subject disparity to the control unit 110. The main subject disparity detection unit 107 first obtains information indicating a subject that is in focus from the control unit 110, and then identifies a main subject based on the obtained information.

The control unit 110 controls the entire 3D imaging device 1000 as well as the individual functional units of the 3D imaging device 1000. The control unit 110 executes focus control and convergence control, and performs processing for detecting a main subject, obtaining display information, and obtaining placement position information. The control unit 110 also calculates a correction disparity based on the minimum disparity detected by the minimum disparity detection unit 105, the maximum disparity detected by the maximum disparity detection unit 106, and the subject disparity detected by the main subject disparity detection unit 107. The control unit 110 then outputs information indicating the calculated correction disparity to the first disparity adding unit 111R and the second disparity adding unit 111L. The control unit 110 may be formed by, for example, a central processing unit (CPU) (a microprocessor), a read-only memory (ROM), or a random access memory (RAM).

The focus control unit 123 adjusts the focus of the first optical system 101R and the focus of the second optical system 101L in accordance with a command provided from the control unit 110 (executes focus control over the first optical system 101R and the second optical system 101L).

The convergence control unit 124 controls convergence (for example, controls the convergence angle) of the first imaging unit 100R and the second imaging unit 100L in accordance with a command provided from the control unit 110.

The first disparity adding unit 111R receives the first image signal (R-image) output from the first A/D conversion unit 103R and the information indicating the correction disparity calculated by the control unit 110. The first disparity adding unit 111R then adds the correction disparity calculated by the control unit 110 to the first image signal (R-image). More specifically, the first disparity adding unit 111R adds the disparity (the correction disparity) by shifting the R-image laterally by an amount corresponding to the correction disparity calculated by the control unit 110. The first disparity adding unit 111R then outputs the resulting first image signal (R-image), to which the correction disparity has been added, to the first trimming unit 112R.

The second disparity adding unit 111L receives the second image signal (L-image) output from the second A/D conversion unit 103L and the information indicating the correction disparity calculated by the control unit 110. The second disparity adding unit 111L then adds the correction disparity calculated by the control unit 110 to the second image signal (L-image). More specifically, the second disparity adding unit 111L adds the disparity (the correction disparity) by shifting the L-image laterally by an amount corresponding to the correction disparity calculated by the control unit 110. The second disparity adding unit 111L then outputs the resulting second image signal (L-image), to which the correction disparity has been added, to the second trimming unit 112L.

The first trimming unit 112R receives the first image signal (R-image) output from the first disparity adding unit 111R, and subjects the input R-image to trimming. The first trimming unit 112R then outputs the trimmed R-image (the first image signal).

The second trimming unit 112L receives the second image signal (L-image) output from the second disparity adding unit 111L, and subjects the input L-image (the second image signal) to trimming. The second trimming unit 112L then outputs the trimmed L-image (the second image signal).

The display information setting unit 121 sets the display conditions used by a display device (not shown) with which the 3D image (the 3D video) captured by the 3D imaging device 1000 is to be viewed, and outputs the set display conditions (display information) to the control unit 110.

The placement position information setting unit 122 sets the placement position of the main subject with respect to the screen (the display screen) of the display device. More specifically, the placement position information setting unit 122 sets the placement position of the subject in front of or behind or on the display screen, and outputs the set information (placement position information) to the control unit 110.

In the present embodiment, as shown in FIG. 1, the scene imaged by the 3D imaging device 1000 is assumed to include a person 900, which serves as a main subject, a view of mountains (a mountain view) 901, which serves as a long-range view, and a view of plants (a plant view) 902, which serve as a short-range view.

The control unit 110 functions as a distance information obtaining unit by performing a distance information obtaining process through contrast detection.

The control unit 110 also functions as an ideal disparity setting unit by calculating an ideal disparity (an ideal disparity for a main subject) and setting the ideal disparity.

The focus control unit 123, the convergence control unit 124, and the imaging unit (the first imaging unit 100R and the second imaging unit 100L) function as a condition obtaining unit as they are controlled in accordance with commands provided from the control unit 110.

The disparity detection unit 104 and the main subject disparity detection unit 107 function as an actual disparity obtaining unit.

The control unit 110 functions as a disparity correction unit by calculating the correction disparity.

The first disparity adding unit 111R and the second disparity adding unit 111L function as a disparity correction unit.

1.2 Operation of 3D Imaging Device

The operation of the 3D imaging device 1000 having the above-described structure will now be described.

Before imaging, a photographer inputs (sets) the display conditions (display information) that will be used when a captured image is viewed and also inputs (sets) the positioning conditions (placement position information) that determine the placement position of the main subject 900 with respect to the display screen, or the placement position in front of or behind or on the display screen. The display information and the placement position information are set by the display information setting unit 121 and the placement position information setting unit 122.

The control unit 110 then executes control for imaging, or specifically for example adjusts the parameters used during imaging performed by the 3D imaging device 1000 (the imaging parameters) based on the display information and the placement position information set by the display information setting unit 121 and the placement position information setting unit 122.

When the photographer points the 3D imaging device 1000 at the subject, the control unit 110 moves the focusing lenses (not shown) included in the first optical system 101R and the second optical system 101L in their optical axis direction using the focus control unit 123 in a manner that the main subject 900 will have the highest contrast. This adjusts the main subject 900 into focus. When the main subject 900 is in focus (in focused state), the control unit 110 detects a distance (subject distance) Rc between the 3D imaging device 1000 and the main subject 900 based on the position information (including the focal length) of the first optical system 101R and/or the second optical system 101L. In other words, the control unit 110 detects the distance Rc to the main subject 900 with the contrast detection method.

In FIG. 1, the 3D imaging device 1000 uses both the R-image and the L-image input into the control unit 110 to determine the contrast value (to estimate the contrast). However, the present invention should not be limited to this structure. Alternatively, the 3D imaging device 1000 may use only one of the images (the R-image or the L-image) to estimate the contrast.

The subject distance refers to a distance from an object from which light is focused onto the surface of the image sensor forming the imaging unit (e.g., a CCD image sensor or a CMOS image sensor) to the camera (the 3D imaging device 1000). The subject distance may also be an object point distance or a conjugate distance (an object-image distance). The subject distance may be an approximate distance from the 3D imaging device 1000 to the subject, and may for example be (1) a distance from the center of gravity of the entire lens of the optical system (the first optical system 101R and/or the second optical system 101L) included in the 3D imaging device 1000 to the subject, (2) a distance from the imaging surface of the imaging sensor (the first image sensor 102R and/or the second image sensor 102L) of the imaging unit (the first imaging unit 100R and/or the second imaging unit 100L) to the subject, or (3) a distance from the center of gravity (or the center) of the 3D imaging device 1000 to the subject.

The control unit 110 subsequently determines an appropriate convergence angle of the optical systems in accordance with the distance Rc to the main subject and the set value of the placement position information setting unit 122. Based on the determined convergence angle, the control unit 110 then controls the convergence angle of the left and right optical systems of the 3D imaging device 1000 using the convergence control unit 124. For example, the control unit 110 controls the convergence angle with the methods (1) and (2) described below.

(1) Convergence Angle Control (with the Cross-Eyed Viewing Method)

The control unit 110 changes the optical axes of the first imaging unit 100R and the second imaging unit 100L (for example, the convergence angle is adjusted by rotating the first imaging unit 100R and the second imaging unit 100L, each of which is rotatable with respect to a predetermined axis of rotation, by a predetermined angle to adjust the orientations of the optical axes of the first imaging unit 100R and the second imaging unit 100L).

(2) Sensor Shifting

The control unit 110 moves the first imaging unit 100R and the second imaging unit 100L in a manner that the imaging surface of the first image sensor 102R and the imaging surface of the second image sensor 102L move (in parallel) to adjust the central axes of their angles of view.

(3) The control unit 110 combines the above methods (1) and (2) in executing the convergence control.

After the convergence control is executed (when the preparations for imaging have been completed), the 3D imaging device 1000 is operated to capture a 3D image (a 3D video) (an R-image (video) and an L-image (video)).

The disparity detection unit 104 divides the imaged scene into a plurality of blocks, and detects a disparity for each block of the R-image and of the L-image.

Figure 3:
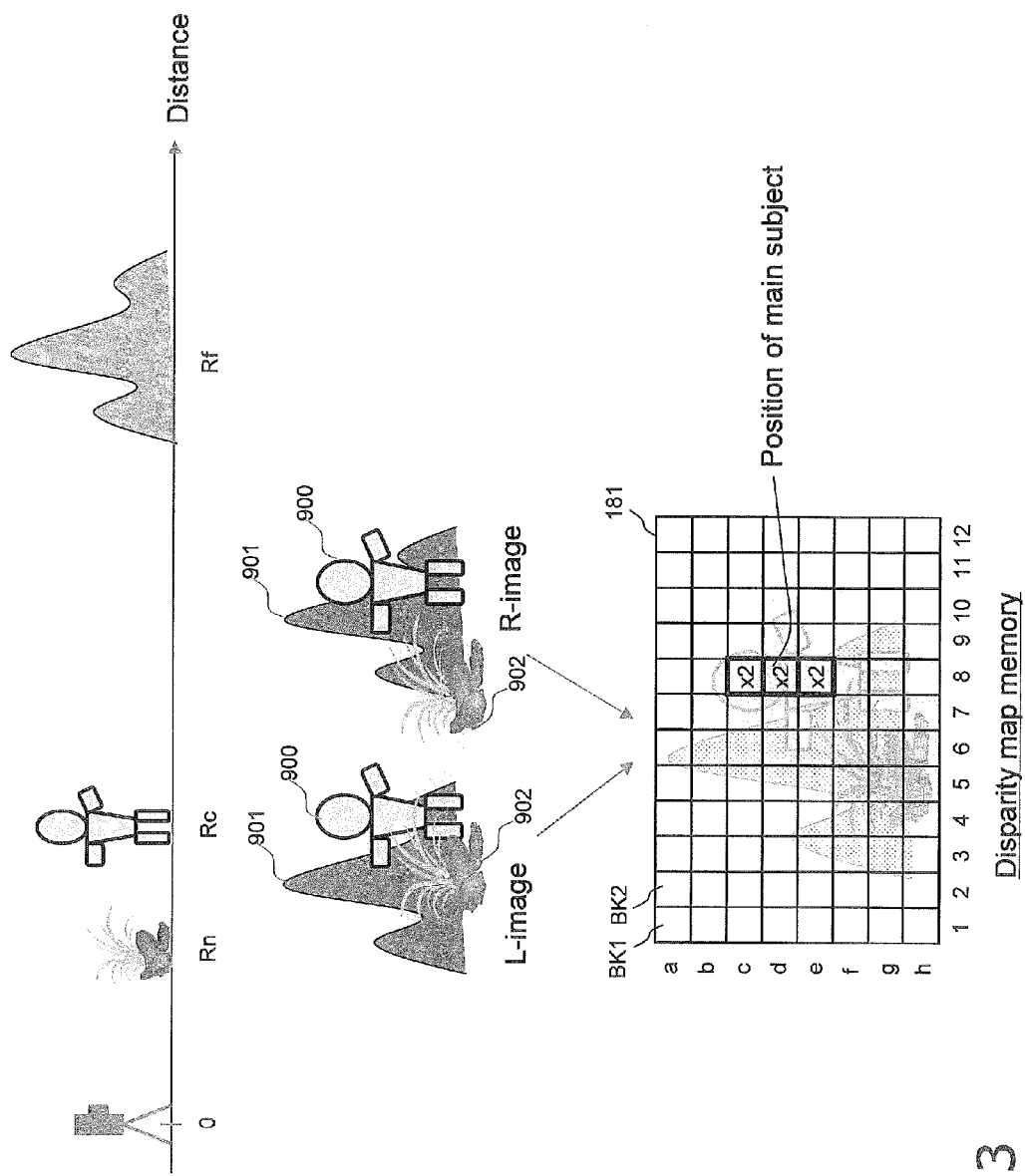
FIG. 3 is a diagram describing in detail a disparity detection unit according to the first embodiment.

FIG. 3 is a diagram describing a disparity detection process performed by the disparity detection unit 104.

As shown in FIG. 3, the disparity detection unit 104 divides the imaged scene into a plurality of blocks, and performs matching between the L-image and the R-image in units of blocks and determines a disparity between the two images for each individual block. The disparity detection unit 104 stores the disparity determined for each block in an interrelated manner. More specifically, the disparity detection unit 104 stores disparity values for the corresponding blocks into a disparity map memory 181 (a memory that can store a disparity for each block of the imaged scene) shown in FIG. 3. In the disparity map memory 181, a positive disparity value indicates the disparity for a long-range view and a negative disparity value indicates the disparity for a short-range view. The disparity map memory 181 is, for example, a memory that can be accessed by the functional units of the 3D imaging device 1000 (for example, a RAM).

The minimum disparity detection unit 105 detects the smallest disparity value (a negative value in many cases) stored in the disparity map memory 181. The maximum disparity detection unit 106 detects the largest disparity value (typically a large positive value) stored in the disparity map memory 181.

The main subject disparity detection unit 107 determines that the subject 900 in focus is a main subject (determines that the subject 900 is a main subject based on the information indicating a subject in focus obtained by the main subject disparity detection unit 107 from the control unit 110). The main subject disparity detection unit 107 detects a disparity (a main subject disparity) for a block corresponding to the position of the main subject (the subject 900) from the disparity map memory 181.

The control unit 110 calculates a correction disparity based on the main subject disparity detected by the main subject disparity detection unit 107 and a disparity (an ideal disparity) that would occur when the main subject is imaged through distortionless imaging (ideal imaging without any errors caused by camera performance and the like).

Distortionless Imaging (Ideal Imaging)

The conditions enabling distortionless imaging through which the most natural depth is achieved will now be described.

FIGS. 4A and 4B are diagrams describing distortionless imaging.

FIG. 4A schematically shows the geometric relationship (the positional relationship) between the imaging components during imaging performed using the 3D imaging device 1000 that has an ideal precision. The imaging components are specifically the imaging point for a left eye image (corresponding to the second optical system), the imaging point for a right eye image (corresponding to the first optical system 101R), the virtual screen, and the main subject. FIG. 4B schematically shows the geometric relationship (the positional relationship) between the displaying components during displaying. The displaying components are specifically the position of the left eye, the position of the right eye, the display screen, and the placement position of the main subject.

For ease of explanation, FIGS. 4A and 4B show the geometric relationship between the imaging components and between the displaying components when imaging is performed with the imaging SB (the distance S in FIGS. 4A and 4B) being set equal to the distance between the eyes of a human (about 6.5 cm) and without using zooming.

In the example shown in FIGS. 4A and 4B, the display information setting unit 121 sets the (display) screen size W and the viewing distance L as the display conditions. The placement position information setting unit 122A has a set code designating distortionless imaging. The control unit 110 detects the set code designating distortionless imaging. The 3D imaging device 1000 then performs distortionless imaging.

When the 3D imaging device 1000 performs distortionless imaging, the convergence control unit 124 controls the convergence in a manner as shown in FIG. 4A that the optical axis of the first imaging unit 100R (the first optical system 101R) and the optical axis of the second imaging unit 100L (the second optical system 101L) (indicated by dotted lines in FIG. 4A) intersect with each other on a virtual screen VS (point P), which is defined virtually at the distance L. When the 3D imaging device 1000 captures images after such convergence control, the captured images forming a 3D image (the R-image and the L-image) have no disparity between them for a subject positioned on the virtual screen VS. More specifically, the L-image area and the R-image area corresponding to the subject positioned on the virtual screen VS are identical to each other. For a subject positioned behind the virtual screen VS, the second imaging unit 100L (the imaging unit for a left eye image) captures an image while it is being shifted to the left with respect to the first imaging unit 100R (the imaging unit for a right eye image). For a subject at point A in the example shown in FIG. 4A (a subject positioned behind the virtual screen VS), the captured images will have a disparity x1 to the left on the virtual screen VS. The disparity occurring in this direction (to the left in FIG. 4A) is referred to as a positive disparity.

For a subject positioned in front of the virtual screen VS, the captured images will have a disparity in the opposite direction or specifically will have a negative disparity.

In the example of FIG. 4A, the captured images of the subject at the distance R, which is behind the virtual screen VS, have the disparity x1 (>0).

The images forming a 3D image (the R-image and the L-image) captured by the 3D imaging device 1000 in the arrangement shown in FIG. 4A are displayed on a display (a display screen DS) in the arrangement shown in FIG. 4B, or specifically with a disparity x on the display screen during displaying being identical to the disparity x1 during imaging. In this case, a triangle connecting the two cameras and the subject (a triangle ABC) in FIG. 4A is congruent with a triangle connecting the two eyes and the subject image (a triangle DEF) in FIG. 4B. A depth Rx that would be felt by the viewer when the R- and L-images are displayed in the arrangement of FIG. 4B would be identical to the distance R used during imaging. The same relationship applies to any subjects at all distances. This imaging thus enables views of all ranges including short-range views to infinite long-range views to be displayed in a manner to reproduce correct depth. In other words, the 3D imaging device 1000 performs distortionless imaging in the arrangement shown in FIG. 4A.

In this manner, the 3D imaging device having an ideal precision can perform distortionless imaging without disparity adjustment. When a 3D image obtained through such distortionless imaging (for example, through imaging performed in the arrangement shown in FIG. 4A) is displayed in a predetermined viewing environment (for example, a viewing environment in the arrangement shown in FIG. 4B), the resulting 3D image reproduces depth having a linear relationship with the actual subject distance (the subject distance used during imaging).

In distortionless imaging, the placement position of the main subject is determined independently of the virtual screen VS. The 3D image obtained through distortionless imaging is only required to be displayed in the predetermined viewing environment so that the distance to the placement position of the main subject (the distance from the midpoint between the two points to the main subject) will match the distance to the actual subject (the subject distance used during imaging).

Imaging Performed by Actual 3D Imaging Device with Insufficient Precision

A disparity occurring between the images captured by the actual 3D imaging device having insufficient precision will now be described with reference to FIGS. 5A and 5B.

Figure 5B:
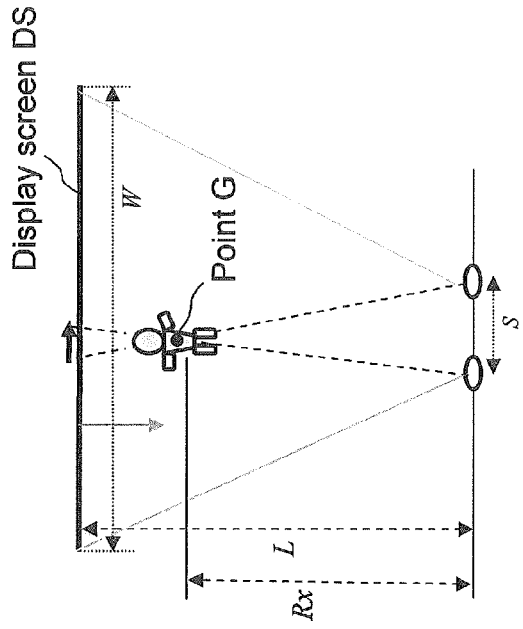
FIGS. 5A and 5B are diagrams describing the geometric relationship during imaging and during displaying according to the first embodiment.
Figure 5A:
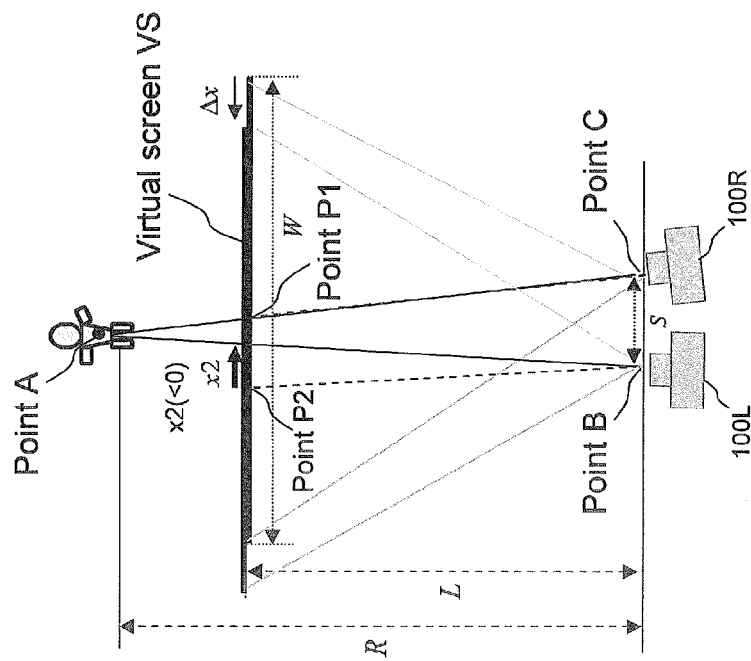

Although the illustration in FIGS. 5A and 5B is exaggerated, the dotted lines indicate the convergence in FIGS. 5A and 5B. In FIGS. 5A and 5B, the optical axes of the 3D imaging device have insufficient precision. As a result, a straight line B-P2 and a straight line C-P1 do not intersect with each other on the virtual screen VS. More specifically, the optical axis of the first imaging unit 100R (the first optical system 101R) and the optical axis of the second imaging unit 100L (the second optical system 101L) do not intersect with each other on the virtual screen VS. As a result of this, a subject on the virtual screen VS also has a disparity.

In the example shown in FIG. 5A, the subject at the distance R has a disparity x2 including an error. When the images forming a 3D image captured in the arrangement shown in FIG. 5A are displayed on the display screen DS in the viewing environment shown in FIG. 5B, that is, the images are displayed on the display (the display screen DS) with a disparity x=x2, the resulting 3D image will have a large depth error shown in FIG. 5B. More specifically, the subject positioned at point A behind the virtual screen VS during imaging will be placed at point G in front of the display screen DS during displaying. The resulting 3D image has a large depth error.

As shown in the example of FIGS. 5A and 5B, a disparity error occurring in the negative direction during imaging will cause subjects at all distances in the displayed image to have a distorted depth in a direction in which the subjects are nearer the viewer. In particular, an image area at infinity is significantly compressed frontward. A subject positioned at infinity during imaging will be placed significantly frontward during displaying.

A disparity error occurring in the positive direction during imaging will cause subjects at all distances in the displayed images to have a distorted depth in a direction in which the subjects are farther from the viewer. In this case, an image area forming a long-range view will exceed infinity, and may diverge backward. A subject included in such an image area forming a long-range view that diverges backward would be displayed as an image that cannot be fused.

As described above, the 3D imaging device 1000 according to the present embodiment can perform appropriate disparity adjustment by detecting a disparity error that can occur on the virtual screen VS due to an actual error occurring in the 3D imaging device 1000 and correcting such an error.

In the 3D imaging device 1000, the control unit 110 calculates the correction disparity based on the main subject disparity (corresponding to the disparity on the virtual screen VS) detected by the main subject disparity detection unit 107 and the disparity (ideal disparity) obtained when the main subject is imaged through distortionless imaging (ideal imaging without any errors caused by camera performance and the like).

The first disparity adding unit 111R and the second disparity adding unit 111L then add the calculated correction disparity to the R-image and the L-image. More specifically, the first disparity adding unit 111R and the second disparity adding unit 111L horizontally shift the R-image and the L-image by an amount corresponding to the correction disparity.

The first trimming unit 112R and the second trimming unit 112L then trim the R-image and the L-image to which the correction disparity has been added by removing image areas that should not be used to form a 3D image (parts unnecessary to form a 3D image).

The first trimming unit 112R and the second trimming unit 112L then output the R-image (a first image signal) and the L-image (a second image signal) that have been trimmed.

The first disparity adding unit 111R and the second disparity adding unit 111L may not add the correction disparity but may only store information indicating the correction disparity into a header of a predetermined image format (a video format) and may output the images in the predetermined image (video) format. This eliminates the need for the processing for adding the correction disparity as well as the processing for trimming.

Processing Implementing Disparity Correction Method

Figure 6:
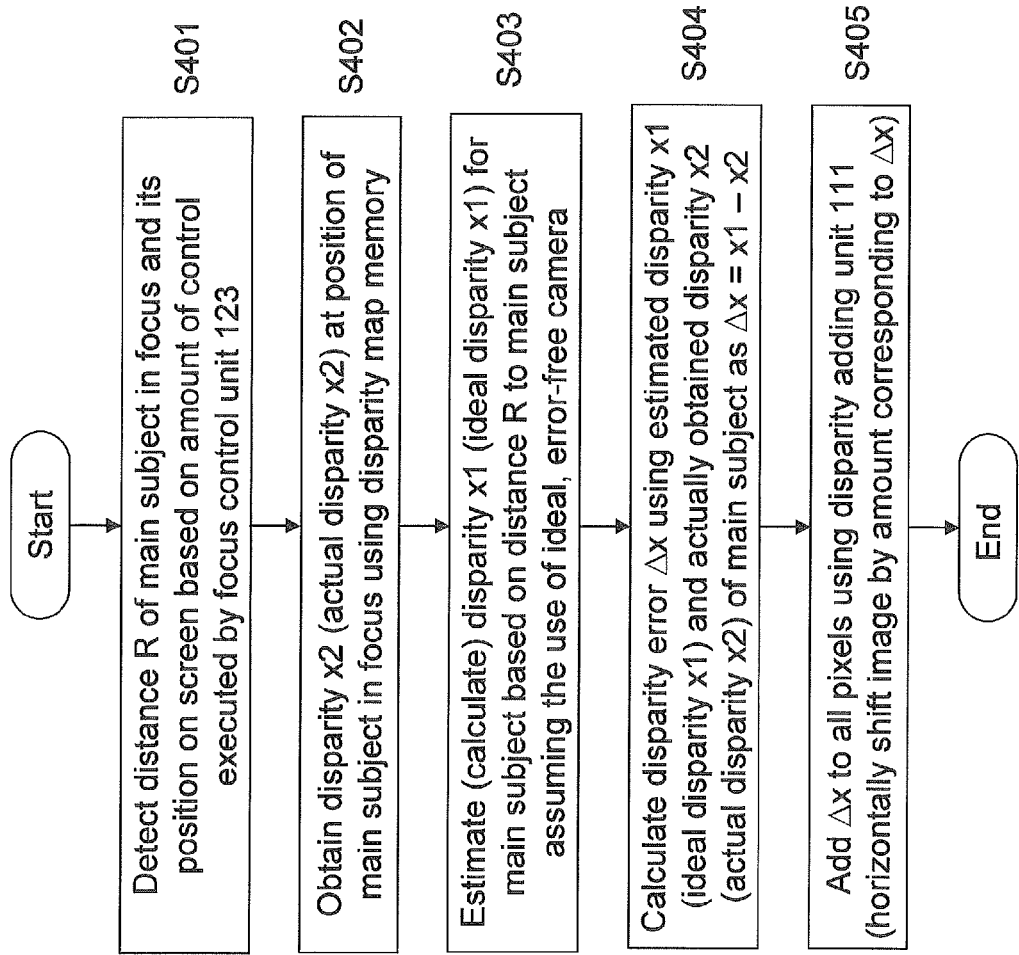
FIG. 6 is a flowchart illustrating disparity correction performed in the first embodiment.

The disparity correction method according to the present embodiment will now be described with reference to the flowchart shown in FIG. 6.

Step S401:

The control unit 110 detects the subject distance R of the main subject in focus based on the amount of control executed by the focus control unit 123, and detects an approximate position of the main subject in focused state on the screen (in the through-the-lens image (in the R-image and/or the L-image through the lens).

Step S402:

The main subject disparity detection unit 107 obtains the disparity x2 at the main subject position (for example blocks indicated by a bold line in FIG. 3) using the disparity map memory 181 (the disparity map memory 181 shown in FIG. 3), which is generated by the disparity detection unit 104.

When a plurality of blocks corresponding to the main subject are detected as in the example shown in FIG. 3, the disparity x2 may be determined by any of the following:

(1) An average of the plurality of disparities corresponding to the detected blocks is used as the disparity x2. The average may be a weighted average (for example an average value weighted using a distance from the center) or a mean-square value.

(2) The disparity of one block selected from the plurality of detected blocks is used as the disparity x2.

(3) The disparity of one block positioned in the middle among the plurality of detected blocks is used as the disparity x2.

(4) The disparity of one block having a median value of the disparities corresponding to the plurality of detected blocks is used as the disparity x2.

Step S403:

The control unit 110 estimates (calculates) the disparity x1 (the ideal disparity x1) for the main subject in the camera (the 3D imaging device) without any errors using the distance R to the main subject as described with reference to the example shown in FIG. 4A. More specifically, the control unit 110 obtains the virtual screen (display screen) width W, the viewing distance L, and the stereo base S (the base-line length S) based on the display information (information determining the viewing environment) set by the display information setting unit 121 included in the 3D imaging device 1000. The control unit 110 then estimates (calculates) the ideal disparity x1 of the main subject based on the virtual screen (display screen) width W, the viewing distance L, the stereo base S (the base-line length S), and the subject distance R.

Step S404:

The control unit 110 calculates a disparity error Δx from the disparity x1 (the ideal disparity x1) of the main subject estimated in step S403 and the disparity x2 (the actual disparity x2) of the main subject actually obtained in step S402 using the formula below:

$$\Delta x = x1 - x2 \qquad \text{Formula 1}$$

Step S405:

In the formula, Δx is the disparity error caused by insufficient precision of the optical systems included in the 3D imaging device 1000. The disparities for all subjects including the main subject involve the same disparity error. The first disparity adding unit 111R and the second disparity adding unit 111L add the disparity error Δx, which serves as the correction error, to each of all pixels of the 3D image (horizontally shifts the R-image and the L-image by an amount corresponding to the correction disparity Δx).

The 3D imaging device 1000 uses the above disparity correction method to obtain a 3D image having an ideal disparity after the disparity correction. In other words, the 3D image that has been subjected to the disparity correction is substantially equivalent to a 3D image that would be obtained through distortionless imaging.

When, for example, x1=4 and x2=−10, Δx=x1−x2=14. In this case, the corrected disparity x' is calculated as x'=x2+Δx=−10+14=4, which is identical to the ideal disparity x1 (=4).

After the processing performed with the above disparity correction method, the disparity for a subject on the virtual screen is corrected to zero based on the disparity detected by the disparity detection unit 104.

The 3D imaging device 1000 uses the above disparity correction method to achieve the disparity that is the same as the disparity achieved by the ideal optical systems shown in FIG. 4A, and enables 3D imaging equivalent to distortionless imaging.

As described above, the 3D imaging device 1000 estimates (calculates) the ideal disparity x1 of the main subject based on the preset viewing environment (the display conditions) and the subject distance to the main subject, and obtains the disparity (the actual disparity) x2 of the main subject actually occurring on the virtual screen using the disparity detection unit 104 and the main subject disparity detection unit 107. The 3D imaging device 1000 then calculates the correction disparity Δx using the ideal disparity x1 and the actual disparity x2, and adds the calculated correction disparity Δx to the 3D image (horizontally shifts the right and left images). As a result, the 3D imaging device 1000 enables 3D imaging equivalent to distortionless imaging.

As a result, the 3D imaging device 1000 obtains a 3D image that has been subjected to appropriate disparity adjustment. More specifically, the 3D imaging device 1000 can perform appropriate disparity adjustment when the camera has inherent errors (in particular, errors occurring due to the optical systems) (when, for example, the device fails to execute highly precise convergence control).

First Modification (Variable Positioning for Main Subject (Free Positioning Imaging)

A first modification of the present embodiment will now be described.

A 3D imaging device according to the first modification performs imaging that enables effective positioning including placing a main subject at a freely selected position in front of or behind or on the display screen (free positioning imaging) during displaying, instead of achieving distortionless imaging described in the above embodiment.

Figure 7B:
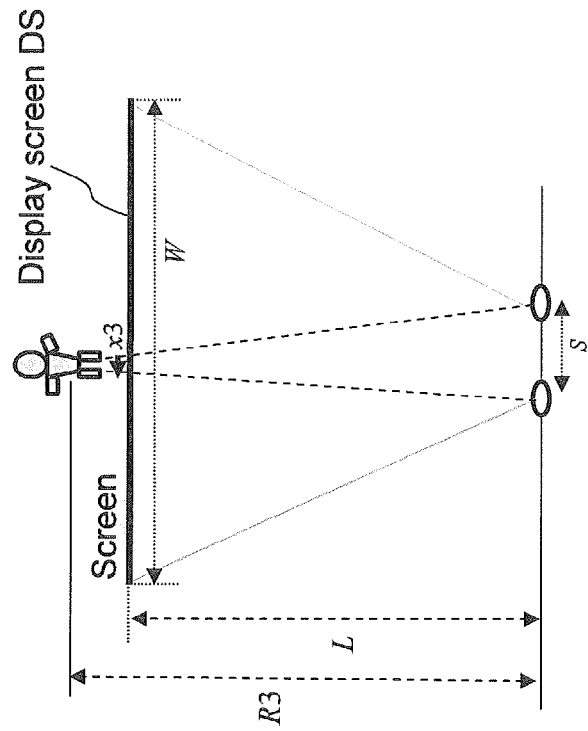
FIGS. 7A and 7B are diagrams describing the geometric relationship during imaging and during displaying according to a first modification of the first embodiment.
Figure 7A:
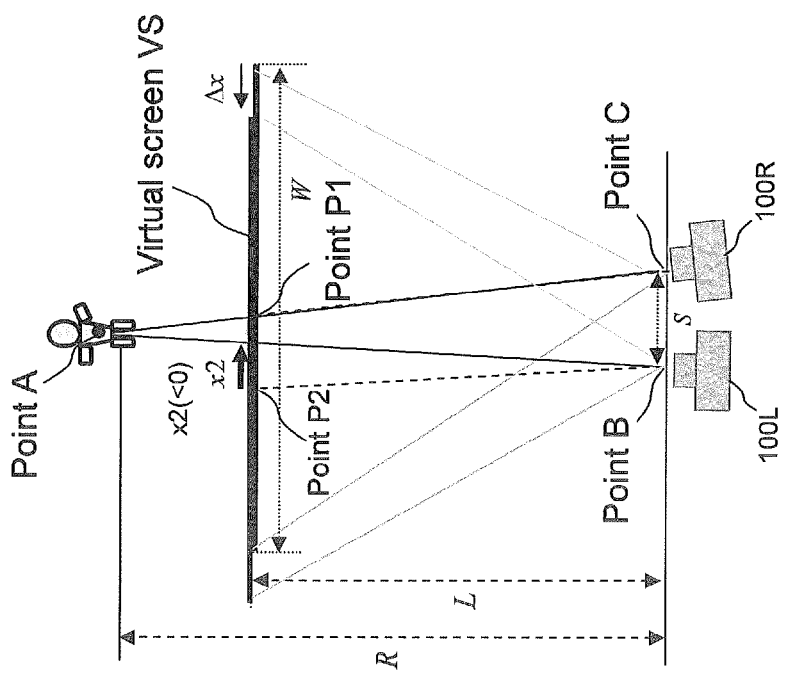

FIG. 7A schematically shows the arrangement during imaging. FIG. 7B schematically shows the arrangement during displaying in which a 3D image obtained through 3D imaging performed in the arrangement shown in FIG. 7A is displayed.

In the arrangement shown in FIG. 7A, the optical axes of the optical systems included in the 3D imaging device are shifted greatly. This arrangement is basically the same as the arrangement (shown in FIG. 5A) described in the above embodiment. The components of the 3D imaging device according to the present modification that are the same as the components in the above embodiment will not be described.

The 3D imaging device of the present modification has the same structure as the 3D imaging device 1000 according to the first embodiment.

Figure 8:
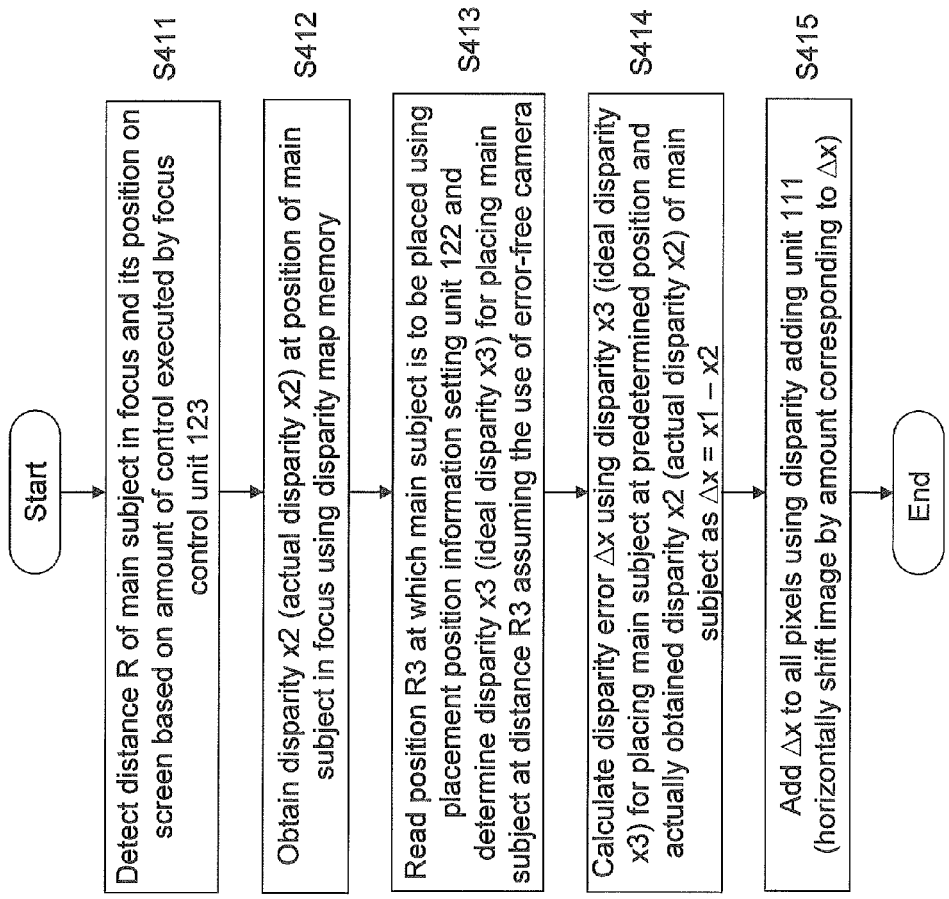
FIG. 8 is a flowchart illustrating disparity correction according to the first modification of the first embodiment.

A disparity correction method used in the present modification will now be described with reference to the flowchart shown in FIG. 8.

Step S411:

The control unit 110 detects the subject distance R of the main subject in focus based on the amount of control executed by the focus control unit 123, and detects an approximate position of the main subject in focused state on the screen (in the through-the-lens image (in the R-image and/or the L-image through the lens).

Step S412:

The main subject disparity detection unit 107 obtains the disparity x2 (the actual disparity x2) at the main subject position (for example blocks indicated by a bold line in FIG. 3) using the disparity map memory 181 (the disparity map memory 181 shown in FIG. 3), which is generated by the disparity detection unit 104

Step S413:

The control unit 110 reads a placement position R3 at which the main subject is to be placed in effective positioning from the placement position information setting unit 122, and calculates a disparity x3 (an ideal disparity x3) with which the main subject is placed at the distance R3 when the scene is assumed to be imaged using the camera (the 3D imaging device) without errors based on the geometric relationship (the positional relationship) shown in FIG. 7B. More specifically, the control unit 110 calculates the disparity x3 (the ideal disparity x3) using the formula below:

$$x3 = S \cdot \left(1 - \frac{L}{R3}\right)$$ Formula 2

Step S414:

The control unit 110 calculates a disparity error Δx using the disparity x3 (the ideal disparity x3) with which the main subject is placed at a predetermined position obtained in step S413 and the disparity x2 (the actual disparity x2) of the main subject actually obtained in step S412 using the formula below:

$$\Delta x = x3 - x2$$ Formula 3

Step S415:

In the formula, Δx is the disparity error caused by insufficient precision of the optical systems included in the 3D imaging device of the present modification. The disparities for all subjects including the main subject involve the same disparity error. The first disparity adding unit 111R and the second disparity adding unit 111L add the disparity error Δx, which serves as the correction error, to each of all pixels of the 3D image (horizontally shifts the R-image and the L-image by an amount corresponding to the correction disparity Δx).

The 3D imaging device according to the present modification uses the above disparity correction method to obtain a 3D image in which a subject can be placed at an intended distance without being affected by precision of the optical systems included in the 3D imaging device. Although the 3D imaging device of the present modification may obtain a 3D image in which a long-range view is less natural than in a 3D image obtained through distortionless imaging, the 3D imaging device of the present modification can place a main subject at an intended position in the 3D image, and enables subjects to be positioned freely as intended by a photographer.

When the distance R3 at which the main subject is to be placed is smaller than the distance R to the main subject, that is, when the main subject is to be placed in front of the actual position of the main subject, the 3D imaging device of the present modification may obtain a 3D image in which a long-range view is less natural than in a 3D image obtained through distortionless imaging. This is because the long-range view in the 3D image obtained by the 3D imaging device of the present modification is compressed too frontward. However, the 3D image obtained by the 3D imaging device of the present modification has compressed perspectives, and thus is easy to view.

In the 3D image obtained by the 3D imaging device of the present modification, a subject positioned in front of the main subject is placed at a significantly frontward position. This may emphasize the perspectives of the image, and may cause the image to be unnatural. The 3D imaging device of the present modification can be used without causing such problems for scenes that include few subjects positioned in front of the main subject. The 3D imaging device of the present modification can limit the range within which the main subject can be placed frontward in accordance with the disparity at the nearest point (the minimum disparity obtained by the minimum disparity detection unit 105) in the disparity map memory 181, which is generated by the disparity detection unit 104. The 3D imaging device of the present modification allows the photographer to freely place the main subject within the limited range, and enables the main subject to be placed frontward safely within the range in which no failures can occur in the image.

The 3D imaging device of the present modification may have an assist function for assisting a photographer by providing or displaying an alert using sound or a video when the image exceeds the limit over which its farthest point image area will be unnatural.

When the distance R3 at which the subject is to be placed is larger than the distance R to the subject, that is, when the main subject is to be placed behind the actual position of the main subject, a subject positioned behind the main subject will be placed at an extremely far position in the 3D image obtained by the 3D imaging device of the present modification. The resulting image can have exaggerated perspectives. Further, an image area corresponding to a subject positioned farther than at a predetermined distance can diverge backward (a phenomenon in which the image area is geometrically farther than infinity and cannot be fused and is viewed as a double image). However, the 3D imaging device of the present modification can be used without causing such problems for scenes that include few subjects positioned behind the main subject. The 3D imaging device of the present modification can limit the range within which the main subject can be placed backward in accordance with the disparity at the farthest point (the maximum disparity obtained by the maximum disparity detection unit 106) in the disparity map memory 181, which is generated by the disparity detection unit 104. The 3D imaging device of the present modification allows the photographer to freely place the main subject within the limited range, and enables the main subject to be placed backward safely within the range in which no failures can occur in the image.

The 3D imaging device of the present modification may have an assist function for assisting a photographer by providing or displaying an alert using sound or a video when the image exceeds the limit over which its farthest point image area will be unnatural.

Second Modification (Two-Shot Imaging)

A second modification of the present embodiment will now be described.

The 3D imaging device of the present modification performs 3D imaging through individual two shots performed manually using a still image camera.

Such two-shot imaging causes large errors in both the vertical and lateral directions. With this technique, a 3D image cannot be generated by solely using the camera. The two-shot imaging thus conventionally requires manual adjustment of the obtained 3D image using, for example, photo retouching software on a personal computer.

A vertical misalignment occurring between the captured images forming a 3D image can be estimated easily through visual observation, and thus can be corrected relatively easily.

However, a horizontal misalignment between the captured images occurring due to an error cannot be differentiated from a binocular disparity inherent in 3D imaging. Such a horizontal misalignment between the captured images may not be corrected even through manual adjustment. When, for example, the captured 3D image contains a long-range view that can be assumed to be at infinity, such as a view of mountains or a view of clouds, the long-range view subject can be determined to be at infinity, and the horizontal disparity can be adjusted manually based on the subject at infinity. For scenes containing no subject at infinity, however, the horizontal disparity cannot be adjusted correctly even through manual adjustment. In that case, the photographer is required to adjust the disparity toward an appropriate disparity by repeatedly displaying the 3D image and trying to adjust the disparity.

The 3D imaging device of the present modification enables appropriate disparity correction for any scenes including a main subject.

Figure 11:
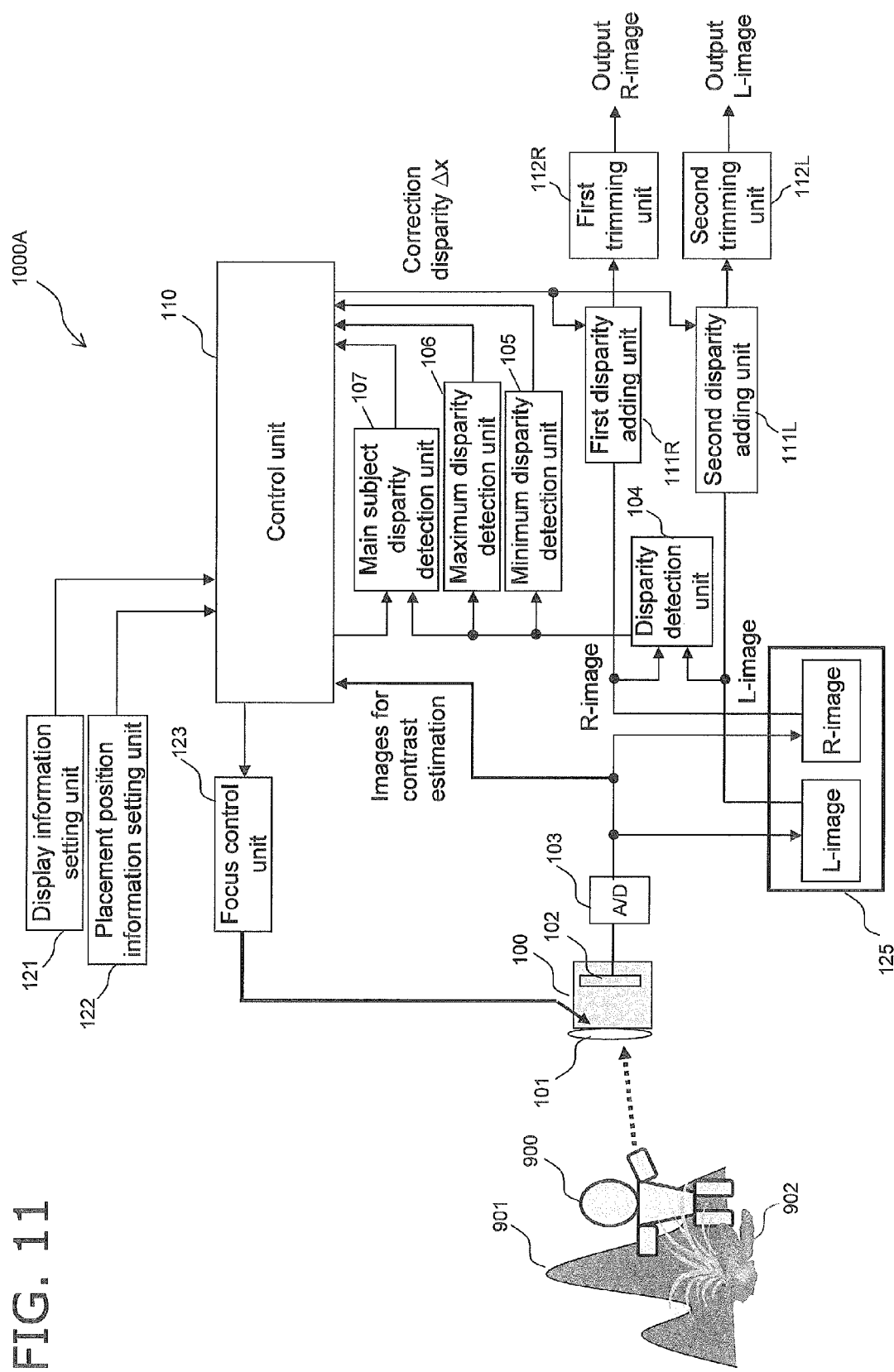
FIG. 11 is a block diagram showing a 3D imaging device according to a second modification of the first embodiment.

FIG. 11 schematically shows the structure of a 3D imaging device 1000A according to the present modification.

The 3D imaging device 1000A of the present modification is a single-lens camera that captures a 3D image through two individual shots performed using a single optical system, whereas the 3D imaging device 1000 according to the first embodiment shown in FIG. 1 is a twin-lens camera including two optical systems and two signal processing systems.

The 3D imaging device 1000A, which is a still image camera including a single lens, enables 3D imaging using two individual shots. The differences of the 3D imaging device 1000A from the 3D imaging device 1000 of the first embodiment, or from the twin-lens camera, will now be described.

The 3D imaging device 1000A does not include the convergence control unit 124, and additionally includes an image memory unit 125.

The 3D imaging device 1000A, which is a single-lens camera, includes a single imaging unit 100 (an optical system 101 and an image sensor 102) and a single A/D conversion unit 103.

The user of the 3D imaging device 1000A follows an imaging procedure that is displayed on a display unit, which functions as an user interface (not shown) of the device.

The imaging unit 100 is identical to the first imaging unit 100R (or the second imaging unit 100L).

The A/D conversion unit 103 is identical to the first A/D conversion unit 103R (or the second A/D conversion unit 103L).

The image memory unit 125 stores an R-image or an L-image obtained by the imaging unit 100 and converted through A/D conversion by the A/D conversion unit 103. The image memory unit 125 outputs the R-image stored in it to the disparity detection unit 104 and the first disparity adding unit 111R at a predetermined timing in accordance with a command from the control unit. The image memory unit 125 also outputs the L-image stored in it to the disparity detection unit 104 and the second disparity adding unit 111L at a predetermined timing in accordance with a command from the control unit.

Figure 12:
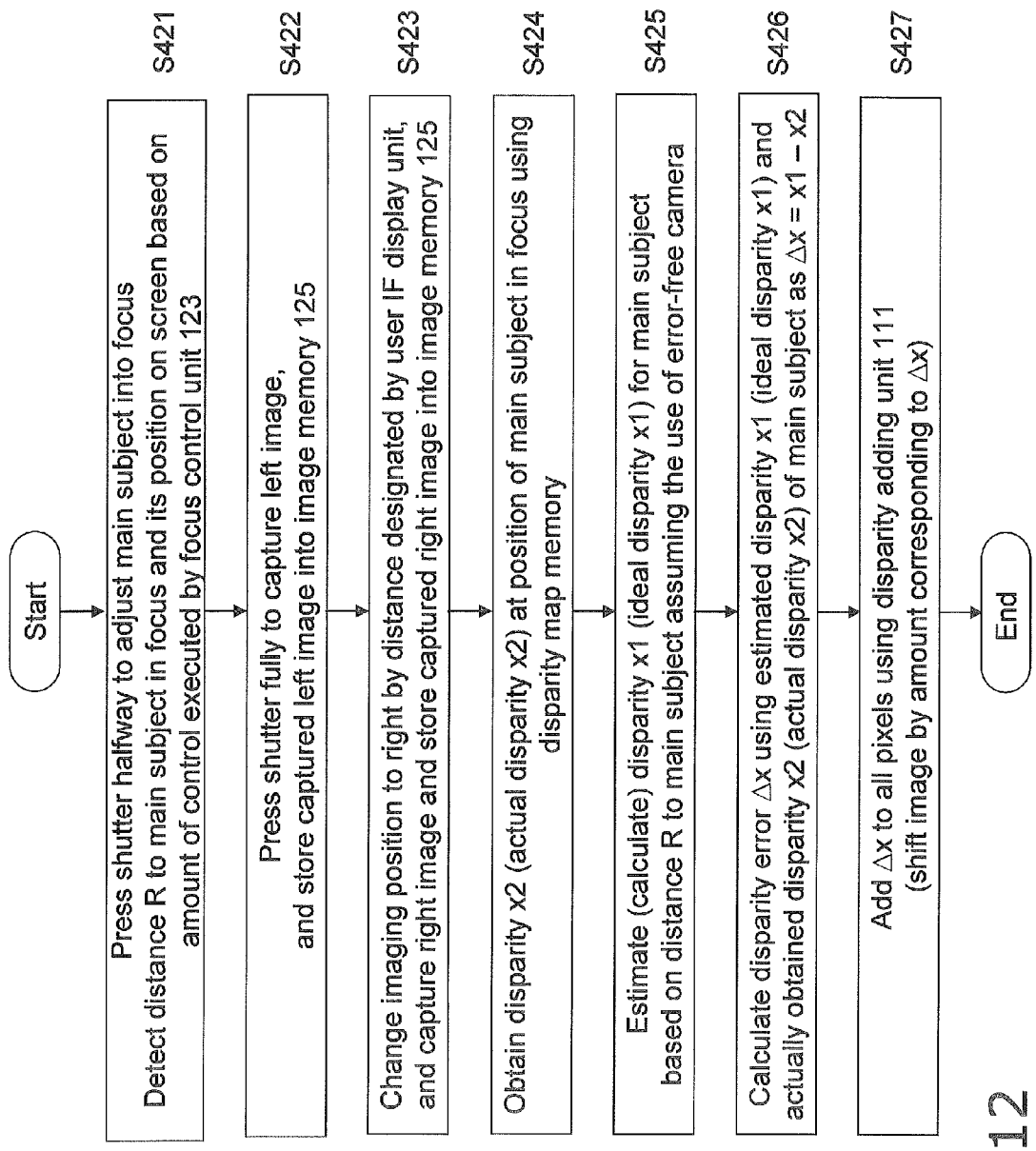
FIG. 12 is a flowchart illustrating disparity correction according to the second modification of the first embodiment.

The 3D imaging performed through two individual shots using the 3D imaging device 1000A will now be described with reference to the flowchart shown in FIG. 12.

Step S421:

In accordance with an instruction provided from the user IF display unit, the user presses the shutter halfway. This adjusts the main subject into focus. The control unit 110 detects the subject distance R of the main subject in focus based on the amount of control executed by the focus control unit 123, and detects an approximate position of the main subject in focused state on the screen (or in the through-the-lens image).

Step S422:

The user then presses the shutter fully (changing from the half-pressed to fully-pressed state) to capture a left eye image (L-image). The captured left eye image (L-image) is stored into the image memory unit 125.

Step S423:

The user changes the imaging position to the right by a distance instructed by the user IF display unit, and then operates the 3D imaging device 1000A to capture a right eye image (R-image). The captured right eye image (R-image) is then stored into the image memory unit 125.

Step S424:

The main subject disparity detection unit 107 obtains the disparity x2 (the actual disparity x2) at the position of the main subject in focus (for example blocks indicated by a bold line in FIG. 3) using the disparity map memory 181 (the disparity map memory 181 shown in FIG. 3), which is generated by the disparity detection unit 104.

Step S425:

The control unit 110 estimates (calculates) the disparity x1 (the ideal disparity x1) to be achieved by the main subject using the distance R to the main subject.

Step S426:

The control unit 110 calculates the disparity error Δx from the disparity x1 (the ideal disparity x1) estimated in step S425 and the disparity x2 (the actual disparity x2) of the main subject actually obtained in step S424 using the formula below:

$$\Delta x = x1 - x2 \qquad \text{Formula 4}$$

Step S427:

In the formula, Δx indicates the disparity error caused by insufficient precision of the optical systems included in the 3D imaging device 1000A. The disparities for all subjects including the main subject involve the same disparity error. The first disparity adding unit 111R and the second disparity adding unit 111L add the disparity error Δx, which serves as the correction error, to each of all pixels of the 3D image (horizontally shifts the R-image and the L-image by an amount corresponding to the correction disparity Δx).

The 3D imaging device 1000A uses the above disparity correction method to obtain a 3D image having an ideal disparity after the disparity correction. In other words, the 3D image that has been subjected to the disparity correction is substantially equivalent to a 3D image obtained through distortionless imaging.

As described above, the 3D imaging device 1000A using the above disparity correction method can achieve the same disparity as the disparity achieved by the ideal optical systems shown in FIG. 4A, and enables 3D imaging equivalent to distortionless imaging.

Further, the 3D imaging device 1000A calculates the ideal disparity x1 based on the main subject. For any scenes including a main subject, the 3D imaging device 1000A using the above disparity correction method can obtain a 3D image that has been subjected to appropriate disparity correction.

The present modification has effective applications. Although the present modification describes the case in which the 3D imaging device achieves 3D imaging equivalent to distortionless imaging, the present modification should not be limited to this application. For example, the 3D imaging device 1000A of the present modification can perform 3D imaging enabling effective positioning of a main subject by using the same processing as described in the first modification.

Although the 3D imaging device 1000A of the present modification can also involve a large vertical error in 3D imaging, the vertical error (the amount of misalignment) can be detected and corrected easily through disparity matching. The 3D imaging device 1000A of the present modification can thus obtain a highly precise 3D image.

Third Modification (Application to Single-Lens 3D Camera)

A third modification of the present embodiment will now be described.

With another conventional technique for 3D imaging using a single-lens 3D camera, two images forming a 3D image (a left eye image and a right eye image) are captured through two individual shots taken with the left half and the right half of the single lens each of which is substantially covered during imaging. With this technique, 3D imaging is performed with a relatively short base-line length (imaging SB).

In the 3D image captured with this conventional single-lens 3D camera, areas of a left eye image (L-image) and a right eye image (R-image) corresponding to a main subject in focus are identical to each other. In this 3D image, the main subject is placed on the virtual screen, a subject positioned behind the main subject is placed behind the virtual screen and is blurred, and a subject positioned in front of the main subject is placed in front of the virtual screen and is blurred. Although this conventional technique for 3D imaging requires the single-lens 3D camera to include a lens having a large aperture to enable such significant blurring of the subjects in front of and behind the virtual screen, this technique is advantageous in that it allows easy 3D imaging.

With this conventional technique for 3D imaging using the single-lens 3D camera, the main subject in focus is automatically placed on the virtual screen. Although this characteristic of the technique allows a less-experienced photographer to perform 3D imaging easily, this technique can neither achieve distortionless imaging nor free positioning (placing the main subject at an intended position) described above.

To enable a single-lens 3D camera having the same structure as above to obtain a 3D image through distortionless imaging or through free positioning imaging, the present modification uses a method for adding a predetermined disparity to a 3D image obtained by the single-lens 3D camera.

Although not shown, the components of the 3D imaging device according to the present modification (including the same optical system and the same imaging unit as the single-lens 3D camera described above and including the other components that are the same as the corresponding components of the 3D imaging device 1000) are given the same numerals and have the same functions as the corresponding components shown FIG. 1.

The 3D image obtaining method according to the present modification will now be described with reference to FIGS. 9A and 9B and FIG. 10.

Figure 9B:
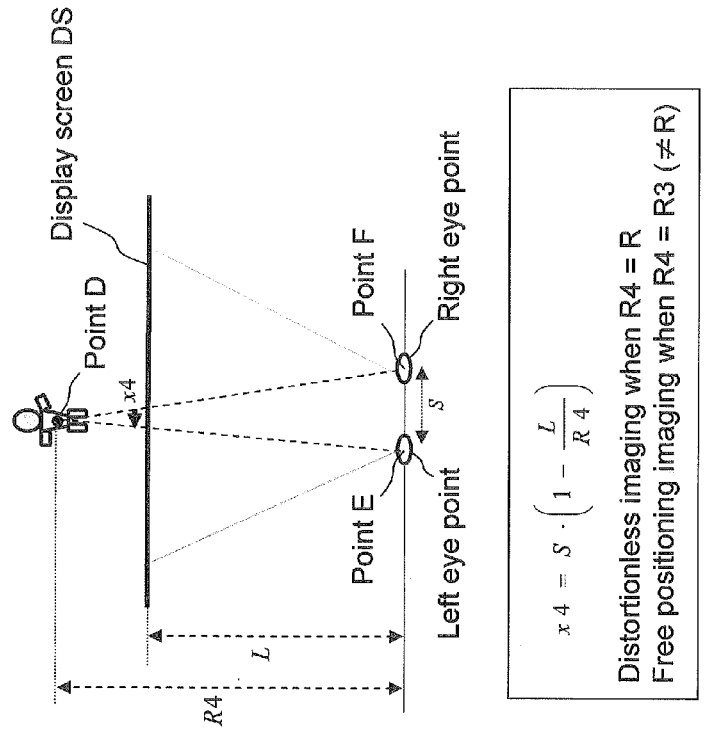
FIGS. 9A and 9B are diagrams describing the geometric relationship (positional relationship) between the components during imaging and during displaying according to a third modification of the first embodiment.
Figure 9A:
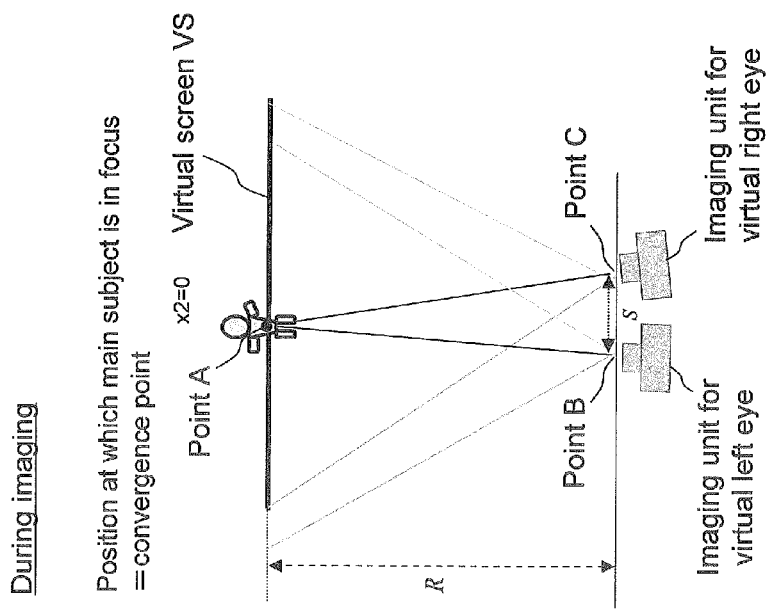

FIGS. 9A and 9B show the geometric relationship (the positional relationship) between the components during imaging and during displaying according to the present modification.

Figure 10:
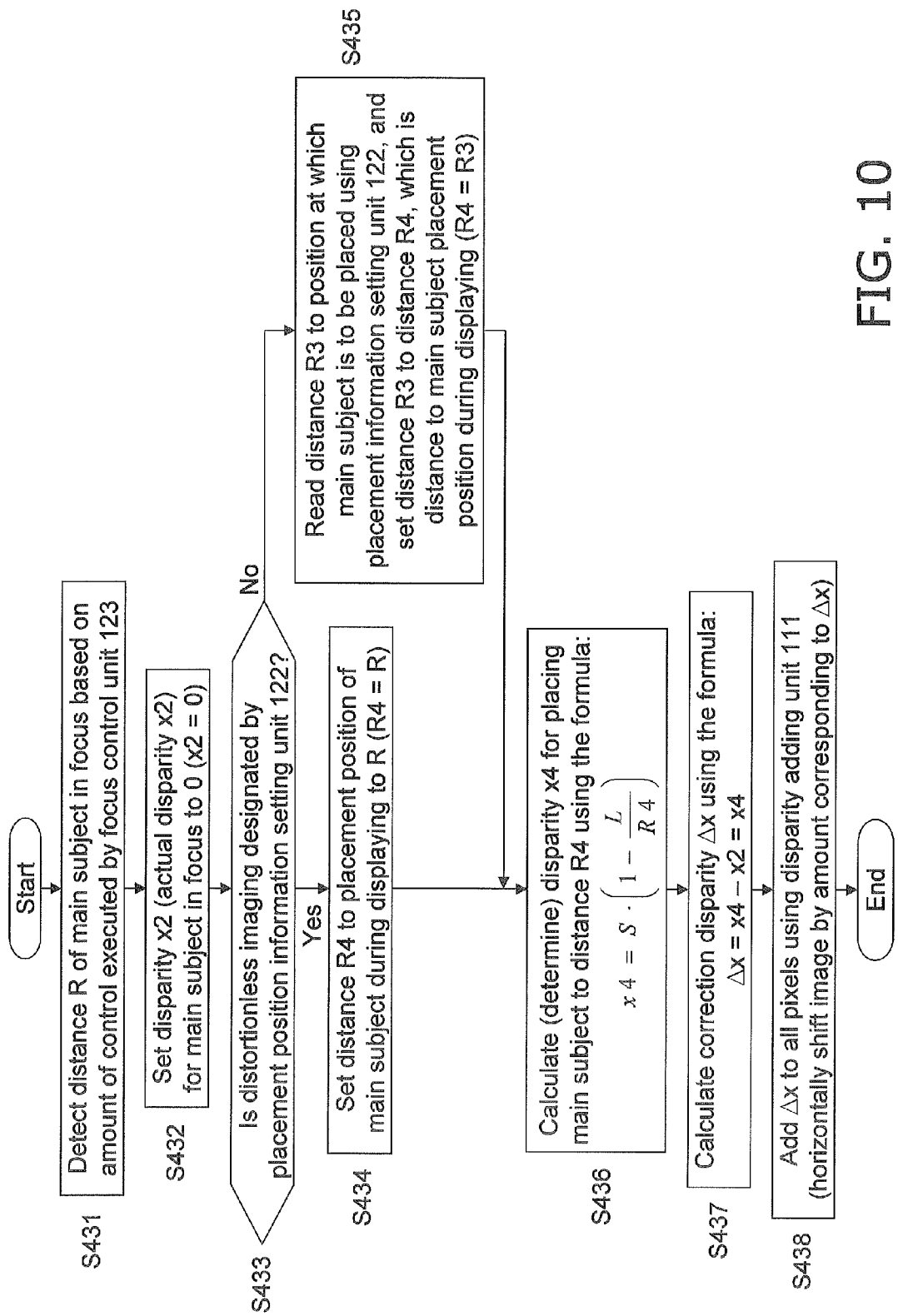
FIG. 10 is a flowchart illustrating the processing corresponding to a 3D image obtaining method (a disparity correction method) used by the 3D imaging device according to the third modification of the first embodiment.

FIG. 10 is a flowchart showing the processing corresponding to the 3D image obtaining method (the disparity correction method) used by the 3D imaging device according to the present modification.

The processing will now be described with reference to the flowchart shown in FIG. 10.

Step S431:
The control unit 110 calculates the subject distance R of the main subject in focus based on the amount of control executed by the focus control unit 123.

Step S432:
The 3D imaging device of the present modification places the main subject on the virtual screen VS. The point of convergence matches the position at which the main subject is placed. In this case, the disparity for the main subject in focus is zero. As a result, the actual disparity x2 is zero. The control unit 110 sets the disparity x2 as x2=0.

Step S433:
The placement position information setting unit 122 determines whether distortionless imaging has been designated.

Step S434:
When distortionless imaging has been designated by the placement position information setting unit 122, the control unit 110 sets the distance R4 to the placement position of the main subject (the distance R4 from a line segment connecting the left eye point to the right eye point to the placement position of the main subject) to the distance R. In other words, the control unit 110 sets the distance R4 as R4=R.

Step S435:
When distortionless imaging has not been designated by the placement position information setting unit 122, the control unit 110 reads the distance R3 to the placement position at which the main subject is to be placed in effective positioning from the placement position information setting unit 122, and sets the distance R4 to R3. In other words, the control unit 110 sets the distance R4 as R4=R3.

Step S436:
The control unit 110 determines the disparity x4 with which the main subject is placed at the distance R4 in the 3D imaging device of the present modification using the formula below:

$$x4 = S \cdot \left(1 - \frac{L}{R4}\right) \qquad \text{Formula 5}$$

(For distortionless imaging, R4=R)
(For free positioning imaging, R4=R3)
Step S434:
The control unit 110 calculates the correction disparity Δx using the formula below:

$$\Delta x = x4 - x2 \qquad \text{Formula 6}$$

The disparity x2 for the main subject is 0. Thus, Δx=x4−x2=x4. As a result, the correction disparity Δx matches the disparity x4 with which the main subject is placed at the distance R4.

Step S435:

The correction disparity Δx is a difference between the set disparity and the disparity for the placement determined in principle in the 3D imaging device of the present embodiment (the single-lens 3D camera). Thus, all the subjects including the main subject need the same correction disparity. The first disparity adding unit 111R and the second disparity adding unit 111L add the correction disparity Δx to all pixels of the 3D image captured by the imaging unit included in the 3D imaging device according to the present modification (horizontally shifts the R-image and the L-image by an amount corresponding to the correction disparity Δx).

The 3D imaging device of the present modification sets the distance R4 as R4=R to obtain a 3D image equivalent to a 3D image obtained through distortionless imaging. When R4=R, a triangle ABC shown in FIG. 9A is congruent with a triangle DEF shown in FIG. 9B. The 3D imaging device of the present modification can thus obtain a 3D image equivalent to a 3D image obtained through distortionless imaging when the virtual screen and the display screen fail to match each other.

The 3D imaging device of the present modification further sets the distance R4 as R4=R3 to obtain a 3D image equivalent to a 3D image obtained through free positioning imaging (3D imaging for obtaining a 3D image in which a main subject is placed at an intended position).

As described above, the modification enables the single-lens 3D camera to perform distortionless imaging and effective positioning including placing a main subject at a freely selected position.

Although the above embodiment and the modifications of the above embodiment each describe the operation for physically changing the convergence angle of the optical system(s) using the convergence control unit 124, the present invention should not be limited to this structure. In 3D imaging devices, changing the convergence angle is approximately equivalent to electrically changing the disparity, such as adding the disparity in a 3D image (optical shifting is equivalent to electrical shifting).

The convergence control described in the above embodiment and the modifications of the above embodiment may be achieved by electrical processing equivalent to the convergence control. For example, (1) the processing corresponding to the convergence control may be performed by electrically adding the disparity instead of physically providing the convergence, or (2) the processing corresponding to the convergence control may be performed using fixed convergence (using a fixed convergence angle) provided through electrical processing (processing for electrically adding the disparity) equivalent to the convergence control executed by the convergence control unit 124.

In the processing (1) and the processing (2), the first disparity adding unit 111R and the second disparity adding unit 111L may further add disparities that are expected to occur through the processing (1) and the processing (2).

Only one of the first disparity adding unit 111R and the second disparity adding unit 111L may add the correction disparity to the corresponding one of the left image (L-image) and the right image (R-image). Alternatively, each of the first disparity adding unit 111R and the second disparity adding unit 111L may add a different disparity to the corresponding one of the left image (L-image) and the right image (R-image) in a balanced manner to achieve the disparity correction. In this case, the first disparity adding unit 111R and the second disparity adding unit 111L are required to add disparities to the left image (L-image) and the right image (R-image) with the opposite polarities.

The misalignment occurring between the two captured images due to insufficient precision of the optical system or due to errors in two-shot imaging includes a vertical misalignment, a lateral (horizontal) misalignment, and a rotational misalignment. The vertical misalignment and the rotational misalignment can be detected and corrected to satisfy a required precision by using a matching technique. The 3D imaging device of the above embodiment and the modifications of the above embodiment may also use the matching technique to detect and correct such vertical and rotational disparities. The lateral misalignment includes a disparity inherent in 3D imaging. Normal matching performed with the matching technique thus fails to differentiate the lateral misalignment from a disparity inherent in 3D imaging. Thus, the lateral misalignment cannot be detected and corrected in an appropriate manner with the matching technique.

The rotational misalignment can be substantially corrected through average matching between the captured images forming a 3D image on the entire screen. The 3D imaging device may thus use matching to correct the rotational misalignment.

For ease of explanation, the above embodiment and the modifications of the above embodiment describe the case in which the imaging SB (the base-line length) is set equal to the interval between the two eyes of a human. However, the present invention should not be limited to this structure. Referring now to FIGS. 4A and 4B, the convergence should be set in a manner to move the virtual screen toward the cameras with the same ratio when the imaging stereo base is narrower than the interval between the two eyes. This enables the triangle formed during imaging (for example, the triangle ABC shown in FIG. 4A) to be similar to the triangle that will be formed during displaying. The 3D imaging device of the above embodiment and the modifications of the above embodiment performs 3D imaging in this arrangement to enable distortionless imaging. In this case, the 3D imaging device can perform effective positioning in which the main subject is placed at a position that is distant by the inverse of the above ratio (corresponding to the ratio of similarity of the triangles). More specifically, the 3D imaging device of the above embodiment and the modifications of the above embodiment enables effective positioning including placing a subject at a near or at a far position (effective positioning including placing the main subject at a far or near position) based on the positioning of the virtual screen determined in accordance with the set imaging SB. More specifically, when the imaging SB is set smaller, the virtual screen moves forward at the same ratio (the ratio by which the imaging SB is set smaller). When the imaging SB is set larger, the virtual screen moves backward at the same ratio (the ratio by which the imaging SB is set larger)

Further, the 3D imaging device that can change the imaging SB can obtain an appropriate 3D image by additionally changing these imaging parameters (the imaging parameters for adjusting the imaging SB). More specifically, when the main subject is a macroscopic object in a short-range view, the 3D imaging device may decrease the imaging SB. As a result, the 3D imaging device can capture a 3D image that is natural and easy to view. For a long-range view extending in a wide range, such as a view of skyscrapers to be imaged from the rooftop, the 3D imaging device may increase the imaging SB. As a result, the 3D imaging device can capture an image (3D image) that has an appropriate 3D effect.

Further, when the 3D imaging device can change the zoom ratio, the 3D imaging device can perform distortionless imaging and effective positioning imaging (free positioning imaging) in accordance with the set zoom ratio.

For ease of explanation, the above embodiment and the modifications of the above embodiment describe the case in which the 3D imaging device uses the imaging SB set equal to the interval between the two eyes and the device does not use zooming with reference to FIGS. 4A and 4B, 5A and 5B, and 6A and 6B, the present invention should not be limited to this structure. The 3D imaging device of the present invention may use the imaging SB set unequal to the interval between the two eyes and/or may use zooming. In this case, the 3D imaging device of the present invention is only required to set the imaging parameters associated with the imaging SB and/or zooming in performing 3D imaging.

In the above embodiment and the modifications of the above embodiment, the maximized contrast of the image is used (the contrast detection method) to obtain the distance to the main subject based on the focused state of the main subject. However, the present invention should not be limited to this method. The distance to the main subject may be obtained by triangulation using the phase difference or by, for example, the time of flight (TOF) method using the traveling time of light or the traveling time of the ultrasound reflection. Such other methods for detecting the distance may be used to detect the distance to the main subject in the above embodiment and the modifications of the above embodiment.

Second Embodiment

A second embodiment of the present invention will now be described with reference to the drawings.

The second embodiment describes a 3D imaging device and a 3D imaging method for determining whether a scene imaged by the 3D imaging device can be perceived three-dimensionally by humans and adjusting the image accordingly.

Figure 13:
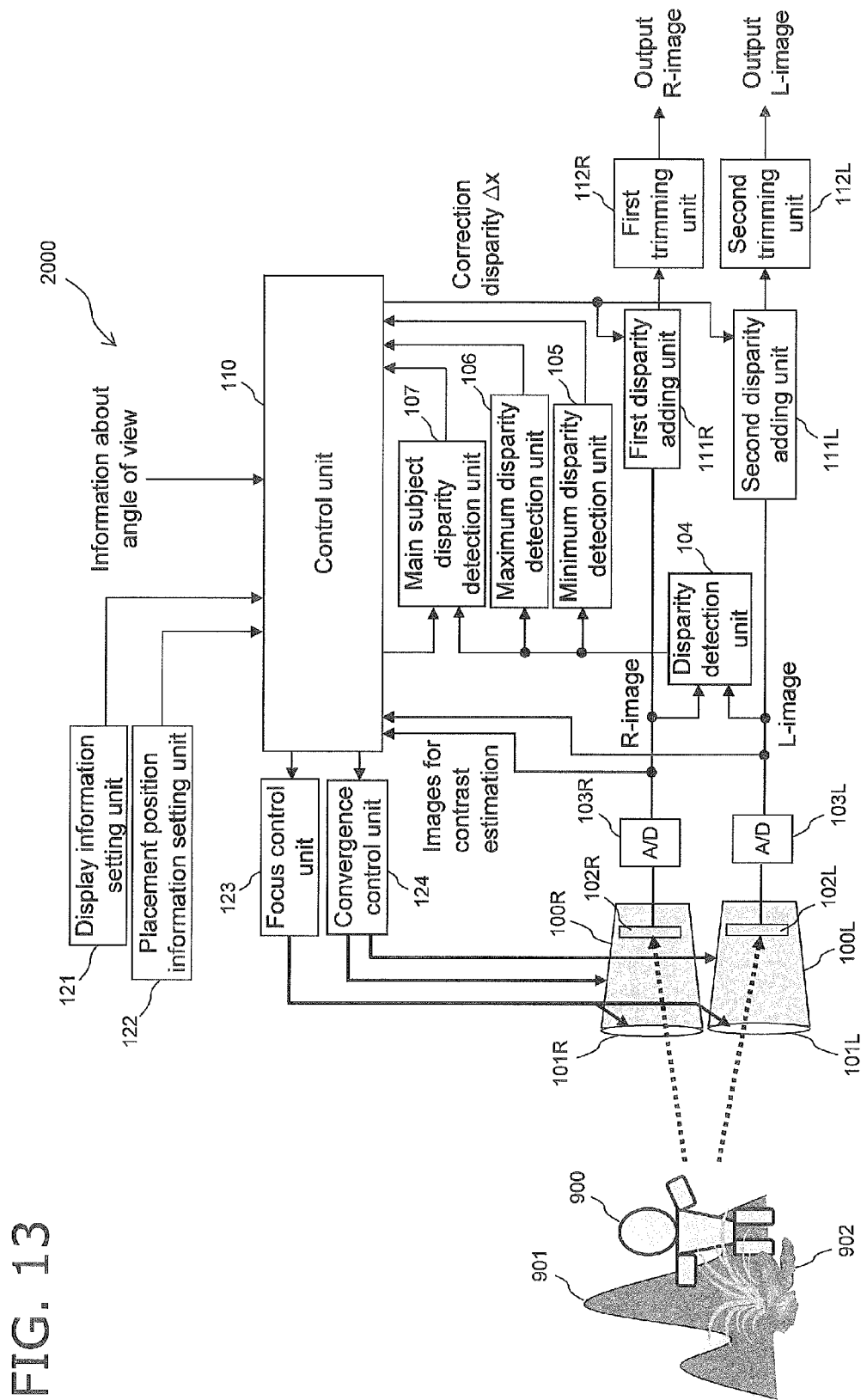
FIG. 13 is a block diagram showing a 3D imaging device according to a second embodiment of the present invention.

FIG. 13 schematically shows the structure of a 3D imaging device 2000 according to the second embodiment.

As shown in FIG. 13, the 3D imaging device 2000 of the present embodiment has basically the same structure as the 3D imaging device 1000 of the first embodiment. The 3D imaging device 2000 of the present embodiment differs from the 3D imaging device of the first embodiment in the processing performed by the control unit 110.

The components of the 3D imaging device of the present embodiment that are the same as the components described in the first embodiment are given the same reference numerals as those components, and will not be described in detail.

2.1 Three-Dimensional (3D) Viewing Enabling Conditions (Fusion Enabling Conditions)

It is known that images may not be fused when the absolute value of the disparity between the images is large. This phenomenon is associated with an area definition called Panum's fusional area. Panum's fusional area can be used to determine the limit (range) within which an object positioned at or around the converging position (at the point of convergence) can be fused based on the disparity angle. The disparity angle shows a positive value when the object is in front of the screen, whereas the disparity angle shows a negative value when the object is behind the screen. It is generally known that a 3D image (3D video) can be fused by a human in an area (range) defined by ±1 degrees of the disparity angle corresponding to the point of convergence (convergence angle).

When the scene being imaged includes a group of subjects arranged within a narrow depth (a narrow range in front of and behind the virtual screen), the captured images will have a small disparity and can be fused easily or in other words can be easy to view. However, when the imaged scene includes a long-range view and a short-range view having a large difference between them, the captured images may not be fused easily.

This phenomenon will now be described in more detail with reference to FIG. 18.

Figure 18:
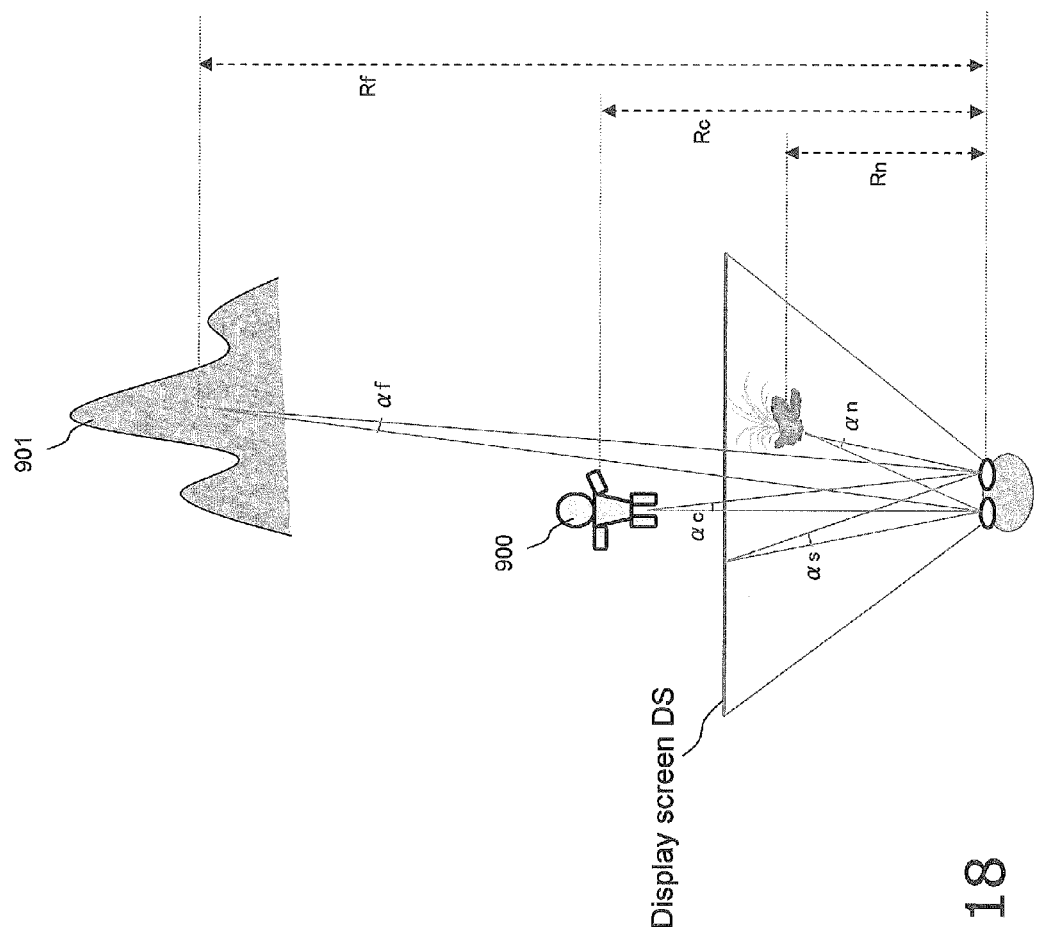
FIG. 18 is a diagram describing the relationship between the screen size and the viewing distance in 3D viewing.

FIG. 18 is a diagram describing the disparity angle occurring when the image of the same scene as the scene shown in FIG. 3 is displayed on the display.

The angle $\alpha s$ is the convergence angle. In FIG. 18, the optical axes corresponding to the two eyes intersect with each other on the virtual screen VS. In this state, an object positioned at the same distance as the distance at which the virtual screen VS is arranged (an object positioned on the virtual screen VS) has a zero disparity between the left and right images. When the captured images forming a 3D image of this object (subject) are viewed, the left and right images of this object match (the object is placed on the display screen) without causing the object (subject) image to be viewed as a double image. During viewing, the object (subject) is perceived as if it is placed on the display screen. In FIG. 18, $\alpha f$ is a disparity angle of a mountain view ($\alpha f < \alpha s$), which is at the farthest point in this scene, and $\alpha n$ is a disparity angle of a plant view ($\alpha n > \alpha s$), which is at the nearest point in this scene.

Assuming that the fusional range determined by Panum's fusional area described above is $\delta$, the long-range view will be fused and will be viewed three-dimensionally when the condition $|\alpha f - \alpha s| < \delta$ is satisfied. In the same manner, the short-range view can be fused when the condition $|\alpha n - \alpha s| < \delta$ is satisfied.

In the manner as described above, the 3D imaging device can determine whether the images captured through 3D imaging will be viewed as a 3D image only when the captured images are actually displayed on the display (the display screen). Although the 3D imaging device can easily determine whether the captured images will be viewed as a 3D image using the above conventional method during displaying, the 3D imaging device cannot determine this correctly at the time of imaging.

Figure 14B:
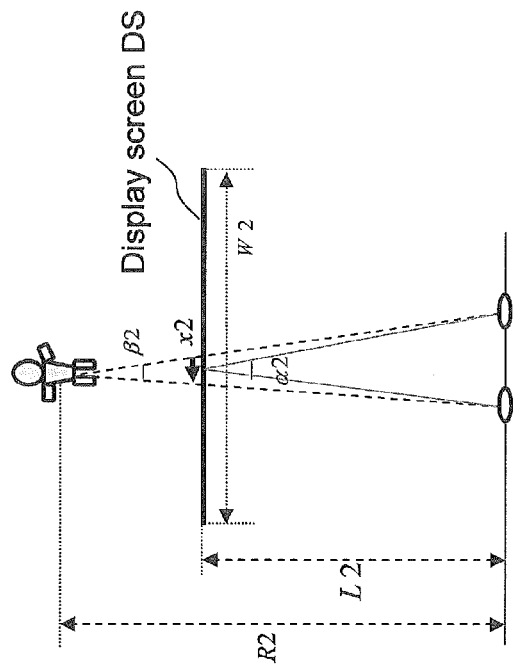
FIGS. 14A and 14B are diagrams describing the geometric relationship during imaging and during displaying according to the second embodiment.
Figure 14A:
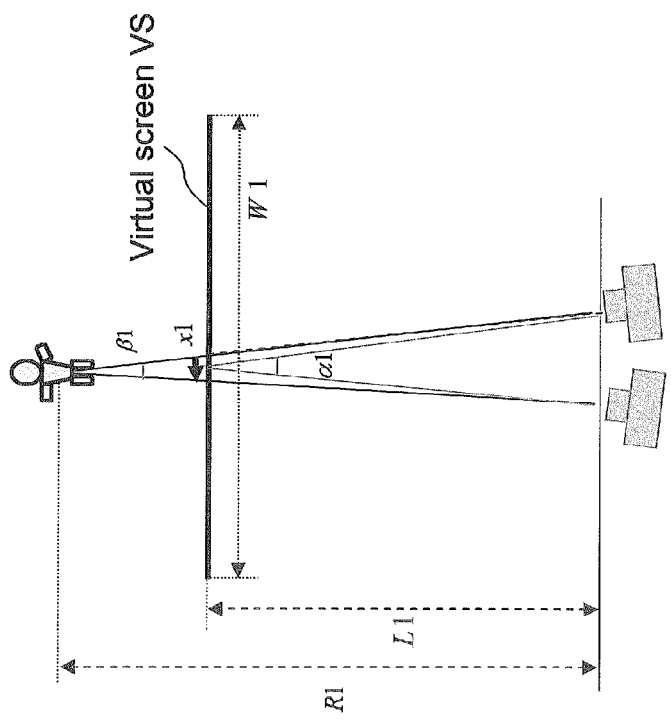

FIGS. 14A and 14B are diagrams describing the geometric conditions occurring between the imaging components (the subject, the virtual screen, and the left and right eye points (imaging points)) during more typical imaging involving distortion and the displaying components (the subject, the display screen, and the left and right eye points) during displaying of the images captured through such typical imaging. This differs from FIGS. 4A and 4B showing the geometric conditions occurring during distortionless imaging in which the imaging components during imaging and the displaying components during displaying are geometrically equal to each other.

FIG. 14A shows the arrangement during imaging. As shown in FIG. 14A, the screen having a width W1 (the virtual screen VS) is placed at a distance L1 from the base line (the line connecting the imaging point for a left eye image and the imaging point for a right eye image). The convergence angle $\alpha 1$ is formed on the virtual screen VS. When a subject positioned at a distance R1 from the base line has a disparity angle $\beta 1$, a disparity x1 occurs on the virtual screen VS.

The disparity x1 can be calculated by the formula below:

$$x1 = L1 * (\alpha 1 - \beta 1)$$

The above formula yields an approximate solution. More precisely, the disparity x1 can be calculated by the formula below:

$$x1 = 2*L1*(\tan(\alpha1/2) - \tan(\beta1/2))$$

Because the values α1 and β1 are small, the approximation given below can be performed:

$$\tan(\alpha1) = \alpha1$$

$$\tan(\beta1) = \beta1$$

Thus, the disparity x1 can be calculated by approximation using the formula below:

$$x1 = L1*(\alpha1 - \beta1)$$

FIG. 14B shows the arrangement during displaying. As shown in FIG. 14B, the display having a width W2 (the display screen DS) is viewed at a distance L2 from the base line (the line connecting the right eye point and the left eye point) during displaying. The disparity x2 can be calculated by the formula below:

$$x2 = L2*(\alpha2 - \beta2)$$

When the size W1 of the virtual screen VS and the size W2 of the display screen DS are different, the disparity of the displayed images can also change depending on the ratio of the two screen sizes. In this case, the disparity x2 is calculated by the formula below:

$$x2 = W2/W1 * x1$$

As a result, the relative disparity angle (α2−β2) that can determine whether the images can be fused is calculated by the formula below:

$$(\alpha2 - \beta2) = (W2/W1)*(L1/L2)*(\alpha1 - \beta1)$$

When the 3D imaging device performs zoom imaging (not shown), the relative disparity angle (α2−β2) is calculated using the formula below, in which z is the zoom ratio:

$$(\alpha2 - \beta2) = z*(W2/W1)*(L1/L2)*(\alpha1 - \beta1)$$

When the disparity adjustment is performed by shifting the images during displaying (not shown), the relative disparity angle (α2−β2) is calculated using the formula below, in which Δα is an angle indicating the disparity adjustment amount:

$$(\alpha2 - \beta2) = z*(W2/X1)*(L1/L2)*(\alpha1 - \beta1) - \Delta\alpha$$

In this manner, many imaging parameters, display parameters, and adjustment parameters affect the actual images that are displayed during displaying after they are captured during imaging.

The left side of each of the above formulas represents the relative disparity angle, which directly determines whether the images can be fused. When the relative disparity angle fails to fall within the range of ±1 degrees, the images cannot be fused and cannot be viewed as a 3D image and perceived as a double image. When the relative disparity angle is within the range of ±0.5 degrees, the images can be fused relatively easily into a 3D image that is easy to view.

When this fusional range (the relative disparity angle range of ±0.5 degrees or the relative disparity angle range of ±1 degrees) is δ, $$|\alpha1 - \beta2| < \delta, \text{ and}$$

$$|z*(W2/W1)*(L1/L2)*(\alpha1 - \beta1) - \Delta\alpha| < \delta.$$

This shows that a subject that falls within the range determined by formula 7 below (the subject having the disparity angle β1 satisfying the formula) can be fused.

$$(1/z)*(W1/W2)*(L2/L1)*(-\delta + \Delta\alpha) < (\alpha1 - \beta1) < (1/z)*(W1/W2)*(L2/L1)*(\delta + \Delta\alpha) \quad \text{Formula 7}$$

2.2 Three-Dimensional (3D) Perception Determination Process Performed During Imaging Based on the above conditions, a process for determining during imaging whether the captured images can be perceived three-dimensionally (a 3D perception determination process) performed by the 3D imaging device 2000 of the present embodiment during imaging will now be described.

Figure 15:
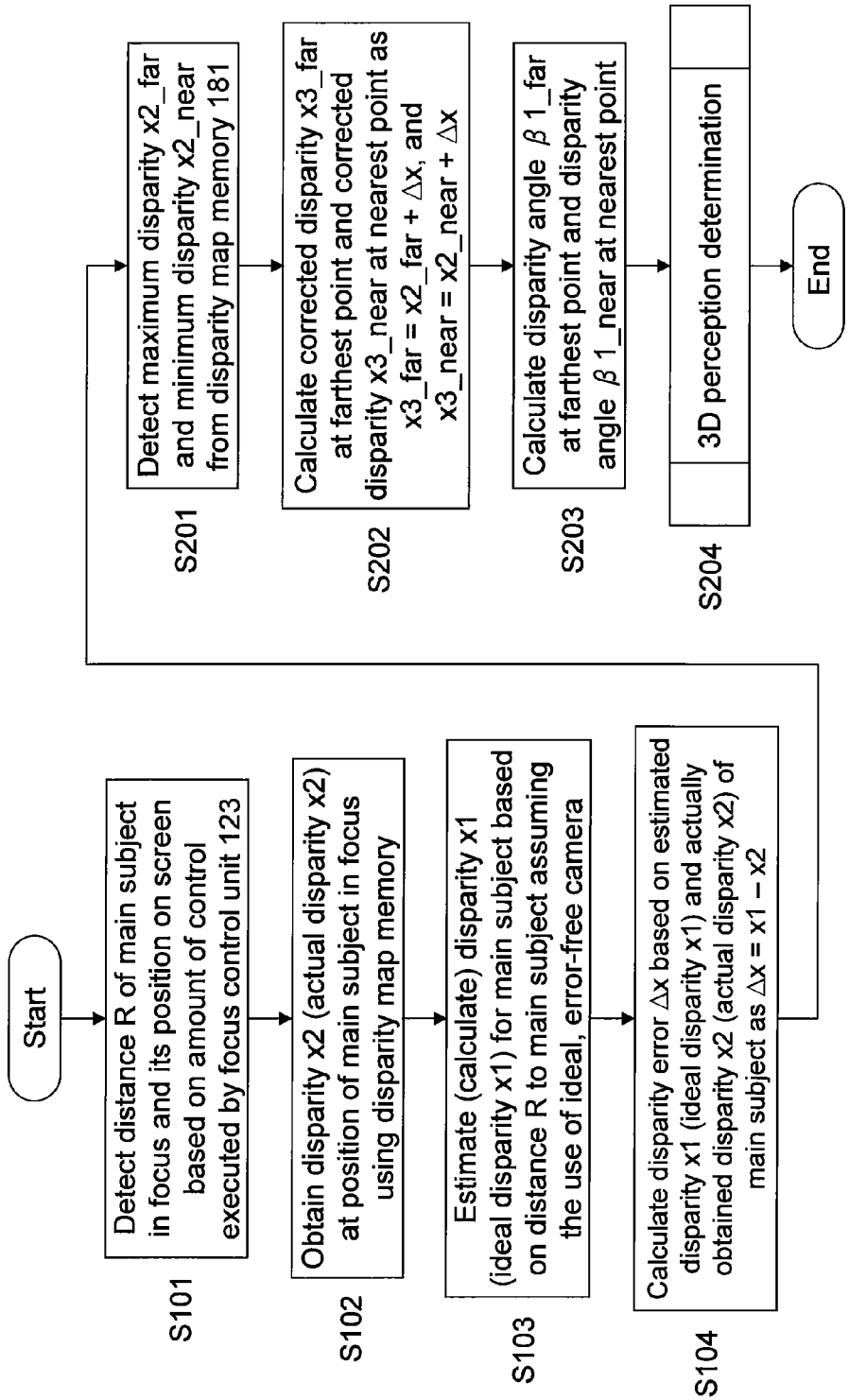
FIG. 15 is a flowchart illustrating a 3D perception determination process performed during imaging for determining whether an image will be viewed three-dimensionally.

FIG. 15 is a flowchart illustrating the 3D perception determination process performed during imaging.

The preparations for the 3D perception determination process performed by the 3D imaging device 2000 during imaging will first be described with reference to the flowchart of FIG. 15.

S101 to S104:

The 3D imaging device 2000 calculates the correction disparity Δx through the same processing as the processing described in the first embodiment.

S201:

The minimum disparity detection unit 105 detects the minimum disparity x2_near from the disparity map memory 181, which is generated by the disparity detection unit 104. The minimum disparity x2_near corresponds to the disparity at the nearest point.

The maximum disparity detection unit 106 detects the maximum disparity x2_far from the disparity map memory 181, which is generated by the disparity detection unit 104. The maximum disparity x2_far corresponds to the disparity at the farthest point.

S202:

The control unit 110 calculates the corrected disparity x3_far at the farthest point and the corrected disparity x3_near at the nearest point based on the maximum disparity x2_far and the minimum disparity x2_near calculated in step S201 using the formulas below:

$$x3\_far = x2\_far + \Delta x$$

$$x3\_near = x2\_near + \Delta x$$

S203:

The control unit 110 calculates the disparity angle β1_far at the farthest point during imaging and the disparity angle β1_near at the nearest point during imaging based on the corrected disparity x3_far at the farthest point and the corrected disparity x3_near at the nearest point calculated in step S202.

As shown in FIGS. 14A and 14B, the control unit 110 calculates the disparity angle β1_far at the farthest point during imaging and the disparity angle β1_near at the nearest point during imaging based on the corrected disparity x3_far at the farthest point and the corrected disparity x3_near at the nearest point through geometric calculation performed based on the positional relationship between the imaging components during imaging (the subject position, the size and the position of the virtual screen, the SB, the imaging point for a right eye image, and the imaging point for a left eye image).

S204:

The 3D imaging device 2000 performs the 3D perception determination process.

Figure 16:
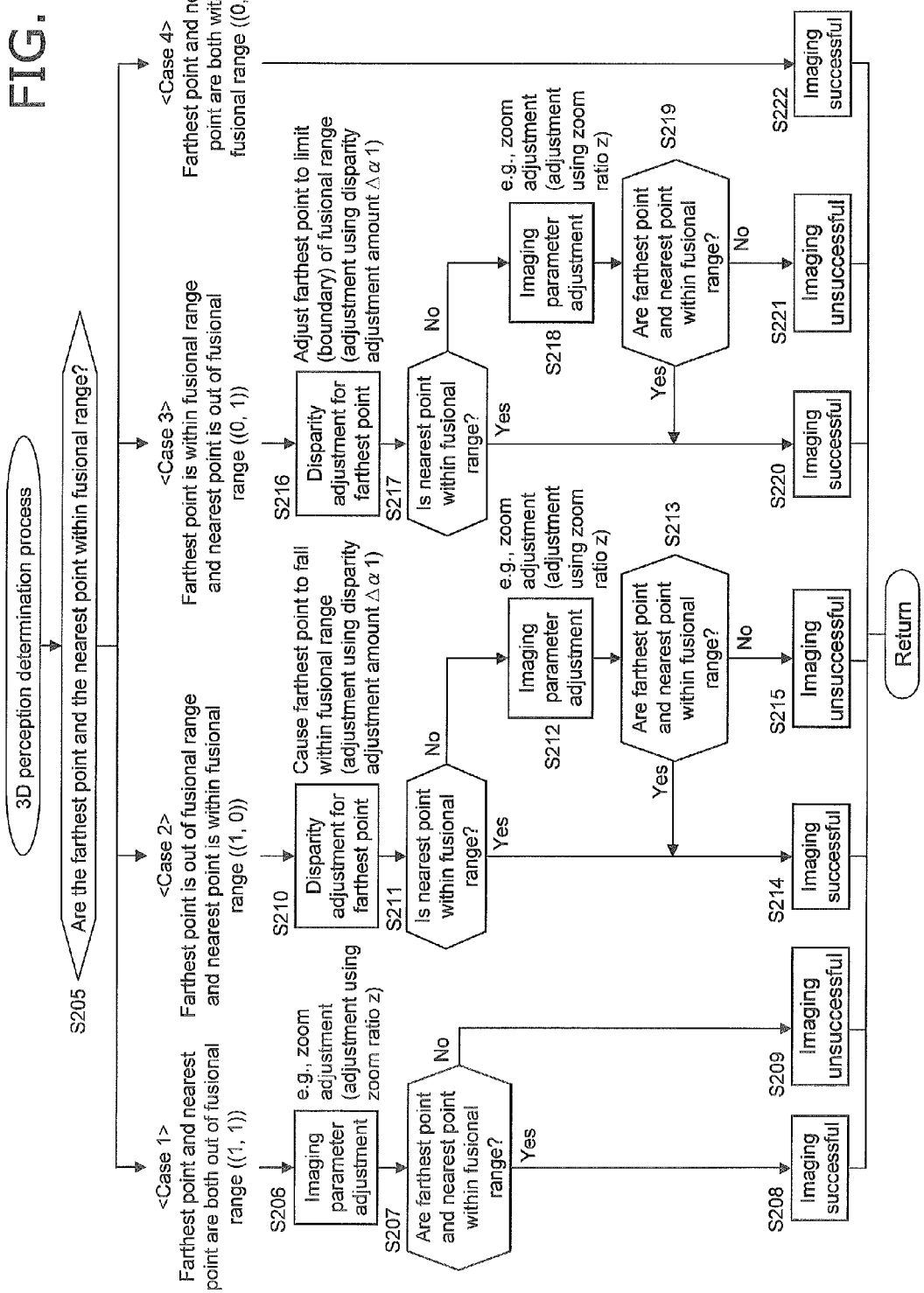
FIG. 16 is a flowchart illustrating the 3D perception determination process.

The 3D perception determination process performed by the 3D imaging device 2000 during imaging will now be described with reference to the flowchart shown in FIG. 16.

S205:

The control unit 110 determines whether the disparity angle β1_far at the farthest point and the disparity angle β1_near at the nearest point calculated in step S203 satisfy the conditions described above defined by formula 7.

S206:

When determining that both the farthest point and the nearest point fail to satisfy the above conditions defined by formula 7 (case 1) in step S205, the control unit 110 determines that the disparity adjustment fails to enable the farthest point and the nearest point to fall within the 3D viewing enabling range (range δ). In this case, the control unit 110 performs an imaging parameter adjustment process, in which, for example, the angle of view of the 3D imaging device 2000 is adjusted, and the zoom ratio z and/or the imaging SB are changed.

S207 to S209:

After the angle of view is adjusted (the imaging parameter adjustment is performed) in step S206, the control unit 110 determines whether the disparity angle β1_far at the farthest point and the disparity angle β1_near at the nearest point satisfy the above conditions defined by formula 7 (S207).

When determining that the disparity angles satisfy the above conditions defined by formula 7 in step S207, the control unit 110 determines that the imaging has been performed successfully, and ends the process (S208).

When determining that the disparity angles fail to satisfy the above conditions defined by formula 7 in step S207, the control unit 110 determines that the imaging has been performed unsuccessfully, and ends the process (S209).

S210:

When determining that the disparity angle at the farthest point fails to satisfy the above conditions defined by formula 7 but the disparity angle at the nearest point satisfies the above conditions defined by formula 7 in step S205 (case 2), the control unit 110 performs disparity adjustment that causes the farthest point to fall within the 3D viewing enabling range (range δ). More specifically, the control unit 110 calculates the disparity adjustment amount Δα1 with which the farthest point will fall within the range δ.

The control unit 110 then performs disparity adjustment using the calculated disparity adjustment amount Δα1 (shifts the image areas corresponding to the farthest point and the nearest point by the disparity adjustment amount Δα1).

S211 to S215:

When the control unit 110 shifts the image areas by the disparity adjustment amount Δα1 calculated in step S210, the control unit 110 determines whether the nearest point remains to fall within the 3D viewing enabling range (range δ) (S211).

S211:

When determining that the nearest point remains to fall within the 3D viewing enabling range (range δ), the control unit 110 determines that the imaging has been performed successfully, and ends the process (S214).

When determining that the nearest point falls out of the 3D viewing enabling range (range δ), the control unit 110 performs the imaging parameter adjustment process in the same manner as in step S206 (S212).

After the imaging parameter adjustment process is performed in step S212 and the angle of view is adjusted (the imaging parameter adjustment is performed) in step S212, the control unit 110 determines whether the disparity angle β1_far at the farthest point and the disparity angle β1_near at the nearest point satisfy the above conditions defined by formula 7 in the same manner as in step S207 (S213).

When determining that the disparity angles satisfy the above conditions defined by formula 7 in step S213, the control unit 110 determines that the imaging has been performed successfully, and ends the process (S214).

When determining that the disparity angles fail to satisfy the above conditions defined by formula 7 in step S213, the control unit 110 determines that the imaging has been performed unsuccessfully, and ends the process (S215).

S216:

When determining that the disparity angle at the nearest point fails to satisfy the above conditions defined by formula 7 but the disparity angle at the farthest point satisfies the above conditions defined by formula 7 in step S205 (case 3), the control unit 110 performs disparity adjustment that adjusts the farthest point to the limit (boundary) of the 3D viewing enabling range (range δ). More specifically, the control unit 110 calculates the disparity adjustment amount Δα1 with which the farthest point will be adjusted to the limit (boundary) of the range δ.

The control unit 110 then performs disparity adjustment using the calculated disparity adjustment amount Δα1 (shifts the image areas corresponding to the farthest point and the nearest point by the disparity adjustment amount Δα1).

S217 to S221:

The control unit 110 determines whether the nearest point after the disparity adjustment performed by shifting the image areas by the amount Δα1 calculated in step S216 falls within the 3D viewing enabling range (range δ) (S217).

When determining that the nearest point is within the 3D viewing enabling range (range δ), the control unit 110 determines that the imaging has been performed successfully, and ends the process (S220).

When determining that the nearest point fails to fall within the 3D viewing enabling range (range δ), the control unit 110 performs the imaging parameter adjustment process in the same manner as performed in step S206 (S218).

After the imaging parameter adjustment process is performed in step S218 and the angle of view is adjusted (the imaging parameter adjustment is performed) in step S218, the control unit 110 determines whether the disparity angle β1_far at the farthest point and the disparity angle β1_near at the nearest point satisfy the above conditions defined by formula 7 in the same manner as in step S207 (S219).

When determining that the disparity angles satisfy the above conditions defined by formula 7 in step S219, the control unit 110 determines that the imaging has been performed successfully, and ends the process (S220).

When determining that the disparity angles fail to satisfy the above conditions defined in formula 7 in step S219, the control unit 110 determines that the imaging has been performed unsuccessfully, and ends the process (S221).

In case 3, as described above, the 3D imaging device 2000 first performs the disparity adjustment that adjusts the farthest point to the limitation (boundary) of the fusional area, and then performs the adjustment for the nearest point. This enables the farthest point to fall within the fusional area prior to the nearest point. After the farthest point falls within the fusional area, the nearest point can be easily adjusted to fall within the fusional area by changing the imaging parameters. However, the farthest point out of the fusional area is difficult to adjust to fall within the fusional area by simply changing the imaging parameters. Considering this difficulty, the 3D imaging device 2000 performs the adjustment for the farthest point with priority.

S222:

When determining that both the farthest point and the nearest point satisfy the above conditions defined by formula 7 (case 4) in step S205, the control unit 110 determines that the imaging has been performed successfully, and ends the process (S222).

As described above, the 3D imaging device 2000 can perform the 3D perception determination process using formula 7 above during imaging.

Based on formula 7 above, the range of subjects that can be imaged by the 3D imaging device 2000 has the tendency described below:

(1) The range of subjects that can be imaged is inversely proportional to the zoom ratio (the range decreases as the zoom ratio increases).

(2) The range of subjects that can be imaged is inversely proportional to the screen size ratio (the range increases as the screen size decreases). Setting an assumed screen size larger is equivalent to viewing a 3D image on a smaller screen.

(3) The range of subjects that can be imaged is proportional to the viewing distance (the range increases as the viewing distance is larger). Setting an assumed viewing distance smaller is equivalent to viewing a 3D image at a distance greater than the assumed viewing distance.

(4) The range of subjects that can be imaged increases for a long-range view and decreases for a short-range view when the disparity adjustment adjusts the disparity toward a positive value.

Accordingly, as for the fusional area that is defined by human vision, the distance to subjects that can be fused changes depending on the parameters below during imaging:

(1) the zoom ratio, (2) the size of the assumed screen and the size of the actual screen, (3) the assumed viewing distance and the actual viewing distance, and (4) the disparity adjustment amount.

The 3D imaging device 2000 can thus determine in advance during imaging whether the scene being imaged will be easy to view based on the relationship between these different parameters.

In this manner, the determination method of the present embodiment (the 3D perception determination process) enables the 3D imaging device to determine during imaging whether a long-range view and a short-range view included in the scene being imaged will be viewed three-dimensionally when the captured images of the scene are displayed. The 3D imaging device 2000 of the present embodiment performs the 3D perception determination process during imaging and thus in advance eliminates imaging failures that would disable the captured images to be perceived three-dimensionally.

The 3D imaging device 2000 of the present embodiment is only required to add a positive disparity (the disparity amount $\Delta\alpha 1>0$ described above) when determining during imaging that the farthest point cannot be fused, and add a negative disparity (the disparity amount $\Delta\alpha 1<0$ described above) when determining during imaging that the nearest point cannot be fused. Through such disparity adjustment, the 3D imaging device 2000 enables the entire scene being imaged to be fused.

When determining during imaging that the farthest point and/or the nearest point cannot be fused, the 3D imaging device may alert the photographer through the user interface of the camera and urge the photographer to adjust the scene to be imaged. This will prevent imaging failures.

The 3D imaging device may use the positive disparity amount either for the farthest point or for the nearest point. The present invention is also applicable when the positive disparity amount is used in the direction opposite to the direction described in the above embodiment. When the positive disparity adjustment is performed in the direction opposite to the direction described in the above embodiment, it is only required that the expressions (or illustrations) associated with the positive and negative disparity amounts in the above embodiment (in the specification and the drawings) be understood in the opposite directions.

2.3 First Modification (High-Precision 3D Perception Determination)

A first modification of the present embodiment will now be described.

A 3D imaging device according to the first modification of the present embodiment performs more precise 3D perception determination (high-precision 3D perception determination). The 3D imaging device according to the first modification has the same structure as the 3D imaging device 2000 according to the second embodiment.

The technique described in the above embodiment enables the 3D imaging device to determine during imaging whether the captured images will be viewed three-dimensionally. To further improve the precision of the 3D perception determination performed during imaging, the inventors of the present application have collected evaluations from many participants in their experiments involving 3D imaging and displaying of many scenes. As a result, the inventors have identified many scenes that cannot be determined based solely on the above conditions, and have concluded that the 3D perception determination should not be based solely on the disparities for the farthest point and the nearest point.

More specifically, the inventors of the present application have determined that 3D perception determination would be more precise when reflecting the distances on the two-dimensional screen (either on the virtual screen or on the display screen) to the subjects positioned at different depths.

The processing enabling such 3D perception determination performed by the 3D imaging device will now be described.

2.3.1 High-Precision 3D Perception Determination Reflecting Distances Between Subjects on the Two-Dimensional Screen Based on the evaluation results (1) and (2) below, the inventors have determined the conditions to be used in the 3D perception determination during imaging reflecting the distances on the two-dimensional screen (the virtual screen or the display screen) between the subjects positioned at different depths.

(1) When a long-range view and a short-range view, which have a relatively large disparity difference between them, are positioned away from each other on the screen, the captured images can often be easy to view (easy to view three-dimensionally).

(2) When a long-range view and a mid-range view, or a mid-range view and a short-range, which have a relatively small disparity difference between them, are positioned near each other on the screen, the captured images are often difficult to view (difficult to view three-dimensionally).

When the farthest point F in the scene being imaged (the distance to the subject at the farthest point is referred to as the distance R (F)) and the nearest point N in the scene (the distance to the subject at the nearest point N is referred to as the distance R (N)) are both within the 3D viewing enabling areas, a long-range view A farther than the farthest point (R(A)<R(F), where R(A) is the subject distance of the long-range view A) and a short-range view B farther than the nearest point (R(B)>R(N), where R(B) is the subject distance of the short-range view B) may be positioned near each other on the screen. In that case, the captured images of the neighboring parts (areas) of the long-range view A and the short-range view B may not be fused and may be difficult to view.

The 3D imaging device of the present modification calculates the correction disparity angle γ based on human vision (reflecting human vision) using the function f (α1, α2, h), which uses, as variables, the disparity angles α1 and α2 of the two subjects on the two-dimensional screen (the virtual screen or the display screen) and the distance h between the two subjects on the two-dimensional screen. The 3D imaging device then determines whether the subjects in the imaged scene will fall within the fusional area based on the correction disparity angle γ.

The function used to calculate the correction disparity angle γ may for example be the function below:

$$f(\alpha 1, \alpha 2, h) = g(h) * |\alpha 1 - \alpha \alpha 2|,$$

where g(h) is a monotonically decreasing function that yields a larger value as the absolute value of the variable h approaches zero.

The function g(h) may be a function that decreases monotonically from a predetermined value th1 to a predetermined value th2 (th1>g(h)>th2). The function g(h) may change depending on, for example, the size of the display screen (the display screen size) and the viewing distance.

The 3D imaging device determines that the two subjects (the subject having the disparity angle α1 and the subject having the disparity angle α2) will be fused and will be viewed three-dimensionally when the above evaluation value (the value of the function f) satisfies the condition below defining the relationship between the function f and the fusional limit δ.

$$f(\alpha 1, \alpha 2, h) < \delta$$

When the above condition is satisfied by all subjects included in the scene being imaged, the 3D imaging device determines that the entire scene will be easy to view (will be viewed three-dimensionally). When the above condition is satisfied for all the subjects included in the scene being imaged, a 3D image (3D video) captured through 3D imaging of the scene will be easy to view (fused in an appropriate manner) by humans.

High-Precision 3D Perception Determination Process

Figure 17:
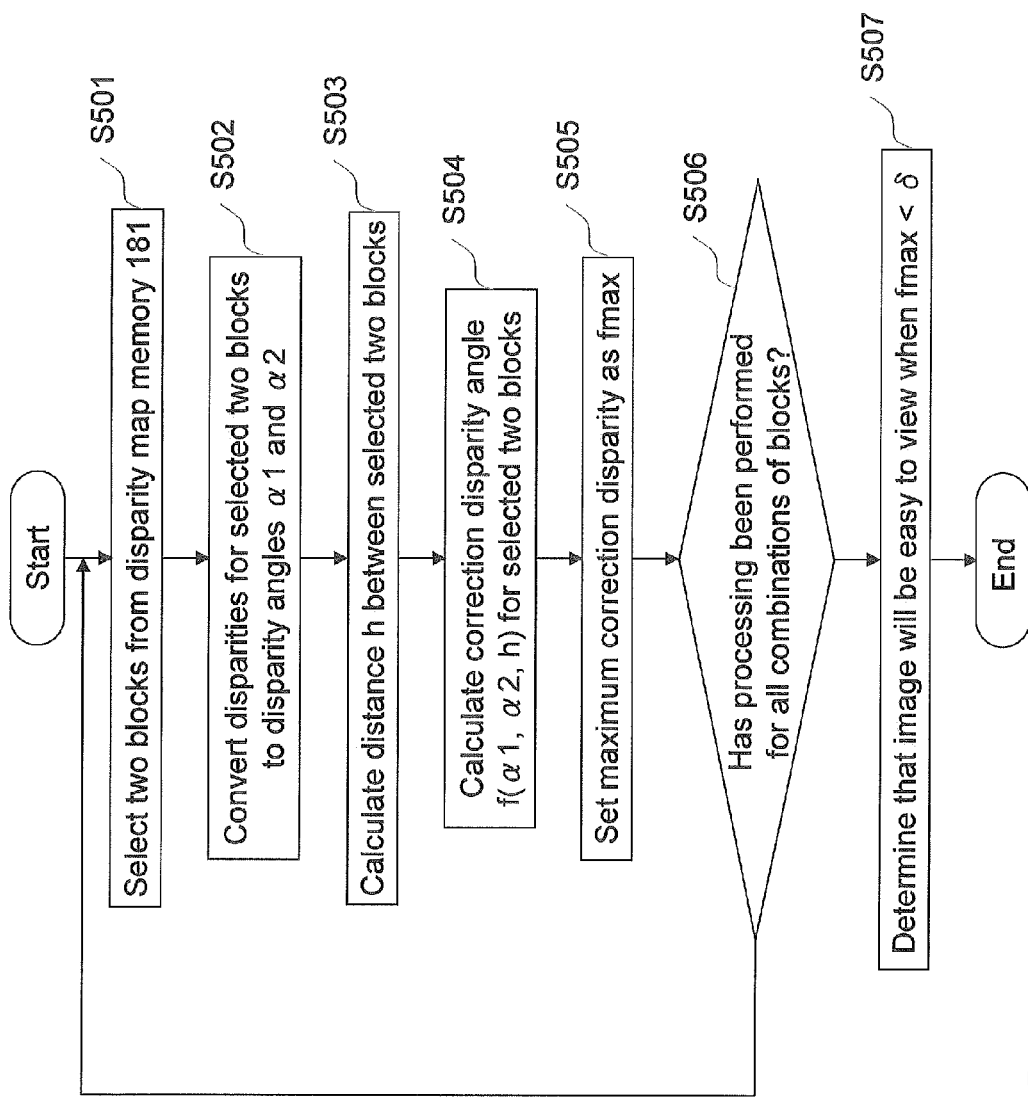
FIG. 17 is a flowchart illustrating a high-precision 3D perception determination process.

The high-precision 3D perception determination process performed by the 3D imaging device of the present modification will now be described with reference to the flowchart shown in FIG. 17. The high-precision 3D perception determination process is performed during imaging using the above function f to determine whether the scene being imaged will be fused (viewed three-dimensionally).

S501:

The control unit 110 selects two blocks (blocks included in the disparity map memory 181, or for example blocks BK1 and BK2 in FIG. 3) from the disparity map memory 181.

S502:

The control unit 110 calculates the disparities corresponding to the two blocks selected in step S501 using the disparity map memory 181, and converts the disparities for the two blocks to the disparity angles α1 and α2 using a predetermined condition. The predetermined condition may be determined by, for example, the imaging components during imaging (the subject position, the size and the position of the virtual screen, the SB, the imaging point for a right eye image, and the imaging point for a left eye image), the displaying components during displaying (the position of the left eye, the position of the right eye, the display screen, and the placement position of the main subject), and the imaging parameters (including the angle of view, the zoom ratio, and the imaging SB). The disparity angles α1 and α2 may be corrected through the disparity correction performed based on the above condition.

S503:

The control unit 110 calculates the distance h between the selected two blocks on the two-dimensional screen. The distance h can be calculated based on the distance between the blocks in the disparity map memory 181. For example, when the selected blocks are adjacent to each other, the distance h between the blocks is h=1.

S504:

The control unit 110 calculates the correction disparity angle f(α1, α2, h) for the selected two blocks.

S505:

The control unit 110 compares the correction disparity angle f(α1, α2, h) calculated in step S504 (the value f0) with the prestored maximum value fmax of the correction disparity angle f. When f_max<f0, the value f0 is newly set as the maximum value fmax (fmax=f0). When f_max≥f0, the maximum value fmax is retained.

In the first cycle of the processing in step S505, the control unit 110 sets the maximum value fmax as fmax=f0.

S506:

The control unit 110 determines whether the above processing has been completed for all combinations of the blocks. When determining that the processing has yet to be completed for all combinations of the blocks, the control unit 110 returns to the processing in step S501. When determining that the processing has been completed for all combinations of the blocks, the control unit 110 advances to the processing in step S507.

S507:

The control unit 110 compares the maximum value fmax with the fusional limit δ. When fmax<δ, the 3D imaging device of the present modification determines that the scene being imaged will be viewed three-dimensionally.

The high-precision 3D perception determination process may not necessarily be performed for all combinations of two blocks among all the blocks included in the disparity map memory 181. For example, the high-precision 3D perception determination process may be performed for only combinations of two blocks having at least a predetermined disparity difference between them.

The function used to calculate the correction disparity angle should not be limited to the function described above, but may be any function that yields a larger value for a qualitatively larger disparity difference and/or yields a smaller value for a greater distance on the two-dimensional screen. The function used to calculate the correction disparity angle may not be a completely monotonous function, but may yield a constant value within a predetermined range.

2.3.2 High-Precision 3D Perception Determination Reflecting Screen Size and Viewing Distance The inventors of the present application have further identified other factors affecting the visibility of a 3D image (3D video) in 3D viewing, that is, the size of the display and the viewing distance.

The above example assumes the case in which the convergence of the eyes (the convergence point) is formed onto the screen. However, the convergence of the eyes may not be constantly formed on the screen plane. When a long-range view is difficult to perceive, the human eyes naturally adjust their convergence in a manner that the long-range view will be perceived easily.

Such adjustment will now be described with reference to FIG. 18.

In the example shown in FIG. 18, a human may fix his/her eyes on the person 900 with the convergence (the convergence point) being formed onto the person 900 (view the person three-dimensionally). In this case, the fusion condition for the mountain view 901 changes from $|\alpha f - \alpha s| < \delta$ to $|\alpha f - \alpha c| < \delta$. As a result, the mountain view 901 is easier to view (will be easier to view three-dimensionally).

The actual fusional range increases in this case by the degree corresponding to the increased viewability of the long-range view.

However, when the photographer intends to adjust the convergence (the convergence point) onto the person 900 and fixes his/her eyes on the person 900, the eyes of the photographer will focus on the person 900. In this case, the photographer will fail to perceive the 3D image (3D video) as a sharp image on the display screen. To view the 3D image in an appropriate manner, the photographer is required to view it in a complicated manner, or specifically the photographer is required to focus on the screen and at the same time form the convergence (the convergence point) onto the person 900 (disagreement occurs between the focus and the convergence).

A human adjusts the focus by changing the thickness of the lens (crystal lens) of each eye ball through contraction of the ciliary muscle. The state of the ciliary muscle contraction changes by a large degree when the eyes focus on a near object, whereas the state of the contraction changes by a small degree when the eyes focus on a far object. Thus, when viewing a near object, a human can easily recognize depth of an image based on focusing. When viewing a far object, a human does not recognize depth of an image based on focusing.

When the display (the display screen) has a small size to be viewed from a short distance, the viewer will easily recognize depth on the screen based on focusing. In this case, the convergence (the convergence point) is likely to be fixed onto the screen. This phenomenon is particularly likely for the display screen having a size of 2 m.

When the display has a large size to be viewed from a long distance, the viewer will be less likely to recognize depth on the screen based on focusing. In this case, the convergence (the convergence point) is not fixed onto the screen but can be formed between positions in front of and behind the screen.

Based on these phenomena, the conditions enabling fusion are required to be set relatively severe for the viewing conditions set for the display (the display screen) having a small screen size or for the display to be viewed from a short distance. The conditions enabling fusion are required to be set relatively less severe (or loose) for the viewing conditions set for the display (the display screen) having a large screen size or for the display to be viewed from a long distance.

Based on these requirements, the 3D imaging device of the present modification obtains information about the size of the display screen during imaging, and sets the fusional limit $\delta$ (the fusional range $\delta$) smaller as the display screen is smaller, and sets the fusional limit $\delta$ larger as the display screen is larger. The 3D imaging device of the present modification uses the fusional limit $\delta$ set in this manner to perform the required processing (for example, the 3D perception determination process described in 2.2 above or the high-precision 3D perception determination process reflecting the distances between the subjects on the two-dimensional screen described in 2.3.1 above). As a result, the 3D imaging device of the present modification enables the 3D perception determination process performed during imaging to be more precise.

In addition to the above case, the 3D imaging device may also ease (or expand) the fusion enabling conditions in the cases described below:

(1) when a subject at the farthest point and/or a subject at the nearest point occupies only a small area on the screen, (2) when a subject at the farthest point and/or a subject at the nearest point is in an edge part of the screen, or (3) when a subject at the farthest point and/or a subject at the nearest point is out of focus and blurred.

In any of the above cases, the 3D imaging device can determine that the subject at the farthest point and/or the subject at the nearest point is less important in the scene being imaged. In that case, a human will be less likely to fix his/her eyes on the subject at the farthest point and/or the subject at the nearest point. In other words, the fusion state of the subject at the farthest point and/or the subject at the nearest point, onto which the viewer is less likely to fix his/her eyes, is less likely to affect the viewability of the entire image. Based on this, the 3D imaging device may ease (or expand) the fusion conditions in the above cases.

The fusional range can be adjusted, for example, in the manners (1) to (4) described below.

(1) The fusional range can be adjusted by electrically shifting the right eye image and/or the left eye image forming the 3D image (3D video) and adjusting the disparity of the 3D image (3D video).

(2) The fusional range can be adjusted by adjusting (reducing) the imaging SB used by the 3D imaging device.

(3) The fusional range can be adjusted by adjusting the amount by which the 3D imaging device is moved between individual two shots when the 3D image (3D video) is obtained through the two-shot imaging.

(4) The fusional range can be adjusted by generating (calculating or estimating) depth (depth information) of the object (subject) in the 3D image (video) and electrically adjusting the imaging SB.

Changing the fusional area based on these various factors enables the 3D imaging device of the present modification to obtain evaluation values simulating the actual viewability. Based on the obtained evaluation values, the 3D imaging device performs the 3D perception determination process during imaging. This enables the 3D imaging device of the present modification to perform appropriate 3D imaging. To sum up, the 3D imaging device of the present modification obtains evaluation values simulating the actual viewability by changing the fusional area based on the above various factors, and performs the 3D perception determination process based on the obtained evaluation values. As a result, the 3D imaging device can simulate actual human perception in determining during imaging whether the captured images will be viewed three-dimensionally without causing fatigue.

2.3.3 Determination Process Using Disparity Histogram

The 3D perception determination may be performed using a disparity histogram instead of by changing the value of the fusional range $\delta$ (easing the fusion enabling conditions) as described above. The 3D perception determination process using the disparity histogram performed during imaging will now be described.

Figure 19:
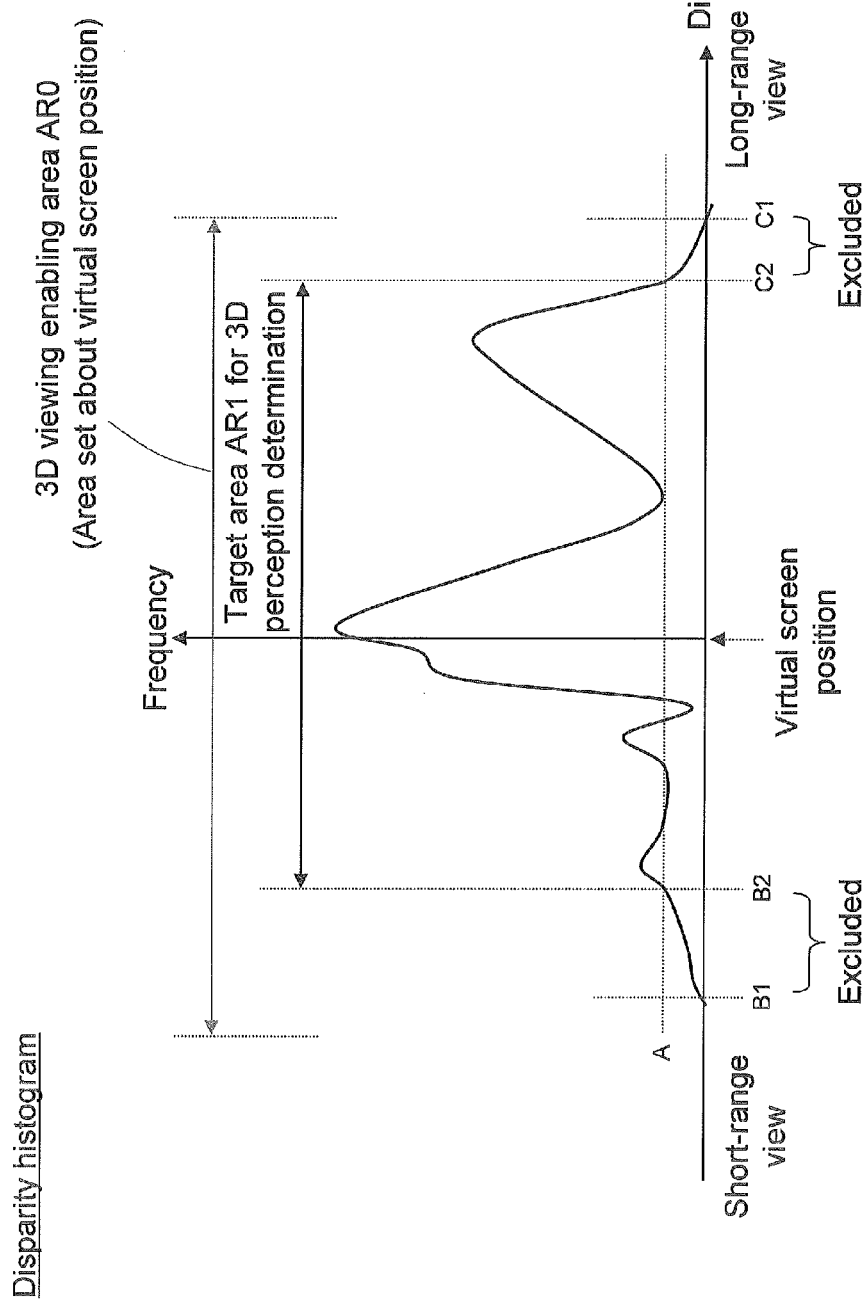
FIG. 19 shows an example of a disparity histogram.

Example Shown in FIG. 19

The example shown in FIG. 19 will now be described.

In the 3D imaging device according to the present modification, the control unit 110 generates a histogram of disparities (a disparity histogram), which is shown for example in FIG. 19, using the disparity map memory 181. The control unit 110 excludes long-range views and short-range views that can occur with a frequency lower than or equal to a predetermined frequency A shown in FIG. 19 from the generated disparity histogram. The control unit 110 sets a target area AR1, which is an area to be subjected to the 3D perception determination process, as an area defined from a short-range view B2 to a long-range view C2.

The control unit 110 compares the set target area AR1 (the area between B2 and C2), which is the area to be subjected to the 3D perception determination process, with the 3D viewing enabling area (the 3D viewing enabling area AR0 shown in FIG. 19), and determines whether the scene being imaged will be viewed three-dimensionally. When the target area AR1 is within the 3D viewing enabling area AR0, the control unit 110 determines that the imaged scene will be viewed three-dimensionally. In the example shown in FIG. 19, the 3D viewing enabling area AR0 is an area symmetric with respect to the virtual screen position (an area consisting of the long-range view area and the short-range view area each having the same size).

Figure 20:
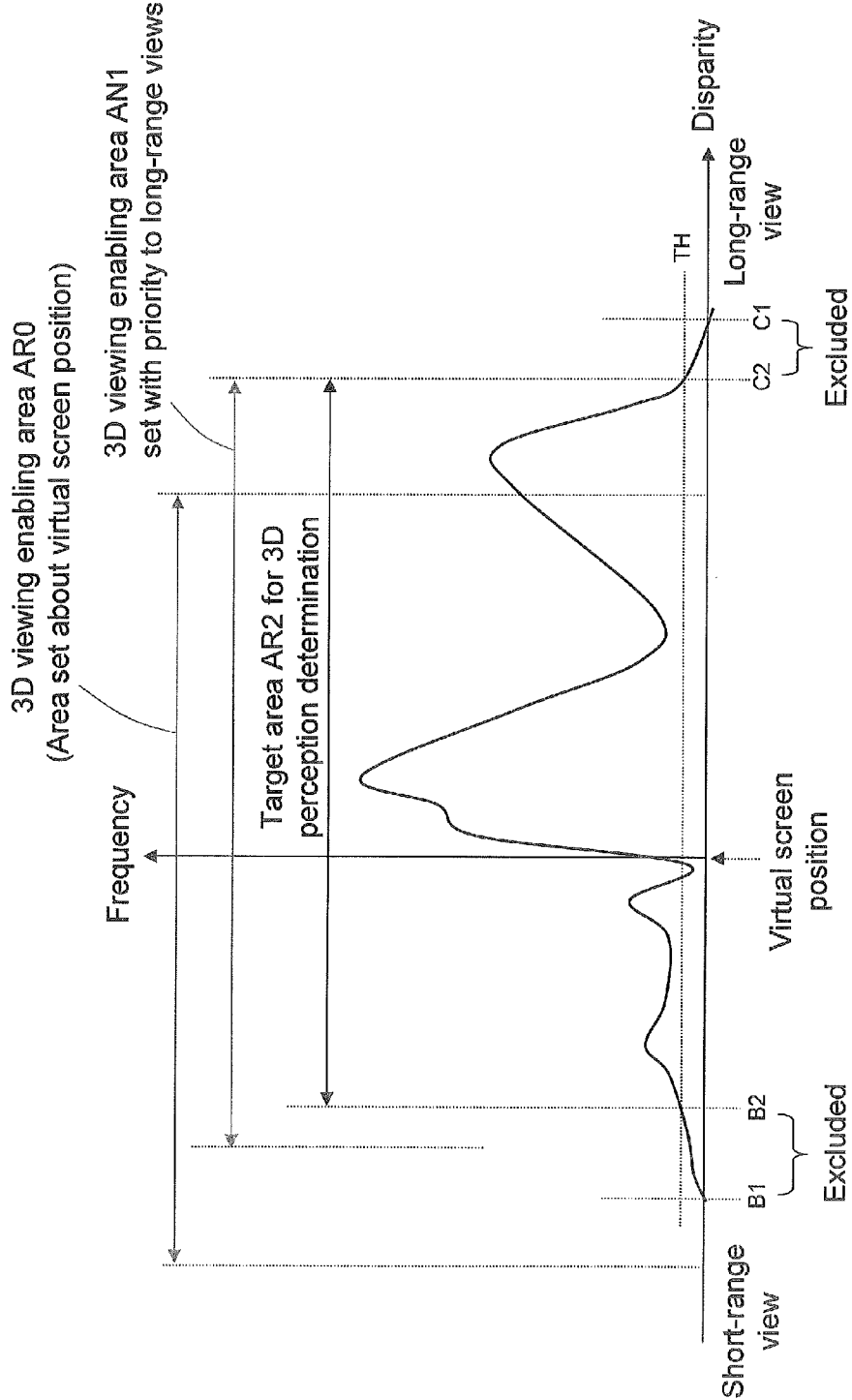
FIG. 20 shows an example of a disparity histogram (when a long-range view TH and a short-range view TH are identical).

Example Shown in FIG. 20 (When Long-Range View TH and Short-Range View TH are Identical)

The example shown in FIG. 20 will now be described.

In the 3D imaging device according to the present modification, the control unit 110 generates a histogram of disparities (a disparity histogram), which is shown for example in FIG. 20, using the disparity map memory 181. The control unit 110 excludes long-range views and short-range views that can occur with a frequency lower than or equal to a predetermined frequency TH shown in FIG. 20 from the generated disparity histogram. The control unit 110 sets a target area AR2, which is an area to be subjected to the 3D perception determination process, as an area defined from a short-range view B2 to a long-range view C2.

As shown in FIG. 20, the control unit 110 compares the set target area AR2, which is the area to be subjected to the 3D perception determination process, with an area AN1 set based on the long-range view limit C2 of the set target area AR2. More specifically, the control unit 110 shifts the 3D viewing enabling area AR0 that has been set about the virtual screen to the area AN1 set based on the long-range view limit C2 of the target area AR2. In this manner, the control unit 110 sets the 3D viewing enabling area AN1 used in the 3D perception determination process.

The control unit 110 then compares the target area AR2 for the 3D perception determination process with the 3D viewing enabling area AN1, and determines whether the scene being imaged will be viewed three-dimensionally. When the target area AR2 is within the 3D viewing enabling area AN1 set with priority to long-range views, the control unit 110 determines that the imaged scene will be viewed three-dimensionally.

Figure 21:
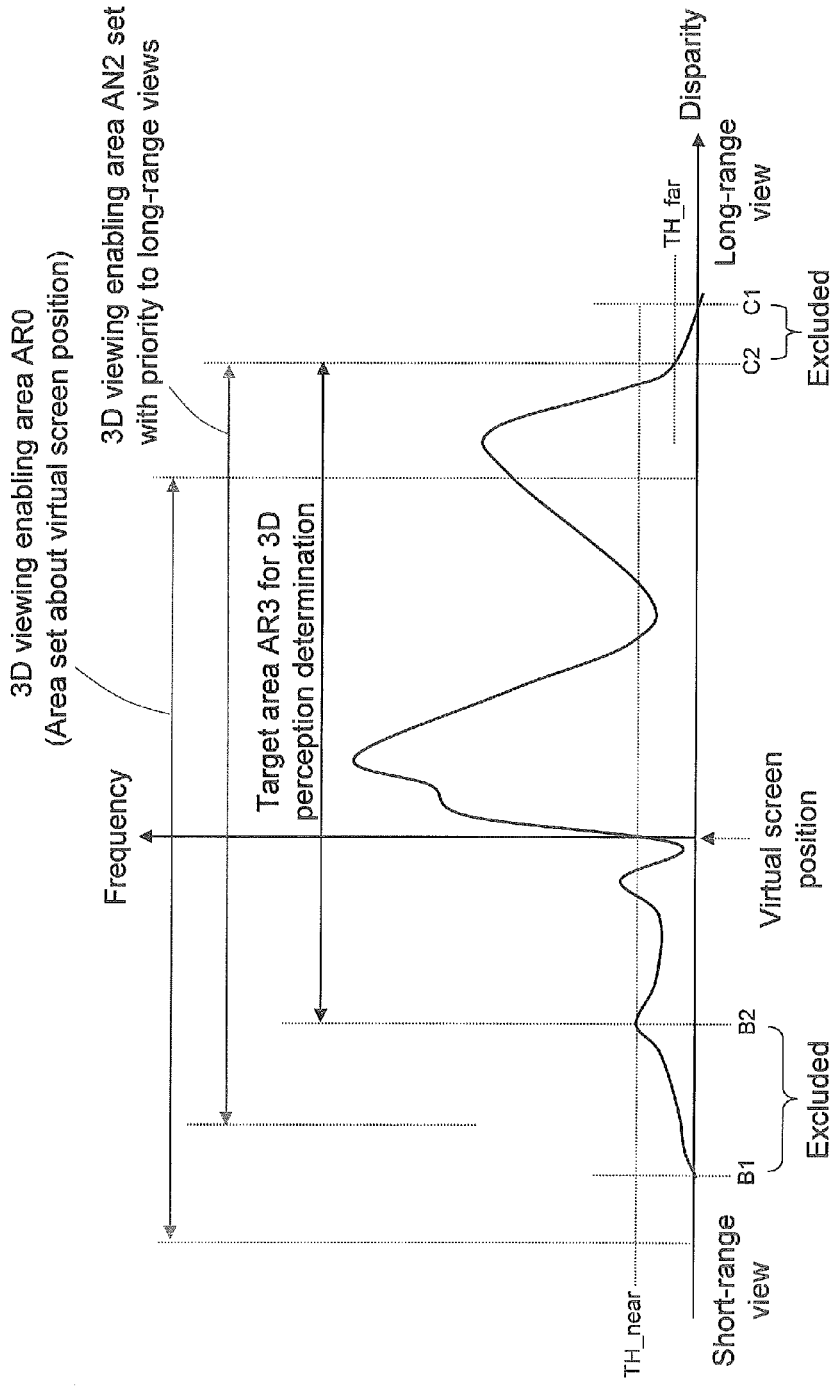
FIG. 21 shows an example of a disparity histogram (when a long-range view TH and a short-range view TH are different (case 1)).

Example Shown in FIG. 21 (when Long-Range View TH and Short-Range View TH are Different (Case 1))

The example shown in FIG. 21 will now be described.

In the 3D imaging device according to the present modification, the control unit 110 generates a histogram of disparities (a disparity histogram), which is shown for example in FIG. 21, using the disparity map memory 181. From the generated disparity histogram, the control unit 110 excludes (1) long-range views that can occur with a frequency lower than or equal to a predetermined frequency TH_far shown in FIG. 21, and (2) short-range views that can occur with a frequency lower than or equal to a predetermined frequency TH_near shown in FIG. 21.

The control unit 110 then sets a target area AR3, which is an area to be subjected to the 3D perception determination process, as an area defined from a short-range view B2 to a long-range view C2.

To enable the 3D viewing enabling determination to be performed focusing on long-range views, the control unit 110 preferably sets the predetermined frequency TH_far, which is used in excluding long-range views, and the predetermined frequency TH_near, which is used in excluding short-range views, in a manner that these frequencies satisfy the relationship below:

$TH\_far < TH\_near$

As shown in FIG. 21, the control unit 110 sets the 3D viewing enabling area AN2 based on the long-range view limit C2 of the target area AR3. To enable the 3D perception determination to be performed focusing on long-range views, the control unit 110 shifts the 3D viewing enabling area AR0 set about the virtual screen to the area AN2 set based on the long-range view limit C2 of the target area AR3. In this manner, the control unit 110 sets the 3D viewing enabling area AN2 used in the 3D perception determination process.

The control unit 110 compares the target area AR3, which is the area to be subjected to the 3D perception determination process, with the 3D viewing enabling area AN2, and determines whether the scene being imaged will be viewed three-dimensionally. When the target area AR3 is within the 3D viewing enabling area AN2 set with priority to long-range views, the control unit 110 determines that the imaged scene will be viewed three-dimensionally.

Figure 22:
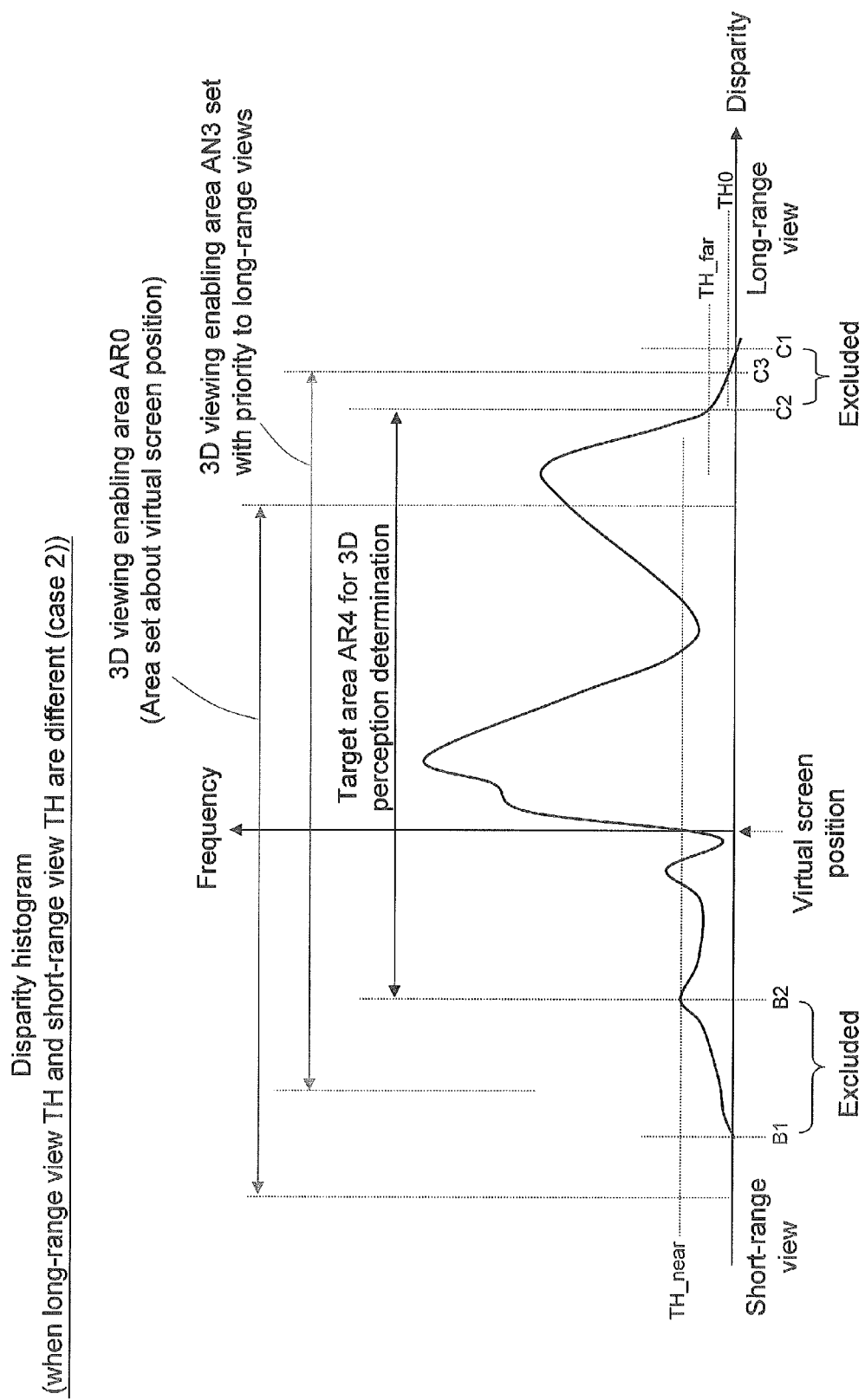
FIG. 22 shows an example of a disparity histogram (when a long-range view TH and a short-range view TH are different (case 2)).

Example Shown in FIG. 22 (when Long-Range View TH and Short-Range View TH are Different (Case 2))

The example shown in FIG. 22 will now be described.

In the 3D imaging device according to the present modification, the control unit 110 generates a histogram of disparities (a disparity histogram), which is shown for example in FIG. 22, using the disparity map memory 181. From the generated disparity histogram, the control unit 110 excludes (1) long-range views that can occur with a frequency lower than or equal to a predetermined frequency TH_far shown in FIG. 22, and (2) short-range views that can occur with a frequency lower than or equal to a predetermined frequency TH_near shown in FIG. 22.

The control unit 110 then sets a target area AR4, which is an area to be subjected to the 3D perception determination process, as an area defined from a short-range view B2 to a long-range view C2.

To enable the 3D viewing enabling determination to be performed focusing on long-range views, the control unit 110 preferably sets the predetermined frequency TH_far, which is used in excluding long-range views, and the predetermined frequency TH_near, which is used in excluding short-range views, in a manner that these frequencies satisfy the relationship below:

$TH\_far < TH\_near$

The control unit 110 also calculates the 3D viewing enabling area used in the 3D perception determination process in the manner described below.

(1) The control unit 110 sets a predetermined frequency TH0 (>TH_far)

(2) The control unit 110 calculates a point (corresponding to point C3 in FIG. 22) at which the frequency initially exceeds the frequency TH0 in the disparity histogram when the histogram is traced from a long-range view end toward a short-range view end.

(3) The control unit 110 sets the 3D viewing enabling area AN3 based on the point C3 calculated through the processing (3). The 3D viewing enabling area AN3 may for example be an area defined by shifting, with respect to the point C3, the 3D viewing enabling area AR0 set about the virtual screen.

The control unit 110 compares the 3D viewing enabling area AN3 set in the manner described above with the target area AR4 for the 3D perception determination process, and determines whether the scene being imaged will be viewed three-dimensionally. When the target area AR4 is within the 3D viewing enabling area AN3 set with priority to long-range views, the control unit 110 determines that the imaged scene will be viewed three-dimensionally.

Example Shown in FIG. 23 (when Clustering is Performed)

The example shown in FIG. 23 will now be described.

In the 3D imaging device according to the present modification, the control unit 110 divides into clusters the blocks forming the disparity map memory 181 (each block consists of eight by eight pixels in this example, but it may alternatively consist of a single pixel). The image may consist of, for example, clusters shown in FIG. 23. FIG. 23 schematically shows the clusters CL1 to CL6.

The control unit 110 may for example set a representative value of each cluster, and generates a disparity histogram. More specifically, when the cluster CL1 includes blocks of the disparity map memory 181 having the disparity range of C4 to C5, the control unit 110 generates a disparity histogram using the average value of these disparities (=(C4+C5)/2) as a representative value of the cluster CL1.

The control unit 110 then performs the same 3D perception determination process as described above. As shown in FIG. 23, for example, the control unit 110 sets the 3D viewing enabling area AN4 using the point C4 at which the frequency of the disparity initially exceeds the threshold TH_far in the disparity histogram when the histogram is traced from the long-range view end toward the short-range view end. The control unit 110 compares the 3D viewing enabling area AN4 with a target area AR5 for the 3D perception determination, and performs the 3D perception determination.

The 3D imaging device according to the present modification may perform the 3D perception determination after weighting the clustered image. The weighting process will now be described.

As shown in FIGS. 23A to 23C, for example, the control unit 110 weights each cluster using a function Weight below:

Weight($x,y,z$)=Cent($x$)*Size($y$)*Blur($z$)

Cent($x$) is a function that yields a larger value as the position of the cluster is nearer the central position of the disparity map memory 181 (the central position of the two-dimensional image (screen) formed by the blocks of the disparity map memory 181). In this function, x may be a two-dimensional vector indicating the position of the cluster on the two-dimensional screen. Cent($x$) may be set as Cent($x$)=1, under which the cluster is weighted independently of the position of the cluster.

Size($y$) is a function that yields a larger value as the area formed by each of the blocks of the disparity map memory 181 in the two-dimensional image (screen) is larger. In this function, y indicates the area of each block of the disparity map memory 181 in the two-dimensional image (screen). Size($y$) may be set as Size($y$)=1, under which the cluster is weighted independently of the area of the cluster.

Blur($z$) is a function that yields a smaller value as the degree of blurring of the cluster (the average degree of blurring) is greater. In this function, z indicates, for example, the degree of burring of the cluster (for example, the average degree of blurring). Size($y$) may be set as Size($y$)=1, under which the cluster is weighted independently of the degree of blurring of the cluster.

The control unit 110 generates a weighted disparity histogram in which the clusters are weighted using the weighting function Weight($x$, $y$, $z$) described above.

For example, the control unit 110 calculates the weighting function Weight ($x$, $y$, $z$) for the cluster CL1 shown in FIG. 23A (referred to as the weighting function Weight(CL1)). In this example, the cluster CL1 corresponds to a long-range view, has a disparity within the disparity range of C4 to C5 shown in FIG. 23B, and has a frequency H (CL1). In this case, the control unit 110 calculates the frequency HA (CL1) of the weighted cluster CL1 using the formula below:

HA(CL1)=Weight(CL1)*H(CL1)

The control unit 110 then generates a disparity histogram using the frequency HA(CL1) of the weighted cluster CL1.

The control unit 110 weights each of all the clusters through the weighting process described above.

FIG. 23C shows an example of the disparity histogram generated by weighting the clusters as described above.

In the disparity histogram shown in FIG. 23B, the 3D viewing enabling area AN4 and the target area AR5 for the 3D perception determination process are set based on the point C4.

As shown in FIG. 23A, the cluster CL1 corresponds to a long-range view. Although the cluster CL1 does not occupy a large area of the two-dimensional image (screen) formed by the blocks of the disparity map memory 181, the cluster CL1 is positioned at around the center of the two-dimensional image. The cluster CL1 is thus determined important in the 3D perception determination process. The weight function Weight(CL1) of the cluster CL1 thus yields a large value. As a result, the frequency HA(CL1) of the weighted cluster CL1 also yields a large value as HA(CL1)=Weight(CL1)*H(CL1).

As shown in FIG. 23C, the disparities C4 to C5 can occur with a higher frequency. The frequency of the disparities C4 to C5 exceeds the threshold TH_far. In this case, the control unit 110 sets the 3D viewing enabling area AN5 and the target area AR6 for the 3D perception determination process based on the point C5 as shown in FIG. 23C.

As a result, the 3D imaging device according to the present modification performs the 3D perception determination process reflecting the effect of a small long-range view area positioned at around the center of the screen, such as the cluster CL1.

The above processing is a mere example. The present invention should not be limited to the above processing.

The cluster may also be weighted depending on the area occupied by the cluster and the degree of blurring of the cluster through the same processing as described above for the position of the cluster. Such processing enables the 3D imaging device according to the present modification to perform more appropriate 3D perception determination reflecting the area occupied by the cluster and the degree of blurring of the cluster.

Third Embodiment

A third embodiment of the present invention will now be described.

The third embodiment relates to an assist function of a camera for assisting a photographer when a scene to be imaged cannot be viewed three-dimensionally by a human.

The second embodiment and the modifications of the second embodiment describe the 3D imaging device and the 3D perception determination method for determining the viewability (the viewability of a 3D image) based on the criteria determined based on human perception. When a long-range view is difficult to view, the 3D imaging device of the above embodiments adjusts the long-range view to a nearer position through disparity adjustment or convergence adjustment. This enables the 3D imaging device of the above embodiments to obtain (capture) a 3D image (3D video) that is easy to view three-dimensionally. When a short-range view is difficult to view, the 3D imaging device of the above embodiments adjusts the short-range view to a farther position through disparity adjustment or convergence adjustment. This enables the 3D imaging device of the above embodiments to obtain (capture) a 3D image (3D video) that is easy to view three-dimensionally.

However, excessive disparity adjustment and excessive convergence adjustment can lower the linearity of depth of the image, and can degrade the image quality of the resulting 3D image (3D video). Further, the viewability of the 3D image may often fail to be achieved through disparity adjustment or convergence adjustment under the imaging conditions with which a long-range view and/or a short-range view cannot be fused.

The present embodiment relates to an assist function for assisting a photographer in a manner that the photographer can change the imaging conditions to achieve the viewability of the resulting image when a long-range view and a short-range view both cannot be fused.

Figure 24B:
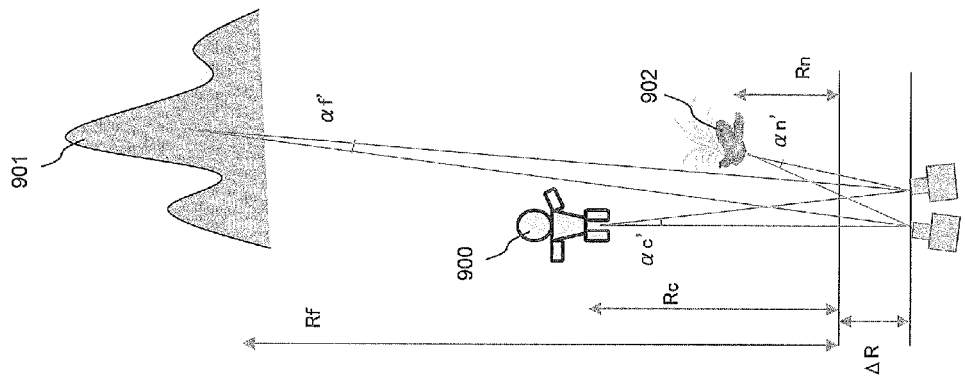
FIGS. 24A and 24B are diagrams describing the principle used in a third embodiment of the present invention.
Figure 24A:
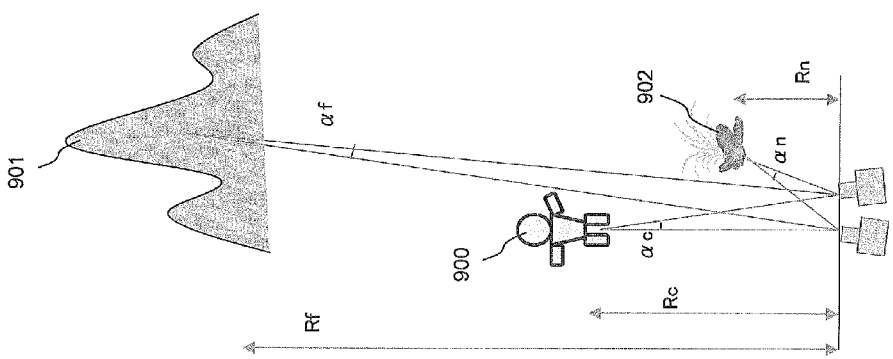

FIGS. 24A and 24B are diagrams describing the principle used by the present embodiment.

FIG. 24A shows the positional relationship in the scene being imaged (the positional relationship between the imaging parameters during imaging). In this scene, the farthest point is a mountain view 901 positioned at a distance Rf, and the nearest point is a plant view 902 positioned at a distance Rn. In this scene, the main subject is a person 900 positioned at a distance Rc. When this scene is imaged by the camera (the 3D imaging device) shown in FIG. 24A, the mountain view 901 has a disparity angle αf, the plant view 902 has a disparity angle αn, and the person 900 has a disparity angle αc.

According to the above embodiments, the disparity adjustment is appropriate when the relationship below is satisfied:

$|\alpha n - \alpha f| < 2\delta x$, where δx is a fusional range to which the fusional range δ determined by the Panum's fusional area has been converted.

Through such disparity adjustment, both the long-range view and the short-range view will fall within the fusional area in which the images are easy to view. However, when the above relationship is not satisfied, any disparity adjustment would not enable the two views (the long-range view and the short-range view) to both fall within the fusional area.

With the technique described in the above embodiments, the 3D imaging device according to the present embodiment detects, immediately before the imaging, the condition under which one or both of the long-range view and the short-range view cannot be fused. The 3D imaging device of the present embodiment then assists the photographer to move backward and then perform the imaging.

Figure 25:
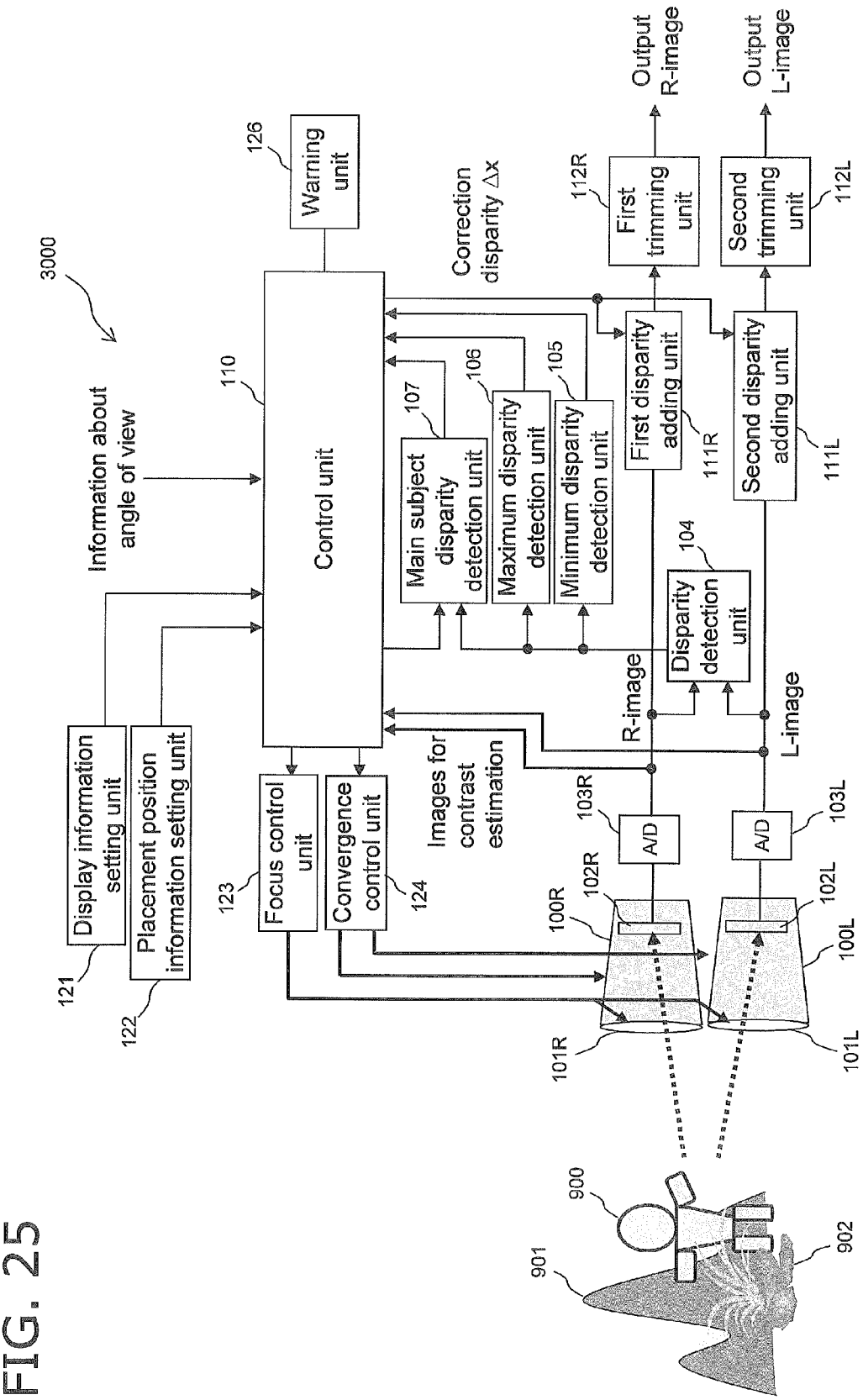
FIG. 25 is a block diagram of a 3D imaging device according to the third embodiment.

FIG. 25 schematically shows the structure of a 3D imaging device 3000 according to the present embodiment.

As shown in FIG. 25, the 3D imaging device 3000 of the present embodiment has the same structure as the 3D imaging device 2000 of the second embodiment except that it additionally includes a warning unit 126.

The assist function of the 3D imaging device is achieved by the control unit 110 controlling the warning unit 126 and the warning unit 126 providing a warning to the photographer. For example, the warning unit 126 is a functional unit that displays a message or provides voice guidance. The assist function of the 3D imaging device 3000 is achieved by the warning unit 126 displaying a message or providing voice guidance. The assist function is achieved by, for example, the methods described below.

(1) The 3D imaging device provides the photographer with information indicating the degree by which the photographer should move backward (the distance by which the 3D imaging device should be moved from the present position in a direction away from the subject (the distance by which the device should be moved away)).

(2) The photographer holding the camera (the 3D imaging device) moves backward while provisionally capturing images using the camera. The 3D imaging device provides the photographer with information about a determination result indicating that both the long-range view and the short-range view can be fused based on the captured images. This allows the photographer to determine the camera position (the position of the 3D imaging device).

The 3D imaging device 3000 having the assist function described above may be prohibited from performing 3D imaging until determining that the scene to be imaged will be viewed three-dimensionally (for example the shutter button (not shown) of the 3D imaging device 3000 may be locked to prevent the photographer from pressing (fully pressing) the shutter button).

FIG. 24B shows the arrangement in which the camera (the position of the 3D imaging device) has been moved backward by the distance ΔR. At this camera position, the mountain view 901 has a disparity angle αf', the plant view 902 has a disparity angle αn', and the person 900 has a disparity angle αc'.

The disparity angle of the short-range view has decreased greatly although the disparity angle of the long-range view remains almost unchanged, or αf−αf'≈0.

As a result, |αn'−αf'|<|αn−αf|. In this case, both the long-range view and the short-range view can be fused when the relationship below is satisfied:

$|\alpha n' - \alpha f'| < 2\delta x$ $$\alpha'_n - \alpha'_f = \frac{R_n}{R_n + \Delta R}\alpha_n - \frac{R_f}{R_f + \Delta R}\alpha_f \leq 2 \cdot \delta x \qquad \text{Formula 8}$$

The distance ΔR that satisfies the above formula can be calculated in advance. The 3D imaging device calculates the distance ΔR, and provides the photographer with information indicating to move backward by the distance ΔR and then perform the imaging.

The 3D imaging device of the present embodiment can obtain a 3D image (3D video) in which both the long-range view and the short-range view are easy to view by assisting the photographer to move backward and then perform the imaging. However, the perspectives of the subjects can change in the manner described below; the plant view 902, which is a short-range view, is smaller, the person 900, which is a mid-range view, is slightly smaller, and the mountain view 901, which is a long-range view, remains almost unchanged.

Such changes in the perspectives of the subjects in the captured images would be a problem typically when the images for the main subject, or the person 900, are smaller than intended. The changes in the sizes of the short-range view or the long-range view would be no problem.

To reduce the size change of the main subject, the 3D imaging device of the present embodiment uses zooming in synchronization with the backward movement of the 3D imaging device.

The size of the main subject can decrease at the ratio of Rc/(Rc+ΔR) as the 3D imaging device is moved backward.

Considering this, the 3D imaging device of the present embodiment sets the zoom ratio by a factor of (Rc+ΔR)Rc times to compensate for the change caused by the backward movement of the 3D imaging device. In other words, the 3D imaging device of the present embodiment increases the focal length to prevent the size of the main subject from changing.

As a result, the 3D imaging device of the present embodiment obtains a 3D image (3D video) including a larger long-range view and a smaller short-range view but a main subject having an intended size, and performs appropriate imaging (3D imaging) for many scenes.

First Modification

A first modification of the present embodiment will now be described.

When the photographer can perform imaging at the position shown in FIG. 24A, the 3D imaging device of the present modification changes the focal length of the main subject obtained using the above relational expression to the focal length corresponding to the widest field of view within the range of zooming. Under this setting, the main subject is viewed too large even at the widest field of view of the zooming. As a result, the photographer will voluntarily move backward, and will perform imaging at the position shown in FIG. 24B. In this manner, the 3D imaging device of the present modification assists the photographer by limiting the widest field of view of the zooming area.

The 3D imaging device of the present modification may further recognize that the main subject is a person using a face detection function, which is a standard function of the camera (the 3D imaging device). When detecting that the main subject is a person, the 3D imaging device of the above modification may perform the above assisting operation.

Second Modification

A second modification of the present embodiment will now be described.

In this modification (second modification), a main subject and a long-range view are the subjects important in the scene to be imaged.

When either or both of the long-range view and the short-range view cannot be fused and the short-range view subject is positioned in an edge part of the screen (around the frame part of the screen), the subject is often less likely to be important in the scene to be imaged.

In this case, the photographer is not required to move backward but may be required to change the imaging position slightly in the lateral direction to exclude the less-important short-range view from the imaging range.

When determining that a short-range view is less important based on the above determination criteria, the 3D imaging device of the present modification assists the photographer by displaying a message or by providing voice guidance to move the imaging position in the lateral direction to exclude the short-range view from the imaging range.

With the technique according to the present modification maintaining the size ratio of the long-range view and the main subject, the 3D imaging device of the present modification enables imaging (3D imaging) causing less changes from the original perspectives of the subjects.

Other Embodiments

Each block of the 3D imaging device described in the above embodiments may be formed using a single chip with a semiconductor device, such as LSI (large-scale integration), or some or all of the blocks of the 3D imaging device may be formed using a single chip.

Although LSI is used as the semiconductor device technology, the technology may be IC (integrated circuit), system LSI, super LSI, or ultra LSI depending on the degree of integration of the circuit.

The circuit integration technology employed should not be limited to LSI, but the circuit integration may be achieved using a dedicated circuit or a general-purpose processor. A field programmable gate array (FPGA), which is an LSI circuit programmable after manufactured, or a reconfigurable processor, which is an LSI circuit in which internal circuit cells are reconfigurable or more specifically the internal circuit cells can be reconnected or reset, may be used.

Further, if any circuit integration technology that can replace LSI emerges as an advancement of the semiconductor technology or as a derivative of the semiconductor technology, the technology may be used to integrate the functional blocks. Biotechnology is potentially applicable.

Some or all of the processes performed by the functional blocks of the above embodiments may be executed using a program. Some or all of the processes performed by the functional blocks of the above embodiments may be executed by a central processing unit (CPU) of a computer. The program corresponding to those processes may be stored in a storage device, such as a hard disk or a ROM, and may be read from the storage device and executed.

The processes described in the above embodiments may be implemented using either hardware or software (which may be combined together with an operating system (OS), middleware, or a predetermined library), or may be implemented using both software and hardware. When the 3D imaging device of each of the above embodiments is implemented by hardware, the 3D imaging device requires timing adjustment for its processes. For ease of explanation, the timing adjustment associated with various signals required in an actual hardware design is not described in detail in the above embodiments.

The processes described in the above embodiments may not be performed in the order specified in the above embodiments. The order in which the processes are performed may be changed without departing from the scope and spirit of the invention.

The present invention may also include a computer program enabling a computer to implement the method described in the above embodiments and a computer readable recording medium on which such a program is recorded. The computer readable recording medium may be, for example, a flexible disk, a hard disk, a CD-ROM, an MO, a DVD, a DVD-ROM, a DVD-RAM, a Blu-ray disc, or a semiconductor memory.

The computer program should not be limited to a program recorded on the recording medium, but may be a program transmitted with an electric communication line, a radio or cable communication line, or a network such as the Internet.

Although the above embodiments describe the case in which the two imaging units are used to obtain (capture) a stereo image (a left eye image and a right eye image), the present invention should not be limited to this structure. For example, the 3D imaging device of each of the above embodiments may use only a single image sensor to alternately obtain a left eye image and a right eye image in a time divided manner. Alternatively, the 3D imaging device of each of the above embodiments may use a single imaging unit whose imaging surface is divided into two areas, with which a left eye image and a right eye image are obtained respectively.

The specific structures described in the above embodiments are mere examples of the present invention, and may be changed and modified variously without departing from the scope and spirit of the invention.

INDUSTRIAL APPLICABILITY

The 3D imaging device, the 3D imaging method, and the program of the present invention enable natural, easy-to-view, and safe 3D imaging and 3D displaying, and are useful and implementable in the field of video device related industry.

GENERAL INTERPRETATION OF TERMS

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the lens barrel and the imaging device equipped with the lens barrel. Accordingly, these terms, as utilized to describe the technology disclosed herein should be interpreted relative to a 3D imaging device for three-dimensionally imaging a subject and capturing a 3D image formed by a left eye image and a right eye image.

The term "configured" as used herein to describe a component, section, or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicants, including the structural and/or functional concepts embodied by such feature(s). Thus, the foregoing descriptions of the embodiments according to the present invention are provided for illustration only, and not for the purpose of limiting the invention as defined by the appended claims and their equivalents.

The invention claimed is:

1. A 3D imaging device for three-dimensionally imaging a subject and capturing a 3D image formed by a left eye image and a right eye image, the 3D imaging device comprising:
   an imaging unit configured to capture the 3D image;
   a distance information obtaining unit configured to obtain distance information indicating a distance from the 3D imaging device to the subject;
   a condition obtaining unit configured to obtain an imaging condition under which the 3D image has been captured and a display condition under which the 3D image will be displayed;
   an ideal disparity setting unit configured to set a disparity of the subject that will occur under the display condition as an ideal disparity, based on the obtained imaging condition and the obtained display condition;
   an actual disparity obtaining unit configured to detect a disparity of the subject occurring in the captured 3D image as an actual disparity;
   a disparity correction unit configured to perform disparity correction of the 3D image in a manner that the detected actual disparity is adjusted toward the set ideal disparity;
   a display information setting unit configured to set at least a viewing distance L and a base-line length S as display parameters associated with a viewing environment in which the 3D image is displayed, the viewing distance L being a distance between a display screen to display the 3D image thereon and a base-line that is a straight line connecting a left eye point and a right eye point in the viewing environment, the base-line length S being a distance between the left eye point and the right eye point in the viewing environment;
   wherein the condition obtaining unit sets a virtual screen at a position at which a distance to the subject matches the viewing distance L, and sets the imaging condition in a manner that a point of convergence is positioned on the virtual screen;
   when free positioning imaging is designated by the condition obtaining unit, and a placement position of the subject set by the condition obtaining unit is at a distance R3 from the base-line,
   the disparity correction unit calculates a correction disparity $\Delta x$ using the formula:
   $\Delta x = x3 - x2$, where x3 is the ideal disparity and x2 is the actual disparity, and
   $x3 = S*(1 - L/R3)$, where S is the base-line length, and R3 is the distance from the base line to the placement position, the base-line being a straight line including the left eye point and the right eye point, and L is the distance from the base-line to the display screen, and;
   the disparity correction unit performs disparity correction of the left eye image and the right eye image captured by the imaging unit by horizontally shifting the left eye image and the right eye image by an amount corresponding to the correction disparity $\Delta x$.

2. A 3D imaging method for three-dimensionally imaging a subject and capturing a 3D image formed by a left eye image and a right eye image, the method comprising:
   capturing the 3D image;
   obtaining distance information indicating a distance from an imaging point to the subject;

obtaining an imaging condition under which the 3D image has been captured and a display condition under which the 3D image will be displayed;

setting a disparity of the subject that will occur under the display condition as an ideal disparity based on the obtained imaging condition and the obtained display condition;

detecting a disparity of the subject occurring in the captured 3D image as an actual disparity;

performing disparity correction of the 3D image in a manner that the obtained actual disparity is adjusted toward the set ideal disparity;

setting at least a viewing distance L and a base-line length S as display parameters associated with a viewing environment in which the 3D image is displayed, the viewing distance L being a distance between a display screen to display the 3D image thereon and a base-line that is a straight line connecting a left eye point and a right eye point in the viewing environment, the base-line length S being a distance between the left eye point and the right eye point in the viewing environment;

setting a virtual screen at a position at which a distance to the subject matches the viewing distance L;

setting the imaging condition in a manner that a point of convergence is positioned on the virtual screen;

when free positioning is designated and when a placement position of the subject is set at a distance R3 from the base-line, calculating a correction disparity $\Delta x$ using the formula:

$\Delta x = x3 - x2$, where x3 is the ideal disparity and x2 is the actual disparity, and $x3 = S*(1 - L/R3)$, where S is the base-line length, and R3 is the distance from the base-line to the placement position, the base-line being a straight line including the left eye point and the right eye point, and L is the distance from the base-line to the display screen; and;

performing disparity correction of the left eye image and the right eye image by horizontally shifting the left eye image and the right eye image by an amount corresponding to the correction disparity $\Delta x$.

* * * * *